United States Patent
Ishikawa et al.

(10) Patent No.: US 10,796,669 B2
(45) Date of Patent: Oct. 6, 2020

(54) METHOD AND APPARATUS TO CONTROL AN AUGMENTED REALITY HEAD-MOUNTED DISPLAY

(71) Applicant: Sony Corporation, Tokyo (JP)

(72) Inventors: Hirotaka Ishikawa, Kanagawa (JP); Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 15/504,776

(22) PCT Filed: Jun. 16, 2015

(86) PCT No.: PCT/JP2015/067353
§ 371 (c)(1),
(2) Date: Feb. 17, 2017

(87) PCT Pub. No.: WO2016/031358
PCT Pub. Date: Mar. 3, 2016

(65) Prior Publication Data
US 2017/0278486 A1  Sep. 28, 2017

(30) Foreign Application Priority Data
Aug. 27, 2014  (JP) .................................. 2014-172892

(51) Int. Cl.
*G09G 5/377* (2006.01)
*G09G 5/00* (2006.01)
(Continued)

(52) U.S. Cl.
CPC ............. *G09G 5/377* (2013.01); *G06F 3/011* (2013.01); *G06F 3/048* (2013.01); *G06T 11/60* (2013.01);
(Continued)

(58) Field of Classification Search
None
See application file for complete search history.

(56) References Cited

U.S. PATENT DOCUMENTS

| 5,394,029 A * | 2/1995 | Gay ...................... G01C 17/28 327/511 |
| 6,396,497 B1 * | 5/2002 | Reichlen ................. G06F 3/011 345/427 |

(Continued)

FOREIGN PATENT DOCUMENTS

| JP | 09-292830 A | 11/1997 |
| JP | 2000-194726 A | 7/2000 |

(Continued)

*Primary Examiner* — Michael J Cobb
(74) *Attorney, Agent, or Firm* — Wolf, Greenfield & Sacks, P.C.

(57) ABSTRACT

[Object] To enable a user to easily recognize correspondence relationship among objects displayed in a plurality of different display modes upon switching of a mode.
[Solution] There is provided a display control apparatus including: a display control unit configured to display a first screen in a first display mode and display a second screen in a second display mode. Upon switching of a mode from the first display mode to the second display mode, in the case where a first object included in the first screen corresponds to a second object included in the second screen, the display control unit performs seamless transition from the first object to the second object.

20 Claims, 54 Drawing Sheets

(51) Int. Cl.
*G06F 3/048* (2013.01)
*G06F 3/01* (2006.01)
*G06T 11/60* (2006.01)
*G06T 19/00* (2011.01)
*G06F 3/0481* (2013.01)

(52) U.S. Cl.
CPC ............ *G06T 19/006* (2013.01); *G09G 5/00* (2013.01); *G06F 3/04815* (2013.01); *G09G 2340/12* (2013.01)

(56) References Cited

U.S. PATENT DOCUMENTS

| | | | |
|---|---|---|---|
| 6,636,249 | B1 | 10/2003 | Rekimoto |
| 8,446,422 | B2* | 5/2013 | Tanaka ................. H04N 5/4403 345/581 |
| 2008/0309475 | A1* | 12/2008 | Kuno ..................... B60K 35/00 340/462 |
| 2010/0315521 | A1* | 12/2010 | Kunishige .............. H04N 5/232 348/220.1 |
| 2012/0127284 | A1* | 5/2012 | Bar-Zeev ............. G02B 27/017 348/53 |
| 2012/0313946 | A1* | 12/2012 | Nakamura .......... G06F 3/04815 345/426 |
| 2014/0063058 | A1* | 3/2014 | Fialho .................... G06T 11/60 345/633 |
| 2014/0225812 | A1* | 8/2014 | Hosoya ................ G02B 27/017 345/8 |
| 2014/0282260 | A1* | 9/2014 | Amacker ............ G06F 3/04842 715/838 |
| 2014/0285403 | A1* | 9/2014 | Kobayashi ........... G02B 27/017 345/8 |
| 2015/0029223 | A1* | 1/2015 | Kaino ................... G06T 19/006 345/633 |
| 2015/0091943 | A1* | 4/2015 | Lee ..................... G02B 27/0172 345/633 |
| 2015/0097867 | A1* | 4/2015 | McArdle ............... G06F 3/0481 345/633 |
| 2015/0317831 | A1* | 11/2015 | Ebstyne ................ G06T 19/006 345/419 |
| 2016/0125633 | A1* | 5/2016 | Windmark ........... G06T 3/4038 382/103 |
| 2016/0147307 | A1* | 5/2016 | Masuko ................. G06F 3/017 715/863 |
| 2017/0053452 | A1* | 2/2017 | Arai ..................... G06T 19/006 |
| 2019/0139286 | A1* | 5/2019 | Shimoda ................ B60K 35/00 |
| 2019/0285896 | A1* | 9/2019 | Kobayashi ........... G06T 19/006 |

FOREIGN PATENT DOCUMENTS

| | | |
|---|---|---|
| JP | 2001-195609 A | 7/2001 |
| JP | 2011-215412 A | 10/2011 |
| JP | 2012-198668 A | 10/2012 |
| WO | WO 2012/127605 A1 | 9/2012 |
| WO | WO-2014128810 A1 * | 8/2014 ......... G02B 27/0172 |

* cited by examiner

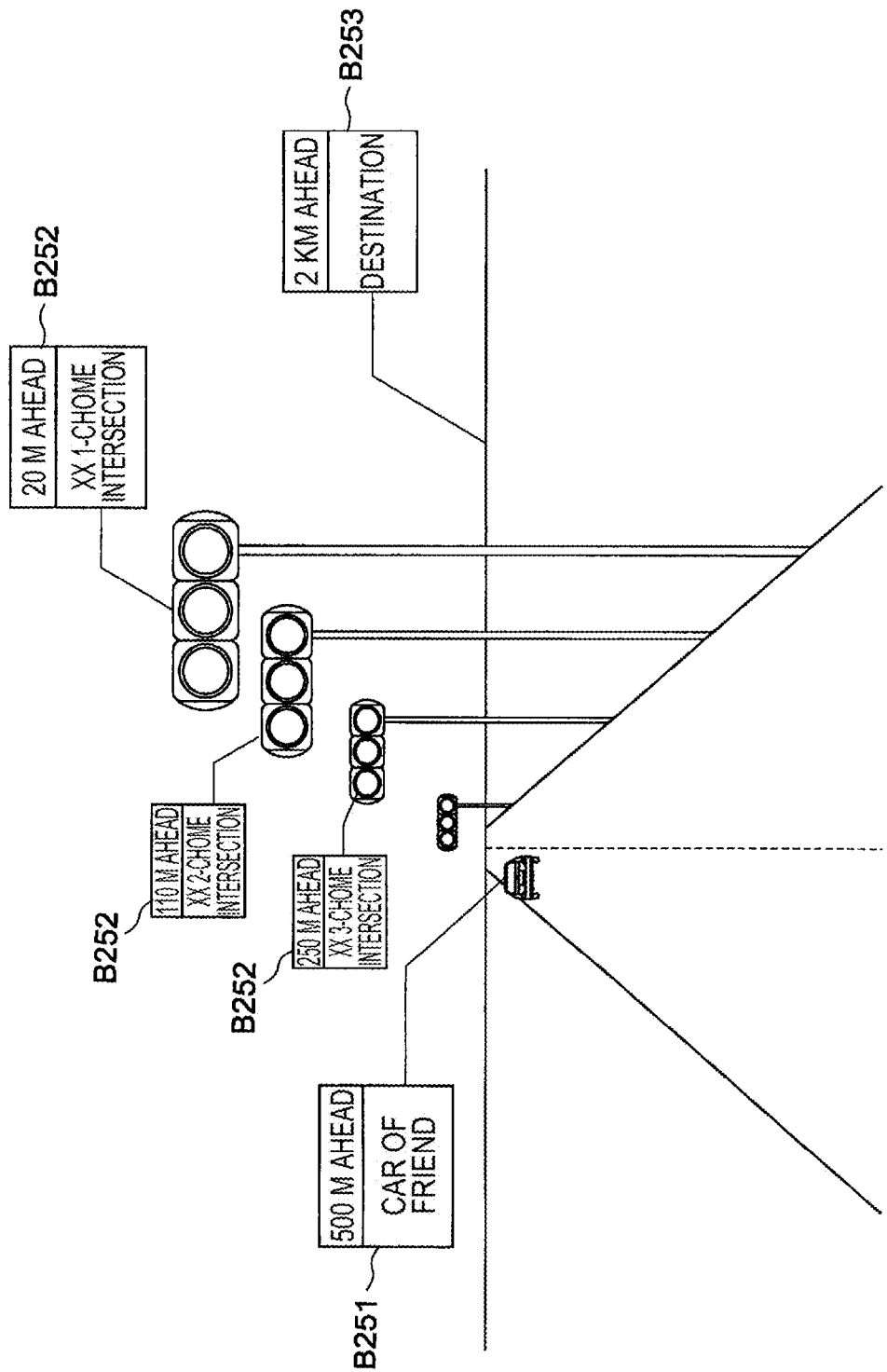

METHOD AND APPARATUS TO CONTROL AN AUGMENTED REALITY HEAD-MOUNTED DISPLAY

CROSS-REFERENCE TO RELATED APPLICATIONS

This application claims the benefit under 35 U.S.C. § 371 as a U.S. National Stage Entry of International Application No. PCT/JP2015/067353, filed in the Japanese Patent Office as a Receiving Office on Jun. 16, 2015, which claims priority to Japanese Patent Application Number JP2014-172892, filed in the Japanese Patent Office on Aug. 27, 2014, each of which is hereby incorporated by reference in its entirety.

TECHNICAL FIELD

The present disclosure relates to a display control apparatus, a display control method, and a program.

BACKGROUND ART

A technology of switching a mode among a plurality of different modes is known. For example, a technology of switching a mode between a first display mode in which an object is superimposed in augmented realty (AR) space and a second display mode in which map data is displayed is disclosed (see, for example, Patent Literature 1).

CITATION LIST

Patent Literature

Patent Literature 1: JP 2007-93661A

DISCLOSURE OF INVENTION

Technical Problem

However, in the case where a mode is switched between a first display mode and a second display mode, in the case where an object displayed in the first display mode corresponds to an object displayed in the second display mode, it is required to enable a user to recognize that the objects correspond to each other.

Therefore, the present disclosure proposes a technology which easily enables a user to recognize correspondence relationship among objects displayed in a plurality of different display modes upon switching of a mode.

Solution to Problem

According to the present disclosure, there is provided a display control apparatus including: a display control unit configured to display a first screen in a first display mode and display a second screen in a second display mode. Upon switching of a mode from the first display mode to the second display mode, in the case where a first object included in the first screen corresponds to a second object included in the second screen, the display control unit performs seamless transition from the first object to the second object.

According to the present disclosure, there is provided a display control method including: displaying a first screen in a first display mode and displaying a second screen in a second display mode. Upon switching of a mode from the first display mode to the second display mode, in the case where a first object included in the first screen corresponds to a second object included in the second screen, seamless transition from the first object to the second object is performed.

According to the present disclosure, there is provided a program for causing a computer to function as a display control apparatus including a display control unit configured to display a first screen in a first display mode and display a second screen in a second display mode. Upon switching of a mode from the first display mode to the second display mode, in the case where a first object included in the first screen corresponds to a second object included in the second screen, the display control unit performs seamless transition from the first object to the second object.

Advantageous Effects of Invention

As described above, according to the present disclosure, it is possible to enable a user to easily recognize correspondence relationship among objects displayed in a plurality of different display modes upon switching of a mode. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 24 is a pattern diagram of a visual field explaining the above-described display control example.

MODES FOR CARRYING OUT THE INVENTION

Embodiments according to the present technology will be described below with reference to the drawings. In the present embodiment, an example will be described where the present technology is applied to a head mounted display as an image display apparatus.

First Embodiment

Figure 1:
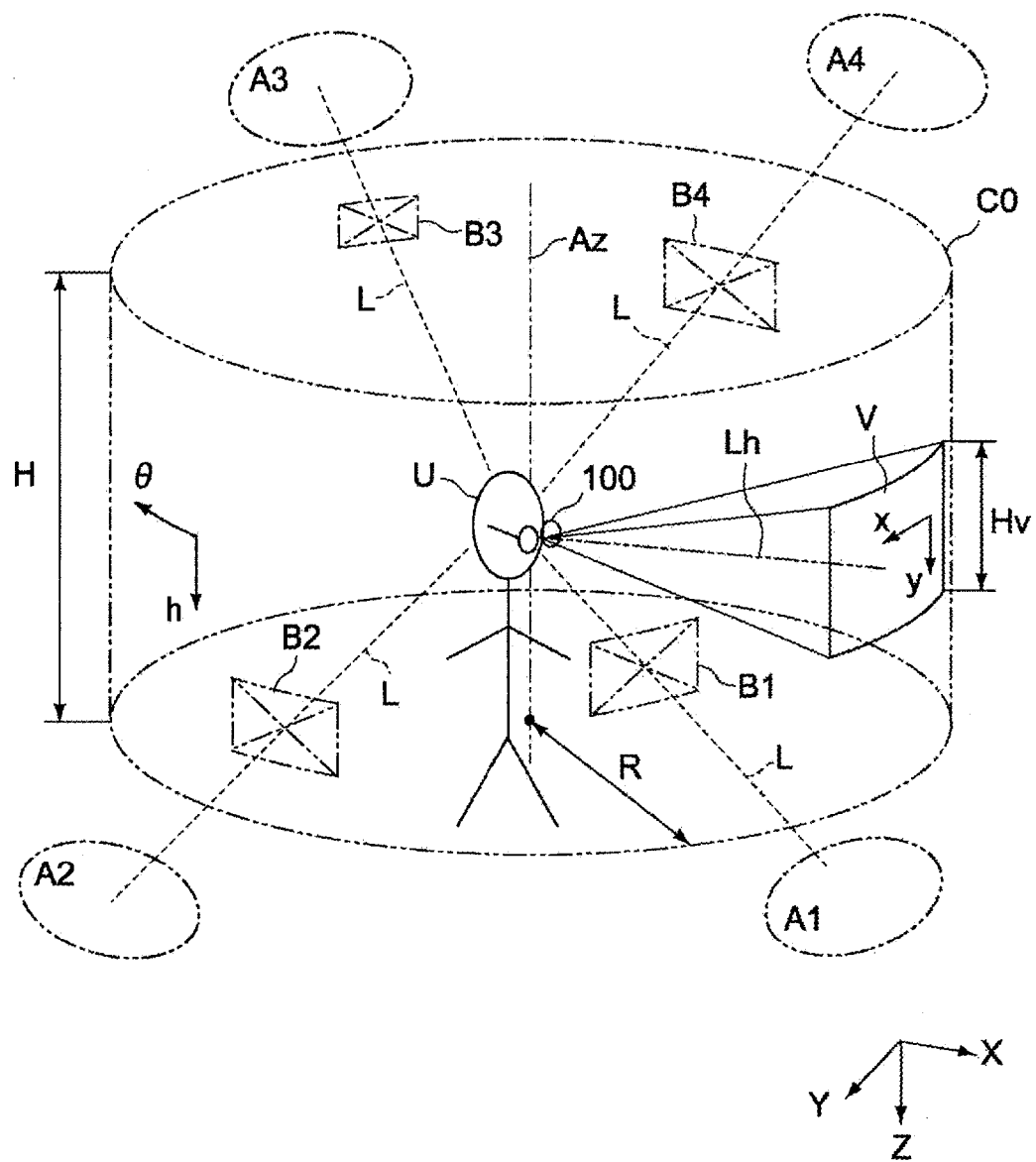
FIG. 1 is a schematic diagram explaining functions of a head mounted display according to an embodiment of the present technology.

FIG. 1 is a schematic diagram explaining functions of the head mounted display (hereinafter, referred to as an "HMD") according to an embodiment of the present technology. First, outline of basic functions of the HMD according to the present embodiment will be described with reference to FIG. 1.

Here, in FIG. 1, an X axis direction and a Y axis direction indicate horizontal directions which are orthogonal to each other, and a Z axis direction indicates a vertical axis direction. The XYZ orthogonal coordinate system indicates a coordinate system (real three-dimensional coordinate system) of real space to which the user belongs, an arrow on the X axis indicates a northward direction, and an arrow on the Y axis indicates an eastward direction. Further, an arrow on the Z axis indicates a gravity direction.

[Outline of Functions of HMD]

The HMD 100 of the present embodiment is worn on the head of a user U, and is configured to be able to display a virtual image in a visual field V (display visual field) of the user U in real space. The image displayed in the visual field V includes information relating to predetermined subjects A1, A2, A3 and A4 existing in the visual field V. The predetermined subjects correspond to, for example, the landscape, stores, goods, or the like, existing around the user U.

The HMD 100 stores in advance images (hereinafter, also referred to as objects) B1, B2, B3 and B4 associated with a virtual world coordinate system surrounding the user U who wears the HMD. The world coordinate system is a coordinate system equivalent to real space to which the user belongs, and defines positions of the subjects A1 to A4 using a position of the user U and a predetermined axial direction as references. While, in the present embodiment, a cylindrical coordinate C0 in which a vertical axis is made an axial center is employed as the world coordinate, other three-dimensional coordinates such as a celestial coordinate centered on the user U may be also employed.

A radius R and height H of the cylindrical coordinate C0 can be arbitrarily set. While the radius R is set shorter than distances from the user to the subjects A1 to A4 here, the radius R may be longer than the above-described distances. Further, the height H is set equal to or greater than height (length in a longitudinal direction) Hv of a visual field V of the user U provided through the HMD 100.

The objects B1 to B4 which are images displaying information relating to the subjects A1 to A4 existing in the world coordinate system, may be images including characters, pictures, or the like, or may be animation images. Further, the objects may be two-dimensional images or three-dimensional images. Still further, the shape of the objects may be rectangular, circular or other geometric shapes, and can be set as appropriate according to types of the objects.

The coordinate positions of the objects B1 to B4 on the cylindrical coordinate C0 are respectively associated with, for example, intersections of eye lines L of the user who gazes at the subjects A1 to A4 and the cylindrical coordinate C0. While, in the illustrated example, respective center positions of the objects B1 to B4 are made to match the above-described intersections, the positions are not limited to this, and part of the circumferences of the objects (for example, part of four corners) may be made to match the above-described intersections. Alternatively, the coordinate positions of the objects B1 to B4 may be associated with arbitrary positions distant from the above-described intersections.

The cylindrical coordinate C0 has a coordinate axis (θ) in a circumferential direction indicating an angle around a vertical axis assuming that the northward direction is 0°, and a coordinate axis (h) in a height direction indicating an angle in a vertical direction using an eye line Lh of the user U in the horizontal direction as a reference. On the coordinate axis (θ), an eastward direction is set as a positive direction, and on the coordinate axis (h), a depression angle is set as a positive direction, and an elevation angle is set as a negative direction.

As will be described later, the HMD 100 includes a detecting unit for detecting a viewpoint direction of the user U, and determines to which region on the cylindrical coordinate C0 the visual field V of the user U corresponds based on output of the detecting unit. In the case where one of the objects (for example, the object B1) exists in the corresponding region of the xy coordinate system which forms the visual field V, the HMD 100 displays (draws) the object B1 in the above-described corresponding region.

As described above, the HMD 100 of the present embodiment provides information relating to the subject A1 to the user U by displaying the object B1 in the visual field V while superimposing the object B1 on the subject A1 in real space. Further, the HMD 100 can provide the objects (B1 to B4) relating to the predetermined subjects A1 to A4 to the user U according to orientation or direction of a viewpoint of the user U.

Figure 2:
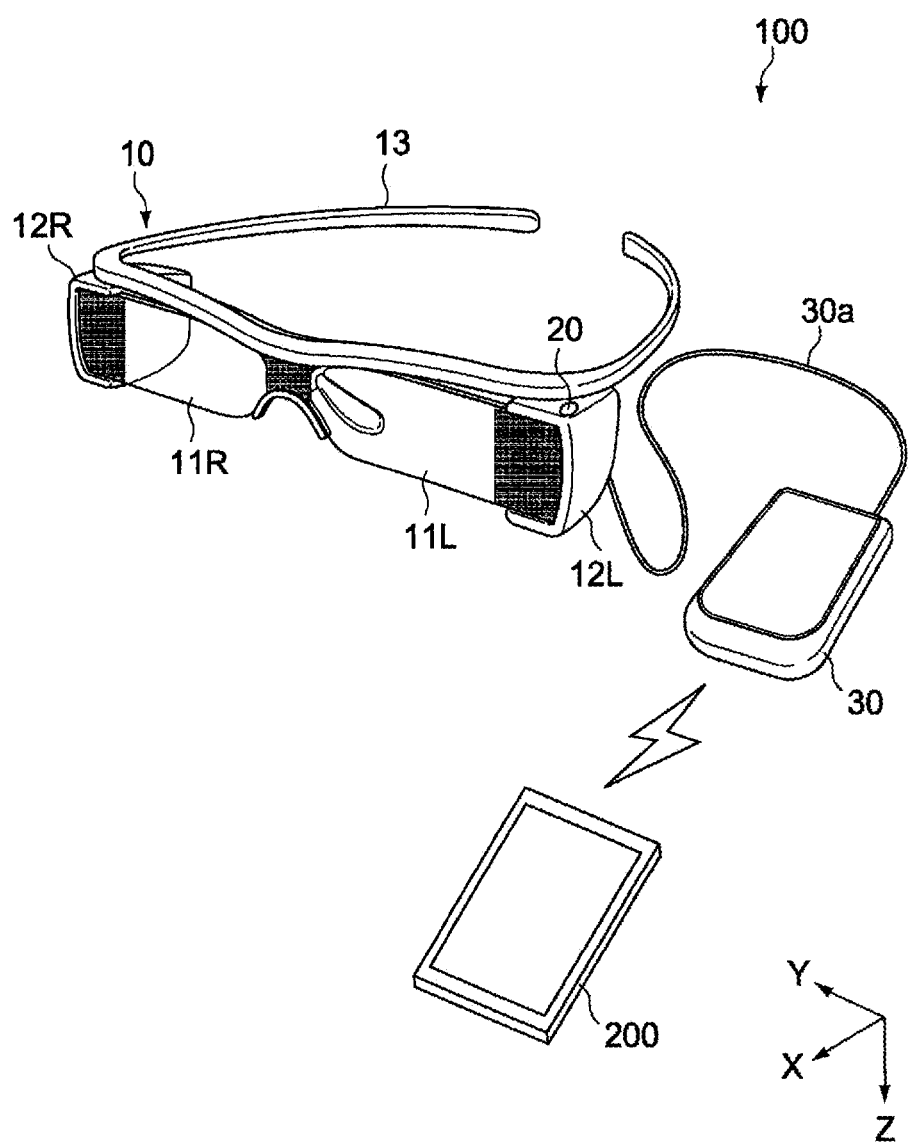
FIG. 2 is an overall view illustrating the above-described head mounted display.
Figure 3:
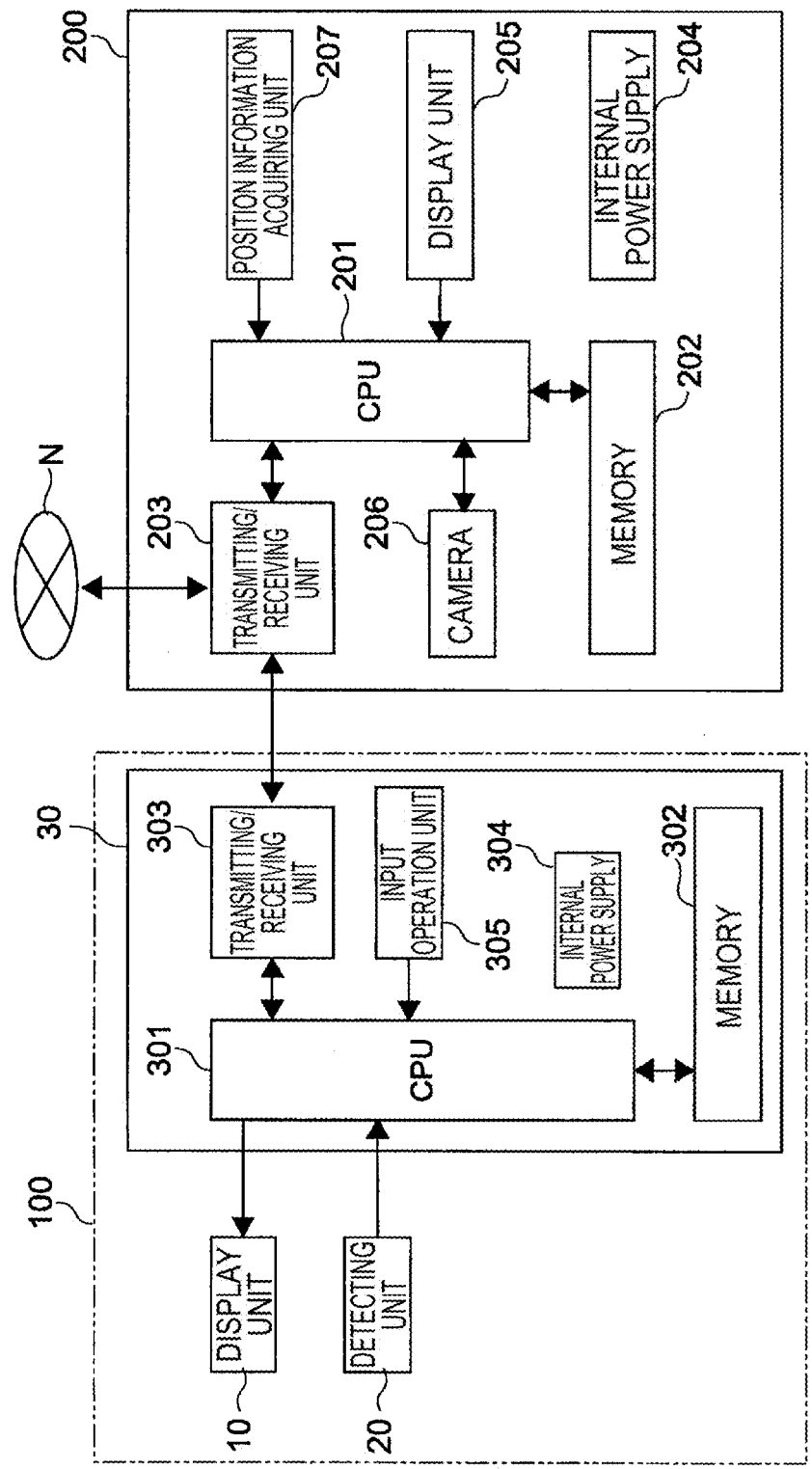
FIG. 3 is a block diagram illustrating a configuration of a system including the above-described head mounted display.

Subsequently, details of the HMD 100 will be described. FIG. 2 is an overall view illustrating the HMD 100, and FIG. 3 is a block diagram illustrating the configuration of the HMD 100.

[Configuration of HMD]

The HMD 100 includes a display unit 10, a detecting unit 20 configured to detect posture of the display unit 10, and a control unit 30 configured to control driving of the display unit 10. In the present embodiment, the HMD 100 is configured as a see-through type HMD which can provide the visual field V in real space to the user.

(Display Unit)

The display unit 10 is configured to be able to be worn on the head of the user U. The display unit 10 includes first and second display faces 11R and 11L, first and second image generating units 12R and 12L and a support body 13.

The first and second display faces 11R and 11L are formed with optical elements having transparency which can provide real space (external visual field) respectively to the right eye and the left eye of the user U. The first and second image generating units 12R and 12L are configured to be able to generate images presented to the user U respectively via the first and the second display faces 11R and 11L. The support body 13 supports the display faces 11R and 11L and the image generating units 12R and 12L and has an appropriate shape which allows the display unit 10 to be worn on the head of the user so that the first and the second display faces 11L and 11R respectively face the right eye and the left eye of the user U.

The display unit 10 configured as described above is configured to be able to provide the visual field V in which a predetermined image (or a virtual image) is superimposed on the real space to the user U through the display faces 11R and 11L. In this case, the cylindrical coordinate C0 for the right eye and the cylindrical coordinate C0 for the left eye are set, and objects drawn on the respective cylindrical coordinates are projected on the display faces 11R and 11L.

(Detecting Unit)

The detecting unit 20 is configured to be able to detect orientation or posture change of the display unit 10 around at least one axis. In the present embodiment, the detecting unit 20 is configured to detect orientation or posture change of the display unit 10 around the X, Y and Z axes.

Here, the orientation of the display unit 10 typically means a front direction of the display unit. In the present embodiment, the orientation of the display unit 10 is defined as orientation of the face of the user U.

The detecting unit 20 can be configured with a motion sensor such as an angular velocity sensor and an acceleration sensor, or combination of these sensors. In this case, the detecting unit 20 may be configured with a sensor unit in which each of the angular velocity sensor and the acceleration sensor is disposed in a triaxial direction or sensor to be used may be made different according to axes. For example, an integral value of output of the angular velocity sensor can be used for posture change, a direction of the change, an amount of the change, or the like, of the display unit 10.

Further, a geomagnetic sensor can be employed for detection of the orientation of the display unit 10 around the vertical axis (Z axis). Alternatively, the geomagnetic sensor and the above-described motion sensor may be combined. By this means, it is possible to detect orientation or posture change with high accuracy.

The detecting unit 20 is disposed at an appropriate position of the display unit 10. The position of the detecting unit 20 is not particularly limited, and, for example, the detecting unit 20 is disposed at one of the image generating units 12R and 12L or at part of the support body 13.

(Control Unit)

The control unit 30 (first control unit) generates a control signal for controlling driving of the display unit 10 (the image generating units 12R and 12L) based on the output of the detecting unit 20. In the present embodiment, the control unit 30 is electrically connected to the display unit 10 via a connection cable 30a. Of course, the connection is not limited to this, and the control unit 30 may be connected to the display unit 10 through a radio communication line.

As illustrated in FIG. 3, the control unit 30 includes a CPU 301, a memory 302 (storage unit), a transmitting/receiving unit 303, an internal power supply 304 and an input operation unit 305.

The CPU 301 controls the whole operation of the HMD 100. The memory 302 includes a read only memory (ROM), a random access memory (RAM), or the like, and stores a program or various kinds of parameters for the CPU 301 to control the HMD 100, an image (object) to be displayed at the display unit 10 and other required data. The transmitting/receiving unit 303 includes an interface for communication with a mobile information terminal 200 which will be described later. The internal power supply 304 supplies power required for driving the HMD 100.

The input operation unit 305 is provided to control an image to be displayed at the display unit 10 through user operation. The input operation unit 305 may be configured with a mechanical switch or may be configured with a touch sensor. The input operation unit 305 may be provide at the display unit 10.

The HMD 100 may further include an acoustic output unit such as a speaker, a camera, or the like. In this case, the above-described sound output unit and the camera are typically provided at the display unit 10. Further, a display device which displays an input operation screen, or the like, of the display unit 10 may be provided at the control unit 30. In this case, the input operation unit 305 may be configured with a touch panel provided at the display device.

(Mobile Information Terminal)

The mobile information terminal 200 (second control unit) is configured to be able to mutually communicate with the control unit 30 through a radio communication line. The mobile information terminal 200 has a function of acquiring an image to be displayed at the display unit 10 and a function of transmitting the acquired image to the control unit 30. The mobile information terminal 200 constructs an HMD system by being organically combined with the HMD 100.

While the mobile information terminal 200 is carried by the user U who wears the display unit 10, and is configured with an information processing apparatus such as a personal computer (PC), a smartphone, a mobile telephone, a tablet PC and a personal digital assistant (PDA), the mobile information terminal 200 may be a terminal apparatus dedicated for the HMD 100.

As illustrated in FIG. 3, the mobile information terminal 200 includes a CPU 201, a memory 202, a transmitting/receiving unit 203, an internal power supply 204, a display unit 205, a camera 206 and a position information acquiring unit 207.

The CPU 201 controls the whole operation of the mobile information terminal 200. The memory 202 includes a ROM, a RAM, or the like, and stores a program and various kinds of parameters for the CPU 201 to control the mobile information terminal 200, an image (object) to be transmitted to the control unit 30 and other required data. The internal power supply 204 supplies power required for driving the mobile information terminal 200.

The transmitting/receiving unit 203 communicates with a server N, a control unit 30, other nearby mobile information terminals, or the like, using wireless LAN (such as IEEE 802.11) such as wireless fidelity (WiFi) or a network of 3G or 4G for mobile communication. The mobile information terminal 200 downloads an image (object) to be transmitted to the control unit 30 or application for displaying the image from the server N via the transmitting/receiving unit 203 and stores the image in the memory 202.

The server N is typically configured with a computer including a CPU, a memory, or the like, and transmits predetermined information to the mobile information terminal 200 in response to a request from the user U or automatically regardless of intention of the user U.

The display unit 205 which is configured with, for example, an LCD and an OLED, displays various kinds of menus, a GUI of application, or the like. Typically, the display unit 205 is integrated with a touch panel and can accept touch operation of the user. The mobile information terminal 200 is configured to be able to input a predetermined operation signal to the control unit 30 through touch operation on the display unit 205.

The position information acquiring unit 207 typically includes a global positioning system (GPS) receiver. The mobile information terminal 200 is configured to be able to measure a current position (longitude, latitude and altitude) of the user U (display unit 10) using the position information acquiring unit 207 and acquire a necessary image (object) from the server N. That is, the server N acquires information relating to the current position of the user and transmits image data, application software, or the like, to the mobile information terminal 200 according to the position information.

(Details of Control Unit)

Details of the control unit 30 will be described next.

Figure 4:
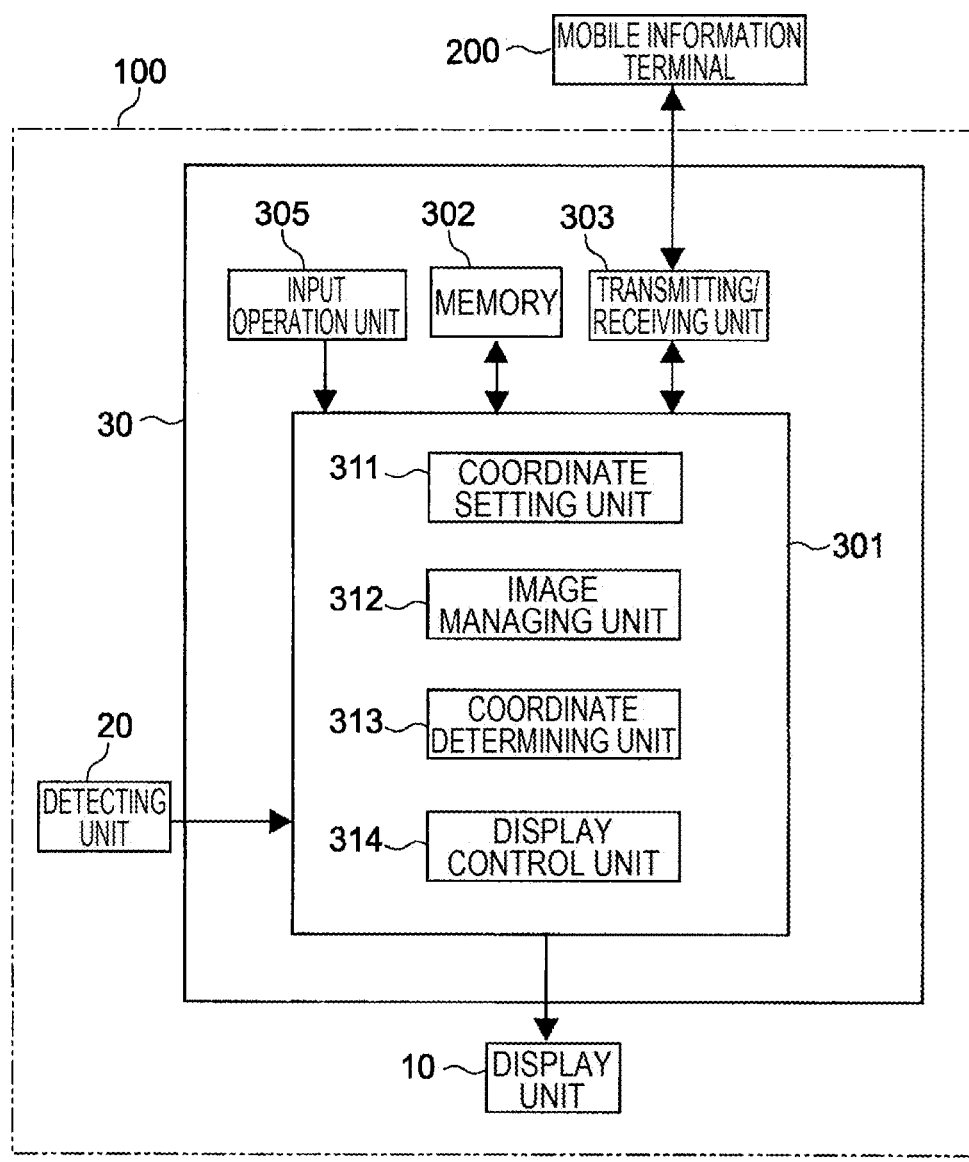
FIG. 4 is a functional block diagram of a control unit in the above-described head mounted display.

FIG. 4 is a functional block diagram of the CPU 301. The CPU 301 includes a coordinate setting unit 311, an image managing unit 312, a coordinate determining unit 313 and a display control unit 314. The CPU 301 executes processing at the coordinate setting unit 311, the image managing unit 312, the coordinate determining unit 313 and the display control unit 314 according to a program stored in the memory 302.

The coordinate setting unit 311 is configured to execute processing of setting a three-dimensional coordinate surrounding the user U (display unit 10). In this example, a cylindrical coordinate C0 (see FIG. 1) centered on a vertical axis Az is used as the above-described three-dimensional coordinate. The coordinate setting unit 311 sets the radius R and the height H of the cylindrical coordinate C0. The coordinate setting unit 311 typically sets the radius R and the height H of the cylindrical coordinate C0 according to the number, types, or the like, of objects to be presented to the user U.

While the radius R of the cylindrical coordinate C0 may be a fixed value, the radius R of the cylindrical coordinate C0 may be a variable value which can be arbitrarily set according to the size (pixel size) of the image to be displayed, or the like. The height H of the cylindrical coordinate C0 is set at a size, for example, between the same size as the height Hv and three times of the height Hv (see FIG. 1) in the longitudinal direction (vertical direction) of the visual field V to be provided to the user U by the display unit 10. An upper limit of the height H is not limited to three times of Hv and may exceed three times of Hv.

Figure 5A:
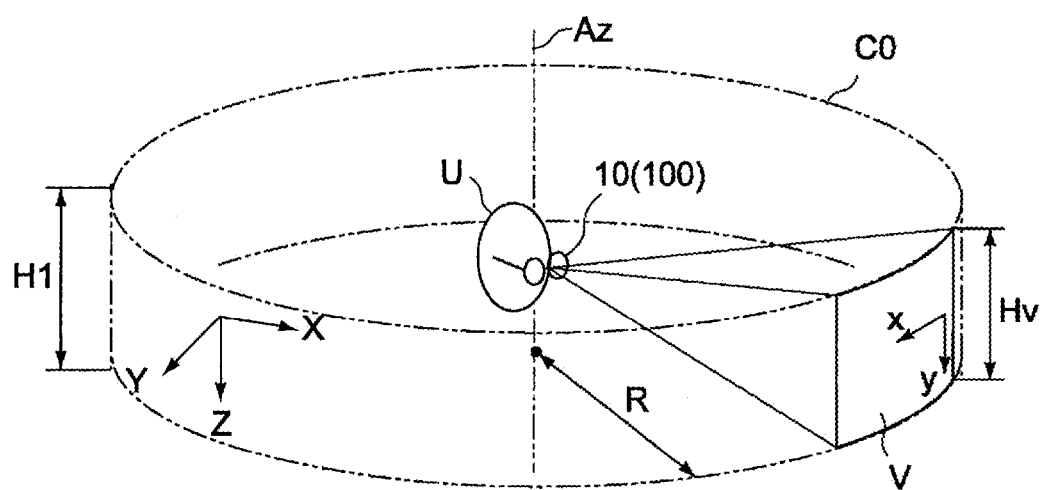
FIG. 5A is a schematic diagram illustrating a cylindrical coordinate as an example of a world coordinate system in the above-described head mounted display.
Figure 5B:
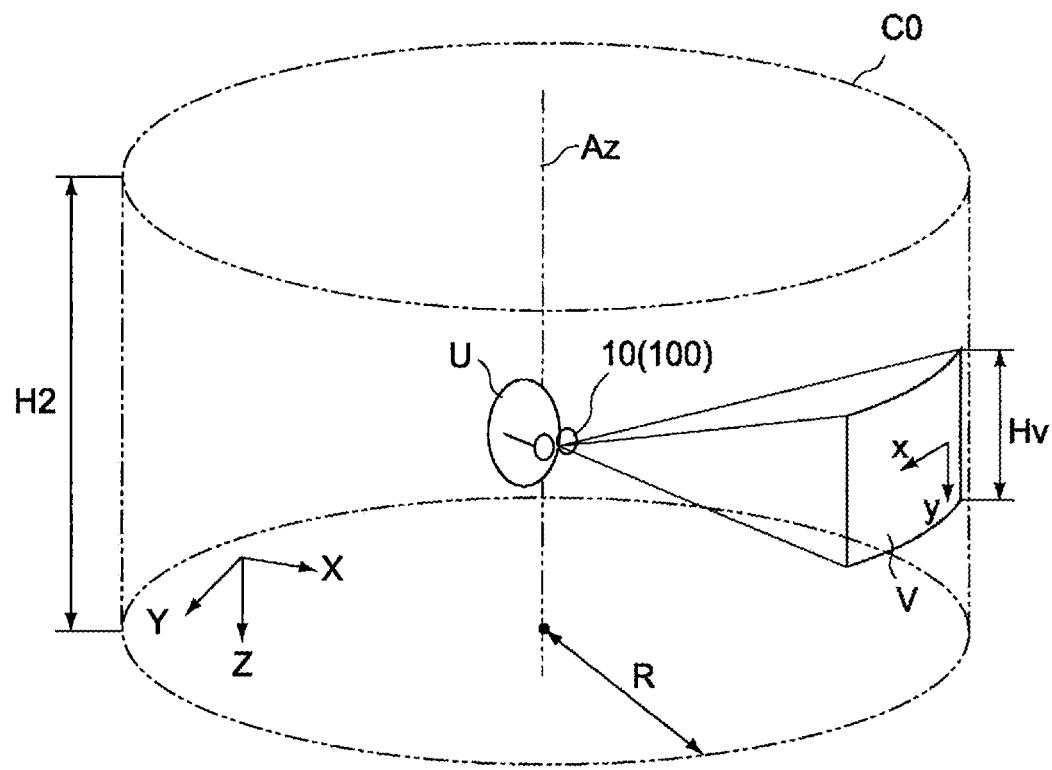
FIG. 5B is a schematic diagram illustrating a cylindrical coordinate as an example of a world coordinate system in the above-described head mounted display.

FIG. 5A illustrates a cylindrical coordinate C0 having the same height H1 as the height Hv of the visual field V. FIG. 5B illustrates a cylindrical coordinate C0 having the height H2 three times of the height Hv of the visual field V.

Figure 6A:
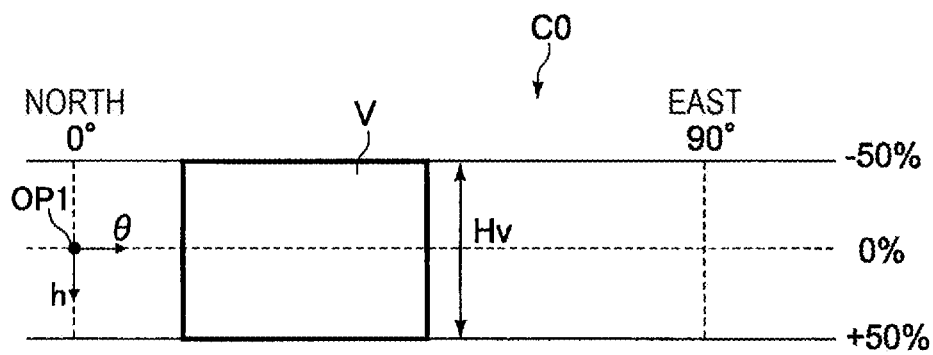
FIG. 6A is a development view of the cylindrical coordinate illustrated in FIG. 5A.
Figure 6B:
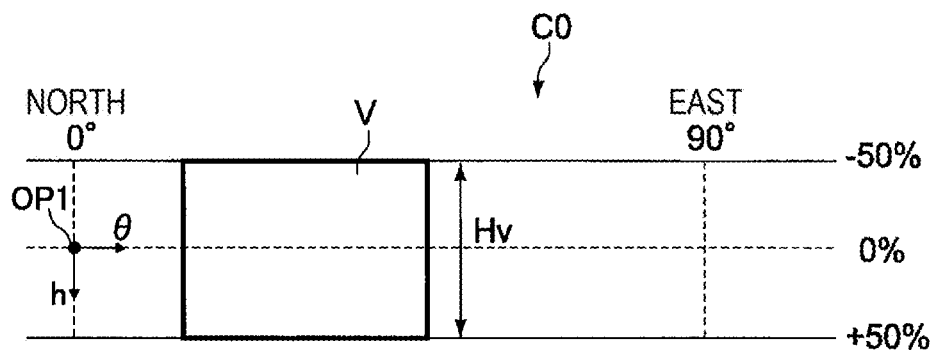
FIG. 6B is a development view of the cylindrical coordinate illustrated in FIG. 5B.

FIG. 6A and FIG. 6B are pattern diagrams illustrating the developed cylindrical coordinates C0. As described above, the cylindrical coordinate C0 has a coordinate axis (θ) in a circumferential direction indicating an angle around a vertical axis assuming that the northward direction is 0°, and a coordinate axis (h) in a height direction indicating an angle in a vertical direction using the eye line Lh of the user U in the horizontal direction as a reference. On the coordinate axis (θ), the eastward direction is set as a positive direction, and on the coordinate axis (h), a depression angle is set as a positive direction and an elevation angle is set as a negative direction. The height h indicates a size assuming that the size of the height Hv of the visual field V is 100%, and an origin OP1 of the cylindrical coordinate C0 is set at an intersection of orientation (0°) in the northward direction and the eye line Lh (h=0%) of the user U in the horizontal direction.

The coordinate setting unit 311 has a function as a region limiting unit which can limit a display region along one axial direction of the visual field V on the three-dimensional coordinate surrounding the display unit 10. In the present embodiment, the coordinate setting unit 311 limits a visual field region (Hv) in the height direction of the visual field V on the cylindrical coordinate C0 surrounding the display unit 10. Specifically, the coordinate setting unit 311 limits the height (H) of the cylindrical coordinate according to the region in the height direction of the visual field V in the case where a specified value of the height (H) is greater than the height Hv of the visual field V. Further, the coordinate setting unit 311, for example, limits the height of the cylindrical coordinate from H2 (FIG. 5B) to H1 (FIG. 5A) according to operation by the user U.

The image managing unit 312 has a function of managing an image stored in the memory 302, and is configured to, for example, store one or a plurality of images to be displayed via the display unit 10 in the memory 302 and execute processing of selectively deleting an image stored in the memory 302. The image stored in the memory 302 is transmitted from the mobile information terminal 200. Further, the image managing unit 312 requests transmission of the image to the mobile information terminal 200 via the transmitting/receiving unit 303.

The memory 302 is configured to be able to store one or a plurality of images (objects) to be displayed in the visual field V in association with the cylindrical coordinate C0. That is, the memory 302 stores individual objects B1 to B4 on the cylindrical coordinate C0 illustrated in FIG. 1 along with the coordinate positions on the cylindrical coordinate C0.

Figure 7:
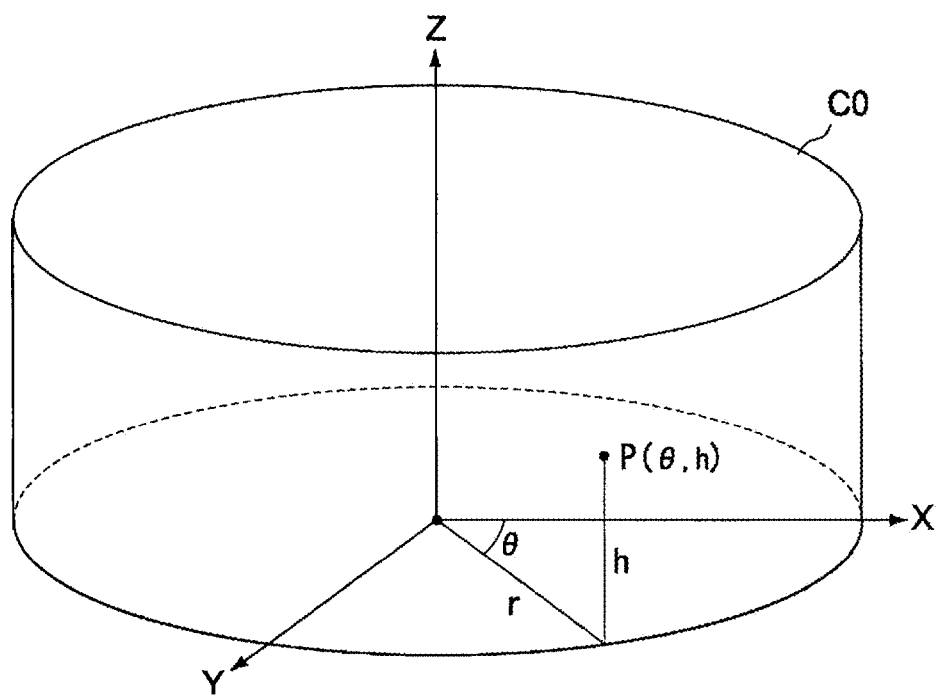
FIG. 7 is an explanatory diagram of a coordinate position in the above-described cylindrical coordinate system.

As illustrated in FIG. 7, the cylindrical coordinate system (θ, h) and the orthogonal coordinate system (X, Y, Z) have relationship of X=r cos θ, Y=r sin θ, Z=h. As illustrated in FIG. 1, the individual objects B1 to B4 to be displayed according to the orientation or the posture of the visual field V occupy specific coordinate regions on the cylindrical coordinate C0, and are stored in the memory 302 along with specific coordinate positions P (θ, h) within the regions.

The coordinates (θ, h) of the objects B1 to B4 on the cylindrical coordinate C0 are associated with the coordinates of the cylindrical coordinate system at the intersections of lines connecting the positions of the subjects A1 to A4 respectively defined in the orthogonal coordinate system (X, Y, Z) and the position of the user, and a cylindrical face of the cylindrical coordinate C0. That is, the coordinates of the objects B1 to B4 respectively correspond to the coordinates of the subjects A1 to A4 which are converted from real three-dimensional coordinates to the cylindrical coordinates C0. Such coordinate conversion of the objects are, for example, executed at the image managing unit 312, and the respective objects are stored in the memory 302 along with the coordinate positions. By employing the cylindrical coordinate C0 as the world coordinate system, it is possible to draw the objects B1 to B4 in a plane manner.

The coordinate positions of the objects B1 to B4 may be set at any position within display regions of the objects B1 to B4, and one specific point (for example, a central position) may be set for one object, or two or more points (for example, two diagonal points or points at four corners) may be set for one object.

Further, as illustrated in FIG. 1, in the case where the coordinate positions of the objects B1 to B4 are associated with intersections of eye lines L of the user who gazes at the subjects A1 to A4 and the cylindrical coordinate C0, the user U views the objects B1 to B4 at the positions where the objects B1 to B4 overlap with the subjects A1 to A4. Instead, it is also possible to associate the coordinate positions of the objects B1 to B4 with arbitrary positions distant from the above-described intersections. By this means, it is possible to display or draw the objects B1 to B4 at desired positions with respect to the subjects A1 to A4.

The coordinate determining unit 313 is configured to execute processing of determining to which region on the cylindrical coordinate C0 the visual field V of the user U corresponds based on the output of the detecting unit 20. That is, the visual field V moves on the cylindrical coordinate C0 according to posture change of the user U (display unit 10), and the moving direction and the moving amount are calculated based on the output of the detecting unit 20. The coordinate determining unit 313 calculates the moving direction and the moving amount of the display unit 10 based on the output of the detecting unit 20 and determines to which region on the cylindrical coordinate C0 the visual field V belongs.

Figure 8:
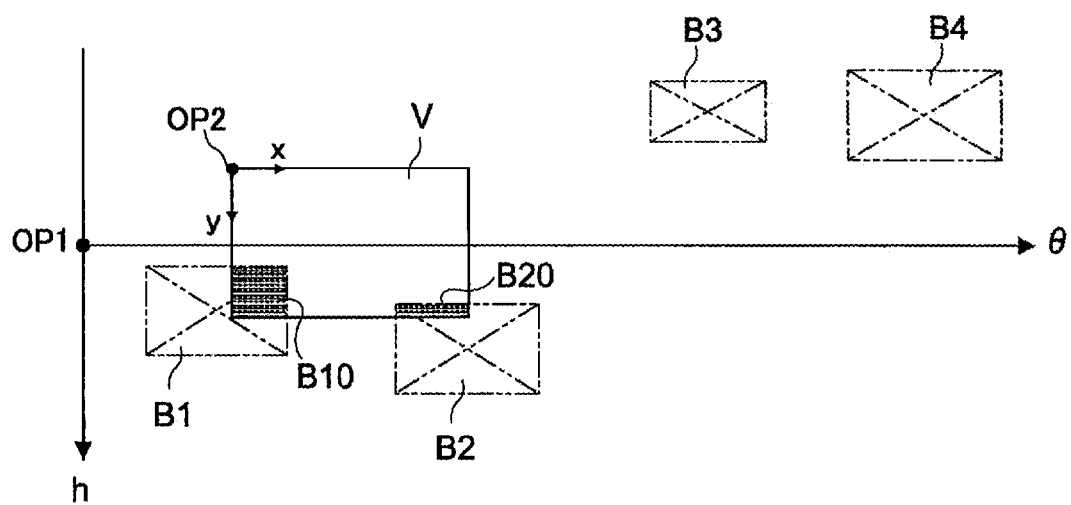
FIG. 8 is a development diagram of the above-described cylindrical coordinate schematically illustrating relationship between a visual field and an object.

FIG. 8 is a development diagram of the cylindrical coordinate C0 schematically illustrating relationship between the visual field V on the cylindrical coordinate C0 and the objects B1 to B4. The visual field V has a substantially rectangular shape, and has an xy coordinate (local coordinate) in which an upper left corner part is set as an origin OP2. The xy axis is an axis extending from the origin OP2 in the horizontal direction, and the y axis is an axis extending from the origin OP2 in the vertical direction. The coordinate determining unit 313 is configured to execute processing of determining whether or not one of the objects B1 to B4 exists in the corresponding region of the visual field V.

The display control unit 314 is configured to execute processing of displaying (drawing) the objects on the cylindrical coordinate C0 corresponding to the orientation of the display unit 10 in the visual field V based on the output of the detecting unit 20 (that is, a determination result of the coordinate determining unit 313). For example, as illustrated in FIG. 8, in the case where current orientation of the visual field V overlaps with each of the display regions of the objects B1 and B2 on the cylindrical coordinate C0, images corresponding to the overlapped regions B10 and B20 are displayed in the visual field V (local rendering).

Figure 9A:
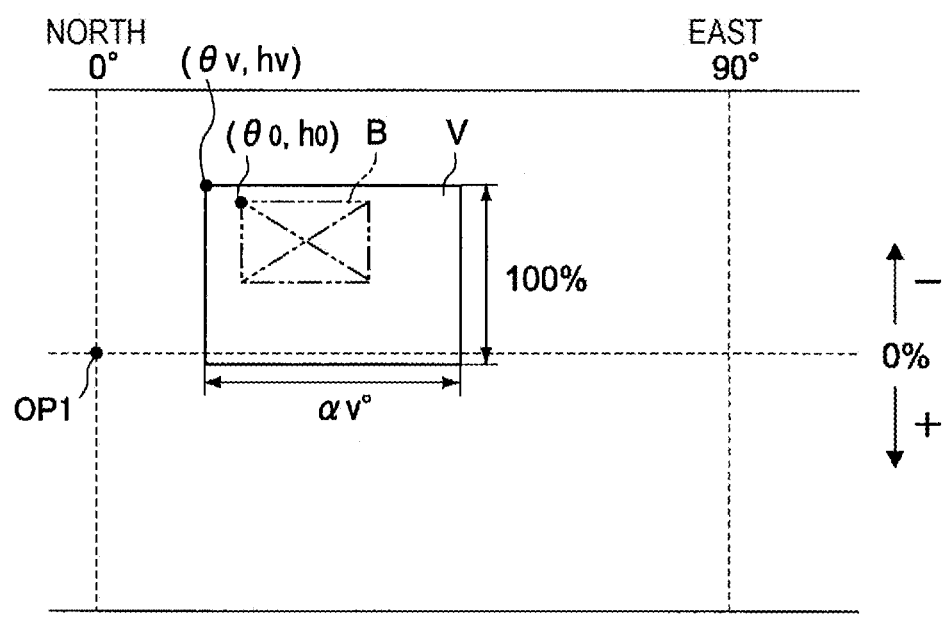
FIG. 9A is a diagram explaining a method for converting from cylindrical coordinate (world coordinate) to a visual field (local coordinate).
Figure 9B:
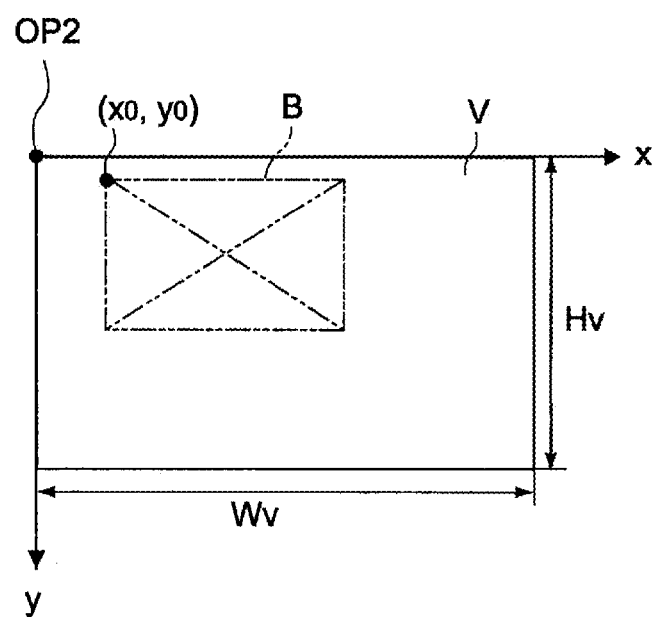
FIG. 9B is a diagram explaining a method for converting from cylindrical coordinate (world coordinate) to a visual field (local coordinate).

FIG. 9A and FIG. 9B are diagrams explaining a method for converting from the cylindrical coordinate C0 (world coordinate) to the visual field V (local coordinate).

As illustrated in FIG. 9A, a coordinate of a reference point of the visual field V on the cylindrical coordinate C0 is set at (θv, hv), and a coordinate of a reference point of the object B located within the region of the visual field V is set at (θ0, h0). The reference points of the visual field V and the object B may be set at any point, and, in this example, the reference points are set at upper left corner parts of the visual field V and the object B which have a rectangular shape. αv[°] is a width angle of the visual field V on the world coordinate, and the value of αv[°] is determined according to design or specifications of the display unit 10.

The display control unit 314 decides a display position of the object B in the visual field V by converting the cylindrical coordinate system (θ, h) into the local coordinate system (x, y). As illustrated in FIG. 9B, in the case where the height and width of the visual field V in the local coordinate system are respectively set at Hv and Wv, and the coordinate of the reference point of the object B in the local coordinate system (x, y) is set at (x0, y0), a conversion equation can be expressed as follows:

$$x0 = (\theta 0 - \theta v) \cdot Wv/\alpha v \quad (1)$$

$$y0 = (h0 - hv) \cdot Hv/100 \quad (2)$$

The display control unit 314 typically changes the display position of the object B within the visual field V by following change of the orientation or the posture of the display unit 10. This control is continued as long as at least part of the object B exists in the visual field V.

On the other hand, in recent years, in accordance with downsizing of the HMD, a display region of the HMD tends to be narrow. Further, in a see-through type head mounted display, for example, there is a case where it is desired to limit an information display region while securing a see-through region. In such a case, if the display position of the object B changes within the visual field V by following change of the orientation or the posture of the display unit 10 as described above, there is a case where it is difficult to maintain a state where the object B enters the visual field V. To solve such a problem, the HMD 100 of the present embodiment has an object display fixing function as will be described below.

<Object Display Fixing Function>
(1) Introduction of Non-Strict Attribute

The display control unit 314 is configured to, in the case where the orientation or the posture of the display unit 10 changes by a predetermined angle or greater, move the object within the visual field V according to the above-described change of the orientation or the posture, and, in the case where the above-described change of the orientation or the posture is less than the above-described predetermined angle, be able to execute processing of fixing the display position of the object in the visual field V.

In the present embodiment, a non-strict attribute may be introduced to the object. That is, the object B is not fixed at one location in the world coordinate system (cylindrical coordinate C0), but, in the case where a viewing direction of the user U is within a certain angular range, the object may be fixed and displayed in the local coordinate system (x, y) of the display unit 10. By executing such processing, it is possible to easily maintain a state where the object falls within the visual field V. Therefore, it is possible to restrict movement of the object caused by unnecessary change of the posture of the user U around the vertical axis or the horizontal axis, so that it is possible to improve visibility of the object.

The above-described predetermined angle may be an angle around the vertical axis (Z axis) or an angle around the horizontal axis (the X axis and/or the Y axis), or both angles. The value of the above-described predetermined angle can be set as appropriate, and is, for example, ±15°. The above-described predetermined angle may be the same between the angle around the vertical axis (first predetermined angle) and the angle around the horizontal axis (second predetermined angle) or may be different between the first predetermined angle and the second predetermined angle.

(2) First Grab Function

The display control unit 314 is configured to be able to execute processing of moving the object B to a predetermined position in the visual field V in the case where output change of the detecting unit 20 is equal to or less than a predetermined amount over a predetermined period.

In the present embodiment, because it is highly likely that the user refers to the object displayed in the visual field V in the case where output of the detecting unit 20 does not change over a predetermined period, visibility of the object may be improved by moving the object to a predetermined position in the visual field V.

The above-described predetermined period is not particularly limited, and is, for example, set at approximately 5 seconds. The above-described predetermined position is not particularly limited, and is, for example, set at a central part or a corner part of the visual field V or a position displaced to any direction of upper, lower, right and left directions. Further, the moved object may be displayed while being exaggerated by, for example, being enlarged.

This function may be used to fix and display the object B at a predetermined position in the local coordinate system (x, y) of the visual field V in the case where, for example, output change of the detecting unit 20 is not recognized for a predetermined period while the object is located at the center of the visual field V. In this case, in the case where the output of the detecting unit 20 exceeds a predetermined value, the object display fixing function is cancelled. In this event, the output value of the detecting unit 20 may be an output change amount corresponding to the above-described posture change of equal to or more than the predetermined angle of the display unit 10 around the predetermined axis, or may be other output change amounts.

(3) Second Grab Function

The display control unit 314 is configured to be able to execute processing of moving the object to a predetermined position in the visual field V in the case where input of a predetermined signal generated through operation of the user U is detected. Also in such a configuration, as with the above-described case, it is possible to improve visibility of the object and control display of an image according to intention of the user.

In this processing, by, for example, predetermined input operation to the input operation unit 305 or the mobile information terminal 200 being performed while the object is fit to the center of the visual field V, the object is fixed at the local coordinate system (x, y) of the visual field V. Further, by operation to the input operation unit 305, or the like, being performed again, the object returns to the world coordinate system, and the object display fixing function is cancelled.

(4) Face Blur Correction Function

The display control unit 314 is configured to be able to execute processing of, in the case where output change of the detecting unit 20 is equal to or higher than a predetermined frequency while the object is displayed at a predetermined position in the visual field V, disabling frequency components equal to or higher than the above-described predetermined frequency among the output of the detecting unit 20.

In the case where the object within the visual field V moves by following the change of the orientation or the posture of the display unit 10, there is a case where the object also follows fine blur of the face of the user U, which may degrade visibility of the object. To prevent this problem, it is also possible to prevent the object from following the posture change of the display unit 10 for frequency components equal to or higher than a predetermined frequency and fix the display position of the object in the visual field V (local coordinate system) for low frequency components lower than the predetermined frequency. As the above-described predetermined frequency, for example, a frequency corresponding to face blur of the user is set. By this means, it is possible to secure visibility of an image without being affected by fine face blur of the user.

Figure 10A:
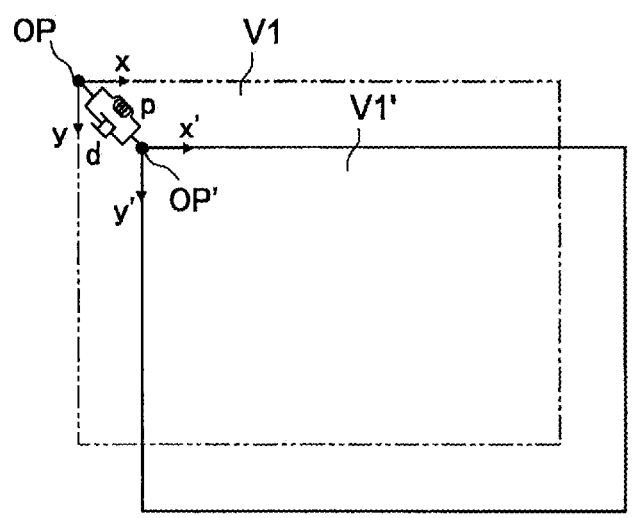
FIG. 10A is a schematic diagram explaining a face blur correction function in the above-described head mounted display.
Figure 10B:
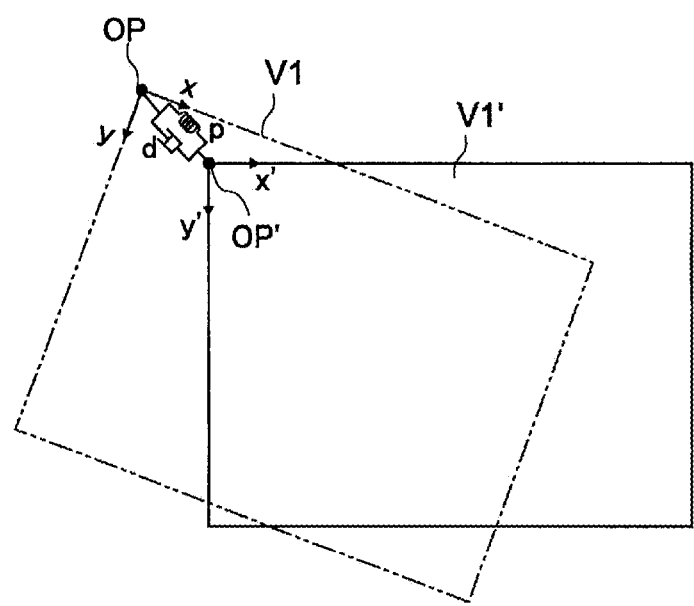
FIG. 10B is a schematic diagram explaining a face blur correction function in the above-described head mounted display.

FIG. 10A and FIG. 10B are schematic diagrams explaining the face blur correction function. In the drawings, V1 indicates a local coordinate system at a certain time point, and V1' indicates a face blur correction coordinate system corresponding to V1. OP and OP' indicate origins of V1 and V1'.

In the case where the face blur correction function is effective, an object is placed on the face blur correction coordinate system. The face blur correction coordinate system is followed and controlled by PD control with respect to the local coordinate system (x, y) of the visual field V. The PD control is a type of feedback control and, typically, refers to control for performing convergence to a set value by combining proportional control and differential control. In FIG. 10A and FIG. 10B, among a spring (p) and a damper (d) connected between the visual field V and the visual field V', the spring (p) corresponds to a P component of the PD control, and the damper (d) corresponds to a D component of the PD control.

As an example of a method for calculating following control, it is assumed that a point in the local coordinate system V1 at a certain time point t is (x(t), y(t)), and a point of the face blur correction coordinate system V1' corresponding to the point is (x'(t), y'(t)). Further, it is assumed that a point of the local coordinate system V1 before a sample cycle (Δt) is (x(t−Δt), y(t−Δt)), and a point of the face blur correction coordinate system V1' corresponding to the point is (x'(t−Δt), y'(t−Δt)). Assuming that a difference between the corresponding points is (Δx(t), Δy(t)), they can be expressed as follows:

$$\Delta x(t) = x'(t) - x(t) \tag{3}$$

$$\Delta y(t) = y'(t) - y(t) \tag{4}$$

Assuming that a difference in velocity between the corresponding points is (Δvx(t), Δvy(t)), they can be expressed as follows:

$$\Delta vx(t) = \{Ax'(t) - \Delta x'(t-\Delta t)\} - \{\Delta x(t) - \Delta x(t-\Delta t)\} \tag{5}$$

$$\Delta vy(t) = \{Ay'(t) - Ay'(t-\Delta t)\} - \{\Delta y(t) - \Delta y(t-\Delta T)\} \tag{6}$$

At that time, an amount that the face blur correction function coordinate system V1 should follow the local coordinate system V1 and move (Δp(t), Δq(t)) can be expressed as follows:

$$\Delta p(t) = Px \times \Delta x(t) + Dx \times \Delta vx(t) \tag{7}$$

$$\Delta q(t) = Py \times \Delta y(t) + Dy \times \Delta vy(t) \tag{8}$$

Here, Px and Py are differential gain constants with respect to x and y, and Dx and Dy are velocity gain constants with respect to x and y.

Even in the case where the local coordinate system V1 rotates, the face blur correction coordinate system V1' does not follow rotational components (FIG. 10B). That is, even in the case where the face is inclined around the axis of the anterior-posterior direction of the user, the inclination of the object is restricted.

The above-described object display fixing functions (1) to (4) may be individually applied or may be applied in combination as appropriate. For example, it is possible to apply combination of any one of the above-described (1) to (3) and the above-described (4).

<Region Limiting Function>

Subsequently, a region limiting function of the HMD 100 will be described.

In recent years, in the see-through type head mounted display, for example, there is a case where it is desired to limit an information display region while securing a see-through region. In this case, there is a case where an object image is difficult to enter a field of view. Therefore, in the present embodiment, a region limiting function of the world coordinate system is provided to improve retrieval performance of an object.

As described above, the coordinate setting unit 311 has a function as a region limiting unit which can limit a region (H) along the Z axis direction in the cylindrical coordinate C0 surrounding the display unit 10 according to a region (Hv) in the height direction of the visual field V (see FIG. 5A). By limiting the height H of the cylindrical coordinate C0, it is possible to improve retrieval performance and visibility of an image within a horizontal visual field of the user.

A limiting amount in the height direction of the cylindrical coordinate C0 is not particularly limited, and, in the present embodiment, the height of the cylindrical coordinate C0 is limited to a height (H1) which is the same as the height Hv of the visual field V. In the case where the region limiting function is made effective, the display control unit 314 is configured to be able to display the objects B1 to B4 while changing at least a h coordinate in the cylindrical coordinate system (θ, h) so that the respective objects B1 to B4 are located within the cylindrical coordinate C0 for which the region is limited.

Figure 11A:
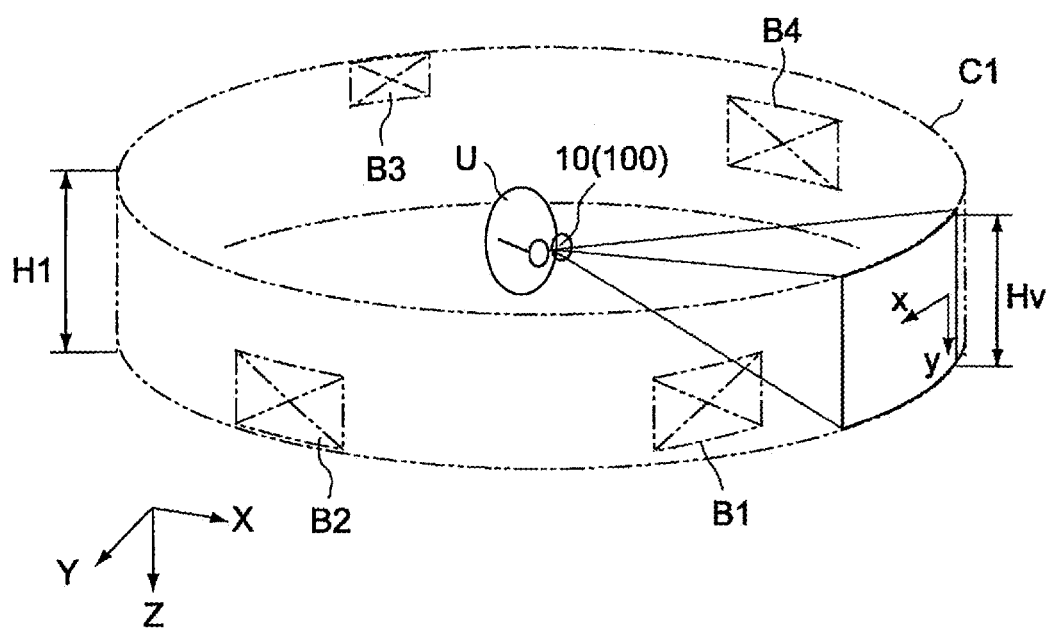
FIG. 11A is a schematic diagram illustrating relative positional relationship between an object associated with cylindrical coordinate for which a region is limited and a visual field.
Figure 11B:
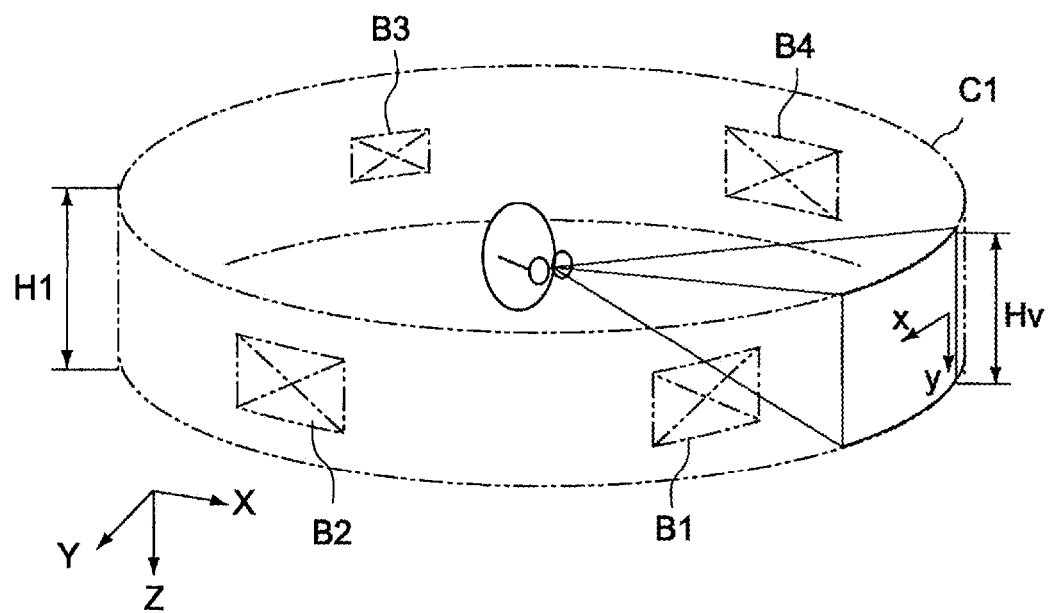
FIG. 11B is a schematic diagram illustrating relative positional relationship between an object associated with cylindrical coordinate for which a region is limited and a visual field.

FIG. 11A and FIG. 11B are schematic diagrams illustrating relative positional relationship between the objects B1 to B4 associated with the cylindrical coordinate C1 for which the region is limited to the height H1 and the visual field V. Because the user U can view the objects B1 to B4 associated with all orientations by only changing posture around the Z axis (vertical axis), retrieval performance of the objects B1 to B4 is dramatically improved.

While, in the example of FIG. 11A, all the objects B1 to B4 are placed within the cylindrical coordinate C1, the present disclosure is not limited to this, and at least one object may be placed within the cylindrical coordinate C1. Further, the heights of the objects B1 to B4 placed in the cylindrical coordinate C1 are not particularly limited, and can be each arbitrarily set.

Further, while, in the example of FIG. 11, the whole of the objects B1 to B4 is placed within the cylindrical coordinate C1, it is also possible to employ a configuration where at least part of the objects B1 to B4 is displayed in the visual field V. By this means, it is possible to easily recognize the image existing in given orientation. In this case, the height H1 of the cylindrical coordinate C1 can be changed to a height higher than the height H1 through input operation to the input operation unit 305, or the like, by the user U. By this means, it is possible to view the whole objects.

Whether the above-described region limiting function is made effective or ineffective can be selected through setting by the user U. In the HMD 100 of the present embodiment, a state in which the region limiting function is effective using the world coordinate system as the cylindrical coordinate C1 is set as a normal mode, and the region limiting function can be changed (for example, the height H can be changed) or the state can be switched to an ineffective state through voluntary setting change by the user.

On the other hand, the control unit 30 may be configured to be able to limit the region in the height direction on the cylindrical coordinate according to the region (Hv) of the visual field V in the height direction in the case where input of a predetermined signal generated by the operation of the user U is detected and execute processing of aligning all the objects to be displayed in the visual field V at the same height in the visual field V.

That is, in the case where the region limiting function is ineffective, or in the case where a cylindrical coordinate other than the cylindrical coordinate C1 is set as the world coordinate system, the world coordinate system is forcibly switched to the cylindrical coordinate C1 through input operation to the input operation unit 305, or the like, by the user U. Further, the respective objects B1 to B4 are placed within the cylindrical coordinate C1 so that all the objects B1 to B4 are displayed at the same height in the visual field V as illustrated in FIG. 11B. By this means, it is possible to further improve visibility of an image displayed in the visual field.

<Image management function>

Subsequently, an image management function of the HMD 100 will be described.

As described above, in the present embodiment, the mobile information terminal 200 is used for transmission of object data to the control unit 30. The mobile information terminal 200 includes a position information acquiring unit 207 configured to measure the position of the user U (display unit 10), and an image acquiring unit including a transmitting/receiving unit 203 configured to be able to acquire a plurality of objects (B1 to B4) to be stored in the memory 302 of the control unit 30 from the server N, or the like.

In the present embodiment, the control unit 30 requests the mobile information terminal 200 to transmit one or more pieces of object data selected from a plurality of pieces of object data, and the mobile information terminal 200 transmits the requested object data to the control unit 30.

Here, in order to smoothly draw the objects in the visual field V of the display unit 10, communication speed between the mobile information terminal 200 and the control unit 30 and latency (a period from when transmission is requested until when an image is actually transmitted) become problems. In the present embodiment, in order to avoid the above-described problems of the communication speed and latency, the control unit 30 (in the present example, the image managing unit 312) is configured as follows.

First, the control unit 30 is configured to acquire a plurality of pieces of necessary object data from the mobile information terminal 200 in advance. By this means, a drawing timing of the object in the visual field V can be controlled at the control unit 30 side, so that it is possible to provide a necessary object to the user U at an appropriate timing regardless of a communication environment, or the like.

Further, the control unit 30 is configured to request the mobile information terminal 200 to preferentially transmit an object associated with a coordinate position closer to the display region of the visual field V on the cylindrical coordinate C0. By preferentially acquiring object data which is highly likely to be presented to the visual field V in this manner, it is possible to inhibit delay of display of the object in the visual field V.

At this time, the image managing unit 312 is configured to be able to execute processing of first setting one or a plurality of frames corresponding to the positions of the objects on the world coordinate and then placing an object with higher priority in the frame. Note that "placing a frame or an object on the world coordinate" means associating a frame or an object on the world coordinate.

Figure 12A:
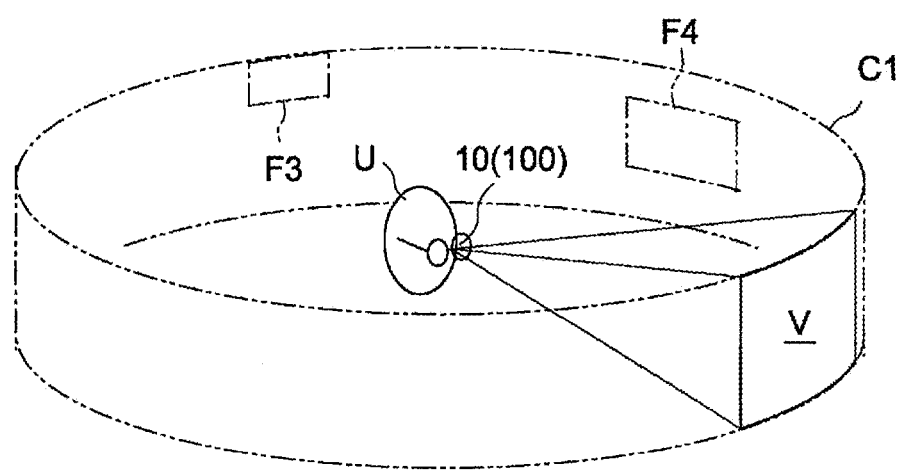
FIG. 12A is a schematic diagram explaining procedure for placing an object on the cylindrical coordinate for which a region is limited.
Figure 12B:
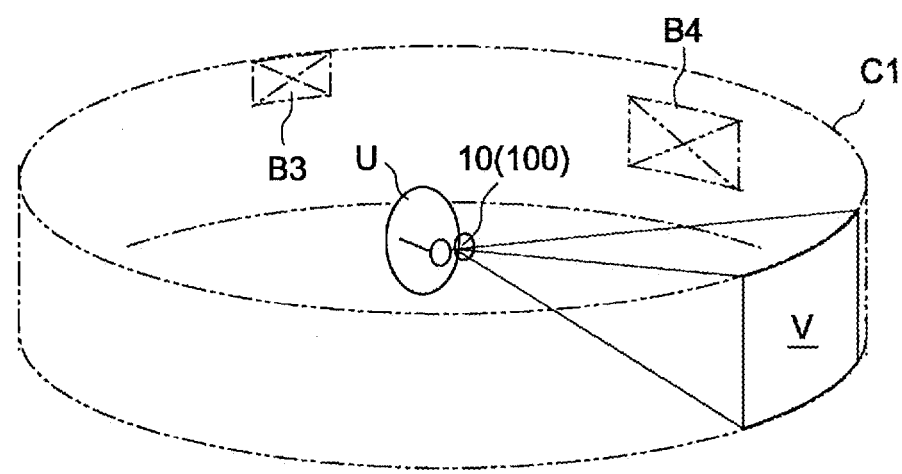
FIG. 12B is a schematic diagram explaining procedure for placing an object on the cylindrical coordinate for which a region is limited.
Figure 13:
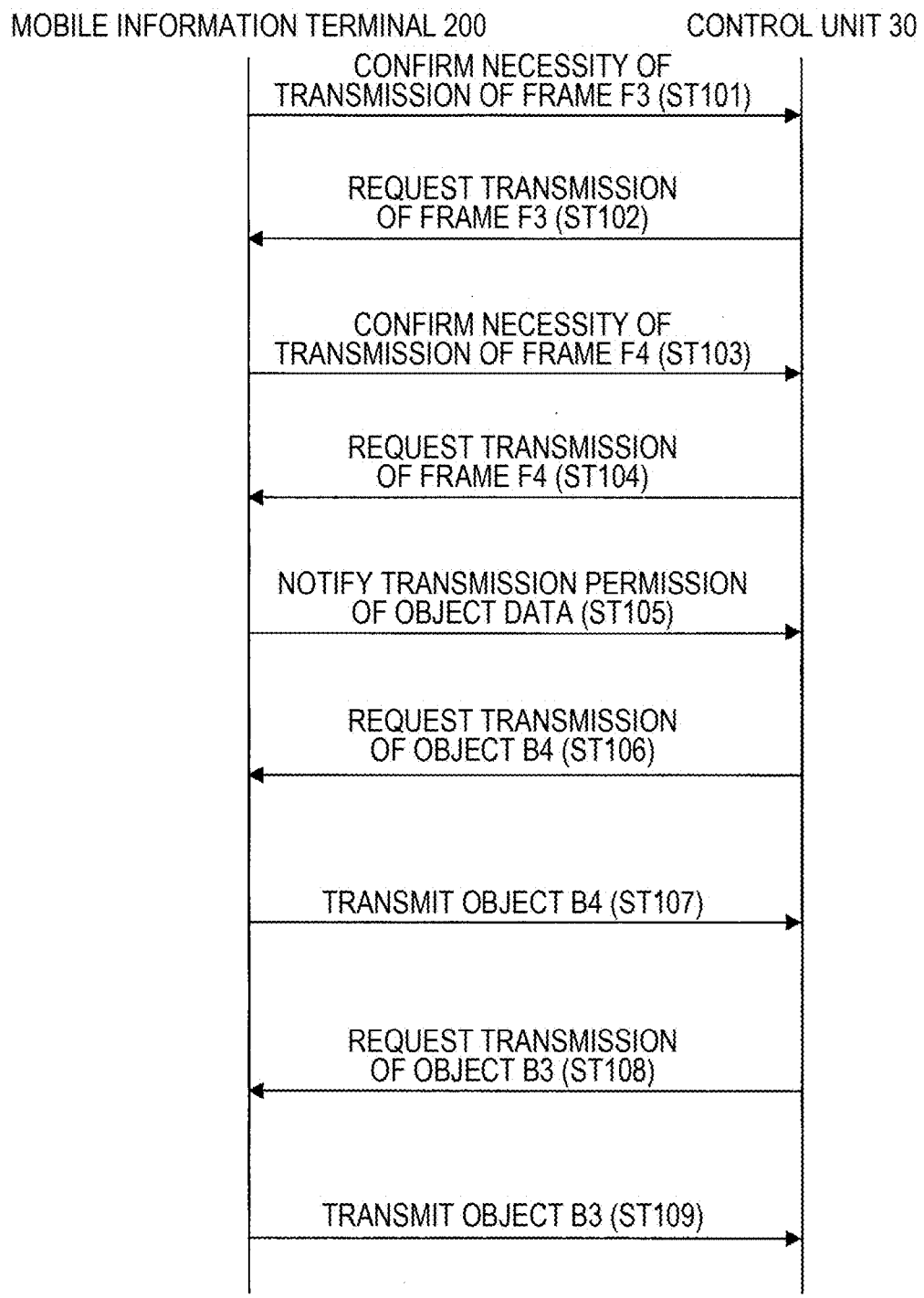
FIG. 13 is a sequence diagram explaining procedure for placing an object on the cylindrical coordinate for which a region is limited.

As an example, procedure of placing the objects B3 and B4 on the cylindrical coordinate C1 for which the region is limited to the height H1 is illustrated in FIG. 12A, FIG. 12B and FIG. 13. Note that the following procedure can be also applied to the cylindrical coordinate C0 for which the region is not limited or other world coordinate systems configured with three-dimensional coordinates in a similar manner. In the present embodiment, image data (object data) of the object and frame data which defines the coordinate position of the object are each transmitted to the control unit 30 from the mobile information terminal 200. Because a data amount of the frame data is smaller than a data amount of the object data, it requires less time to acquire frame data compared to object data. Therefore, communication for acquiring frame data is performed first, and, then, communication for acquiring object data is performed in order of priority.

(Frame Registration Phase)

First, the mobile information terminal 200 confirms necessity of transmission of a frame F3 for placing the objet B3 to the control unit 30 (step 101), and, in response to this, the control unit 30 requests the mobile information terminal 200 to transmit the frame F3 (step 102). The control unit 30 places the frame F3 at a corresponding position on the cylindrical coordinate C1 by storing the received frame F3 in the memory 302.

Subsequently, the mobile information terminal 200 confirms necessity of transmission of a frame F4 for placing the objet B4 to the control unit 30 (step 103), and, in response to this, the control unit 30 requests the mobile information terminal 200 to transmit the frame F4 (step 104). The control unit 30 places the frame F4 at a corresponding position on the cylindrical coordinate C1 by storing the received frame F4 in the memory 302. After all frame data is transmitted, the mobile information terminal 200 notifies the control unit 30 of transmission permission of the object data (step 105).
(Data Acquisition Phase)

The control unit 30 shifts the phase to a data acquisition phase by being triggered by transmission permission notification of the above-described object data. Specifically, for example, the control unit 30 determines a frame closest to the current orientation of the visual field V (display unit 10) (in the present example, a frame F4) based on the output of the detecting unit 20 and requests transmission of image data of the object (in the present example, the object B4) belonging to the frame (step 106). In response to this request, the mobile information terminal 200 transmits image data of the object B4 to the control unit 30 (step 107). The control unit 30 places the object B4 within the frame F4 on the cylindrical coordinate C1 by storing the received image data of the object B4 in the memory 302.

Subsequently, the control unit 30 determines a frame closest next after the frame F4 to the orientation of the visual field V (in the present example, a frame F3) and requests transmission of image data of an object (in the present example, the object B3) belonging to the frame (step 108). In response to this request, the mobile information terminal 200 transmits image data of the object B3 to the control unit 30 (step 109). The control unit 30 places the object B3 within the frame F3 on the cylindrical coordinate C1 by storing the received image data of the object B3 in the memory 302.

In this manner, the control unit 30 is configured to be able to determine priority of acquisition of the objects using the current visual field V as a reference by registering frame data of the objects in advance on the cylindrical coordinate C1 and sequentially acquire image data from an object with high priority (closest to the visual field V) based on the determination result.

Here, in the case where the object is an animation image, priorities may be set while current time and animation frame time are taken into account. For example, the control unit 30 is configured to request the mobile information terminal 200 to transmit at least part of all images configuring the animation image at one time. In this manner, also in the case where the object is an animation image, by caching images of the required number (for example, images up to 1 second later) while taking into account the frame rate, it is possible to dynamically deal with such a case.

In order to construct the system as described above, it is necessary to increase capacity of the memory 302 which holds the object data. However, by dynamically performing processing of preferentially holding object data which is highly required and discarding data which is less required, it is possible to perform appropriate object display even with an object data amount which cannot be all held. Note that the discarded data only has to be acquired again when the data becomes necessary.

That is, the control unit 30 may be configured to, for all the objects stored in the memory 302, regularly evaluate distances between the coordinate positions and the display region of the visual field V and delete an object at the coordinate position farthest from the display region of the visual field V from the memory 302. Specifically, priorities of all the objects are each evaluated based on relative positional relationship between all the objects on the cylindrical coordinate C1 and the current orientation of the visual field V, and object data with low priority is deleted. By this means, it is possible to secure a storage region for the object data close to the visual field V.

A method for evaluating priority is not particularly limited, and, for example, the priority can be evaluated based on the number of pixels between the central position of the visual field V and the central position of the object on the cylindrical coordinate C1. Further, in the case of an animation image, an evaluation value may be multiplied by a coefficient based on reproduction time.
[Operation of HMD]

An example of operation of the HMD system including the HMD 100 according to the present embodiment configured as described above will be described next.

Figure 14:
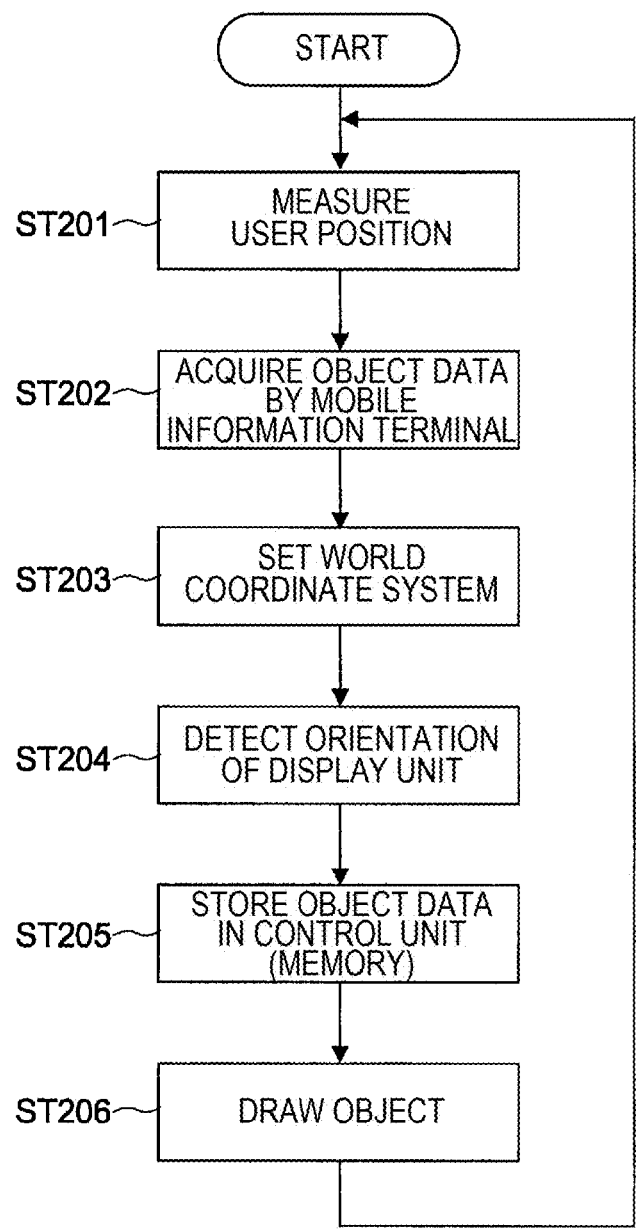
FIG. 14 is a flowchart explaining outline of operation of the above-described system.

FIG. 14 is a flowchart explaining outline of operation of the HMD system according to the present embodiment.

First, the current position of the user U (display unit 10) is measured using the position information acquiring unit 207 of the mobile information terminal 200 (step 201). The position information of the display unit 10 is transmitted to the server N. Then, the mobile information terminal 200 acquires object data relating to a predetermined subject existing in real space around the user U from the server N (step 202).

Then, the mobile information terminal 200 notifies the control unit 30 that transmission of object data is ready. The control unit 30 (in the present example, the coordinate setting unit 311) sets a height (H) and a radius (R) of the cylindrical coordinate C0 as the world coordinate system according to types, or the like, of the object data (step 203).

In this case, in the case where the region limiting function according to the height (Hv) of the visual field V provided by the display unit 10 is effective, the coordinate setting unit 311 sets, for example, the cylindrical coordinate C1 illustrated in FIG. 12 A as the world coordinate system.

Subsequently, the control unit 30 detects the orientation of the visual field V based on the output of the detecting unit 20 (step 204), acquires object data from the mobile information terminal 200 and stores the object data in the memory 302 (step 205).

Figure 15:
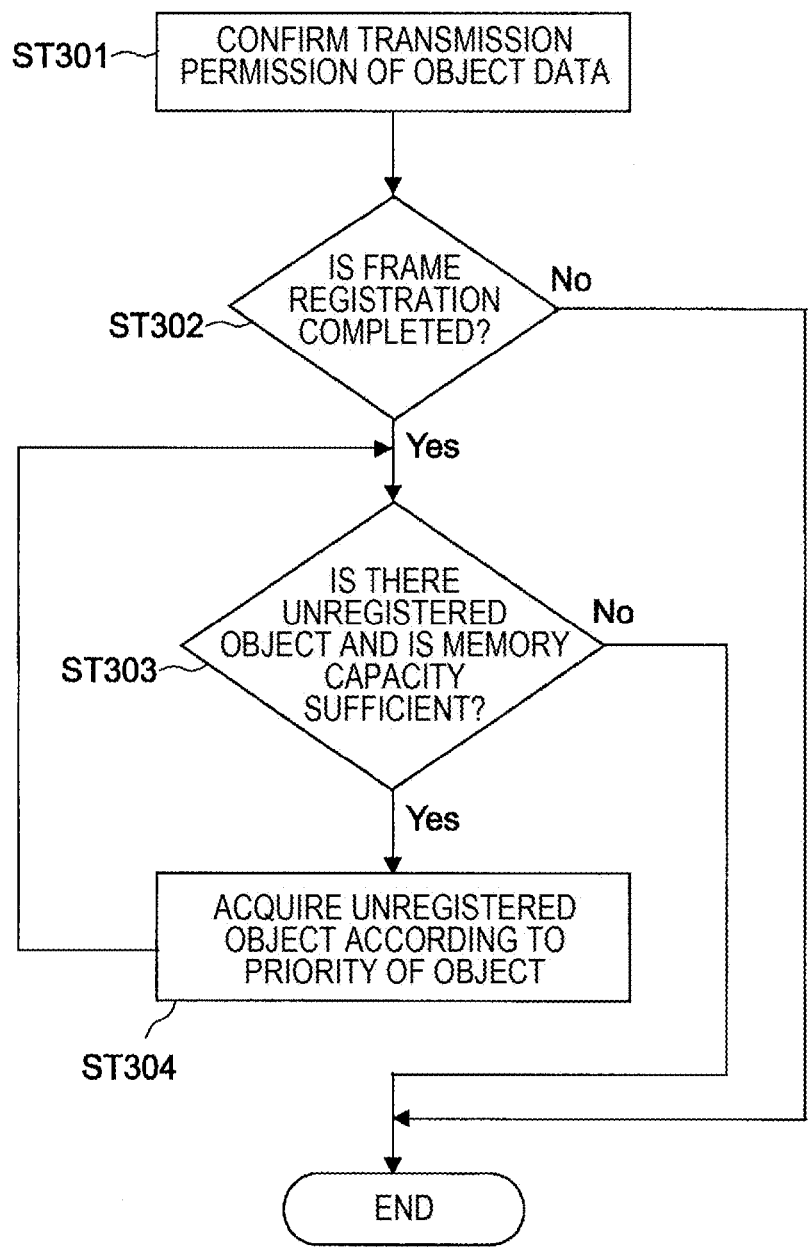
FIG. 15 is a flowchart illustrating an example of procedure for receiving object data by the above-described control unit.

FIG. 15 is a flowchart illustrating an example of procedure for receiving object data by the control unit 30.

After transmission permission confirmation of the object data is received from the mobile information terminal 200 (step 301), the control unit 30 determines whether frame registration for all the objects is completed (step 302), because if frame registration for all the objects is not completed, the coordinate positions of the objects are not determined, and priorities of the objects cannot be evaluated. In the case where frame registration is not completed, the processing is finished, and the above-described frame registration processing for not completed frames is executed.

On the other hand, in the case where frame registration for all the objects is completed, whether or not there is an object which is not received and capacity of the memory 302 are confirmed (step 303). In the case where there is an unregistered object and memory capacity is sufficient, the unregistered object is received and stored in the memory 302 (step 304).

Note that the control unit 30 regularly evaluates priorities of objects within the memory 302 and deletes an object with a low evaluation value as necessary.

In the case where object data exists in the corresponding region of the visual field V on the cylindrical coordinate C0, the control unit 30 displays (draws) the object at the corresponding position of the visual field V through the display unit 10 (step 206). Any of the above-described object display fixing function may be applied upon display of the object in the visual field V.

Figure 16:
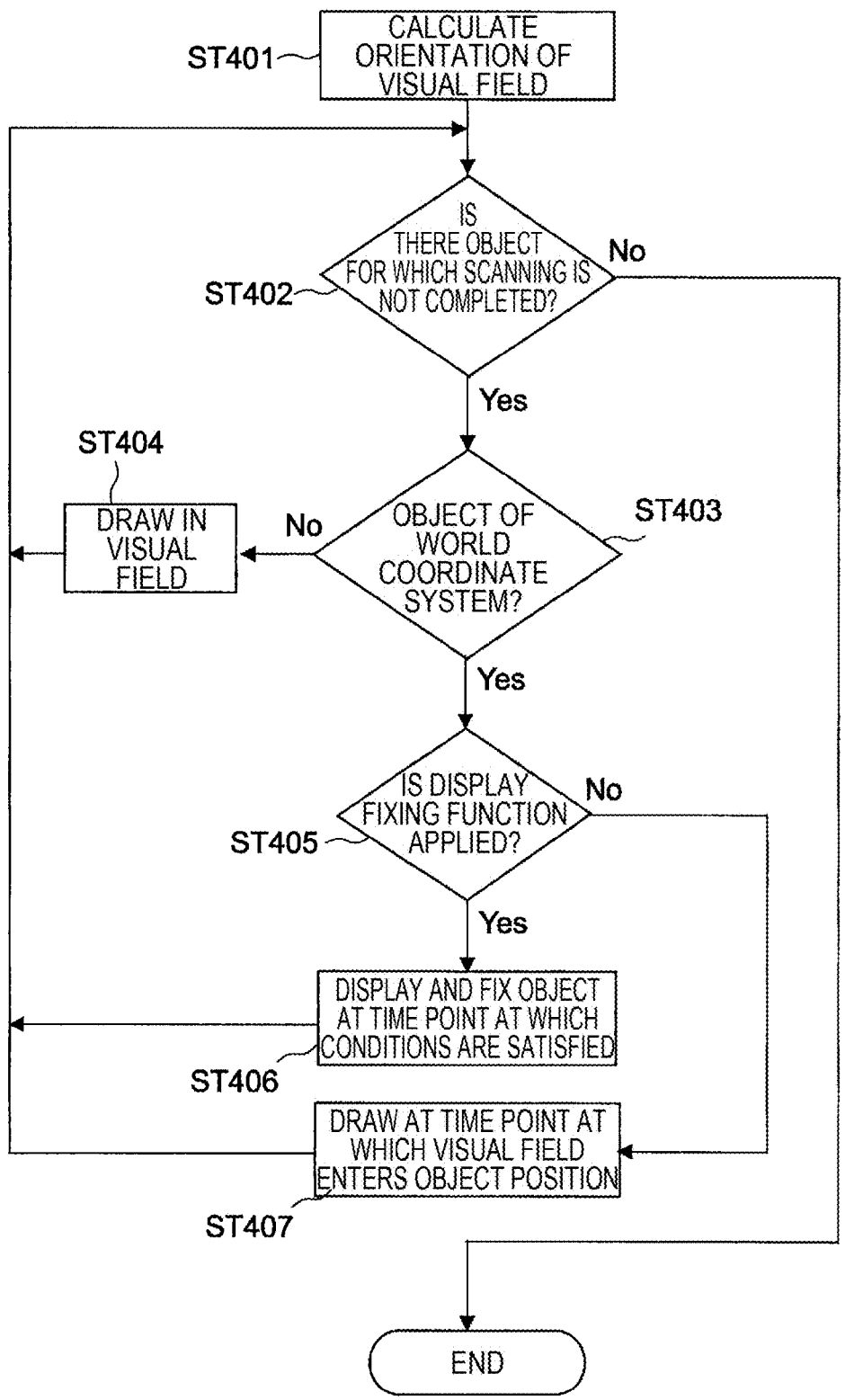
FIG. 16 is a flowchart illustrating an example of procedure for drawing an object in a visual field by the above-described control unit.

FIG. 16 is a flowchart illustrating an example of procedure for drawing an object in the visual field V by the control unit 30.

The control unit 30 calculates the current orientation of the visual field V based on the output of the detecting unit 20 (step 401). The orientation of the visual field V is converted into the world coordinate system (θ, h), and which position on the cylindrical coordinate C0 the orientation corresponds is monitored.

Then, the control unit 30 determines whether there is an object for which scanning is not completed among all the objects stored in the memory 302 (step 402). The above-described scanning is performed for all the objects stored in the memory 302 every time the screen is updated.

In the case where there is an object for which scanning is not completed, it is determined whether the object is an object of the world coordinate system (step 403), and, in the case where the determination is "No", the object is drawn in the visual field V (step 404).

On the other hand, in the case where the determination is "Yes" in step 403, it is determined whether any of the above-described object display fixing functions (for example, the first grab function) is applied for the object (step 405). In the case where the function is applied, the object is fixed and displayed in the visual field V at a time point at which predetermined conditions are satisfied (step 406). On the other hand, in the case where none of the display fixing functions is applied, the object is drawn in the visual field V at a time point at which the visual field V enters the object position (step 407).

The above-described processing is repeated thereafter. By this means, it is possible to provide the latest object according to the current position of the user U to the user U via the display unit 10.

Application Example

An application example of the HMD 100 of the present embodiment will be described below.

Application Example 1

In the case where display forms of images provided via the visual field V are uniform, some attributes (types) of information shown by the images make the images useless for the user. Therefore, the display control unit 314 is configured to acquire information relating to relative position between the display unit 10 and the subjects A1 to A4 and control display forms of images displayed in the visual field V according to change of the above-described relative position.

Figure 17:
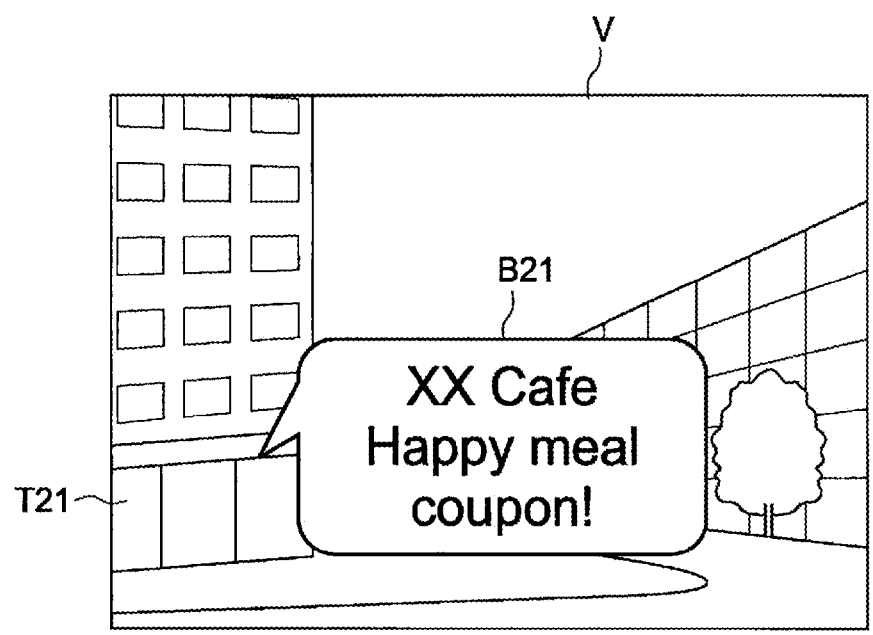
FIG. 17 is a pattern diagram of a visual field explaining an application example in the above-described head mounted display.

FIG. 17 illustrates a display form of the object (image) B21 relating to a subject T21. The subject T21 is, for example, a downtown coffee shop, and the object B21 displays that a specific coupon can be utilized as information relating to the subject T21. There is a case where it is desired to display such an object including character information, or the like, at a certain size regardless of a distance between the user and the subject.

In the present example, the display control unit 314 acquires information relating to a relative distance between the display unit 10 and the subject T21 as information relating to a relative position between the display unit 10 and the subject T21 via the detecting unit 20 and the mobile information terminal 30. The display control unit 314 is configured to change the position of the object B21 displayed in the visual field V according to change of the above-described relative distance.

By this means, also in the case where the subject T21 is far from the user, the user can view the information relating to the subject T21 and can recognize the position of the subject T21 from an index position of the object B21. Further, as the distance between the user and the subject T21 is smaller, the size or the position of the subject T21 in the visual field V also changes. In this event, because the display position of the object B21 also changes, the user can easily specify the position of the subject T21.

Change of the display position of the object B21 is executed, for example, in the case where the distance between the user and the subject changes by a predetermined amount or more. For example, in the case where the relative position between the user and the subject changes by a predetermined amount or more (for example, 10 meters or more), redisplay (re-rendering) of the object B21 in the visual field V is executed. By this means, it is possible to reduce load of processing such as operation at the control unit 30 compared to the case where redisplay of the object is always executed at minute time intervals.

Figure 18:
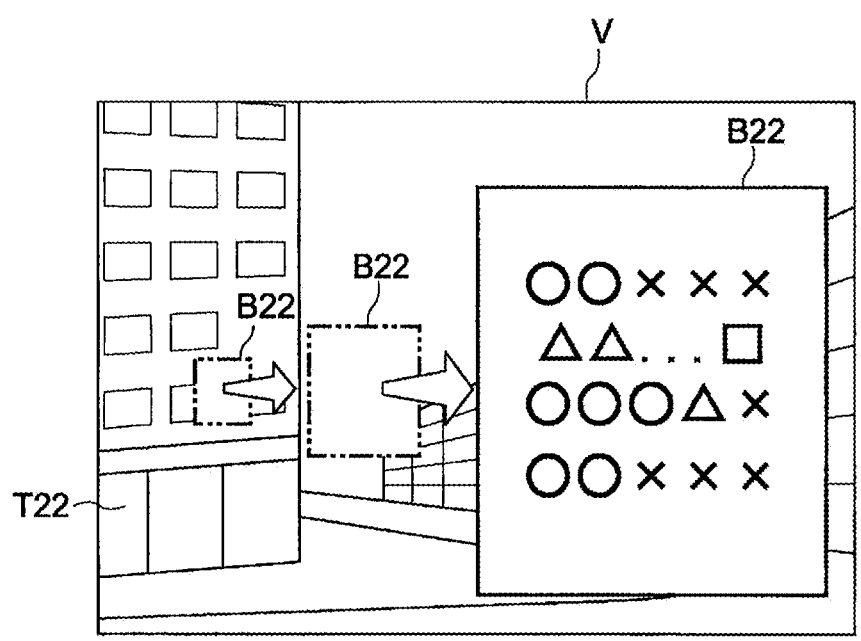
FIG. 18 is a pattern diagram of a visual field explaining an application example in the above-described head mounted display.

On the other hand, FIG. 18 illustrates change of a display form of an object (image) B22 relating to a subject T22. In the present example, the display control unit 314 is configured to change the position and the size of the object B21 displayed in the visual field V according to change of a relative distance between the display unit 10 and the subject T22.

In the present example, there are several stages of display levels according to the distance between the user and the subject. FIG. 18 illustrates an aspect where the same object B22 moves rightward while being enlarged stepwise as the user approaches the subject T22. The object displayed previously disappears in accordance with display of the subsequent object. The above-described change of the display level may include a stage in which only the position or the size of the display position of the object changes.

According to such a display form of the object, it is possible to display information relating to a subject existing close to the user preferentially over information relating to a subject existing at a position away from the user in the visual field V. Note that, as the priority of the object displayed in the visual field V, other than the distance information, display information (destination information, update information, geographic information) of other attributes may be used as a reference parameter.

Figure 19:
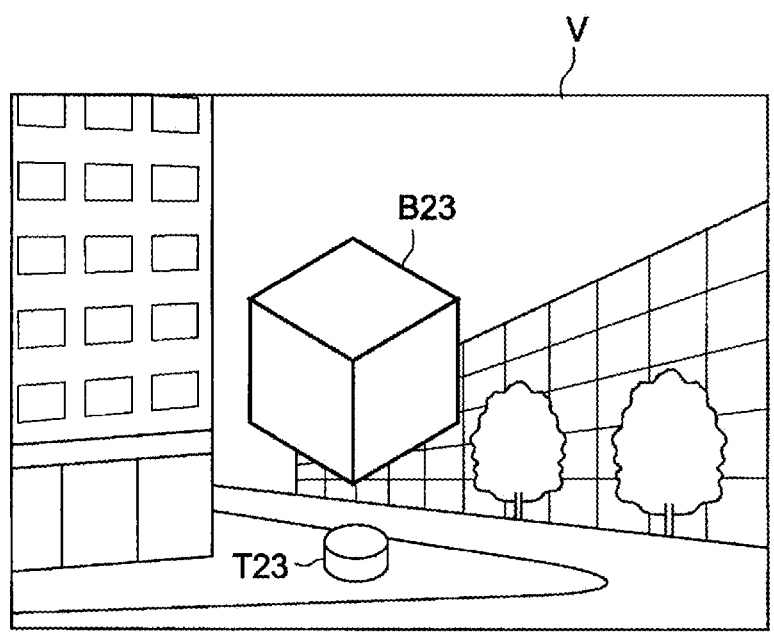
FIG. 19 is a pattern diagram of a visual field explaining an application example in the above-described head mounted display.

FIG. 19 illustrates a display form of an object (image) B23 relating to a subject T23. In the present example, the object B23 is a three-dimensional image, and the display control unit 314 acquires information relating to an angular position of the display unit 10 centered on the subject T23 as information relating to a relative position between the display unit 10 and the subject T23 via the detecting unit 20 and the mobile information terminal 30. The display control unit 314 is configured to change the orientation of the object B21 displayed in the visual field V in a three-dimensional manger according to change of the above-described angular position.

According to such a display form of the object, for example, it is possible to display an aspect where the object B23 rotates in a horizontal plane by the user walking around the subject T23. For example, in the case where the subject T23 is a historic site or spot, a state of that day may be drawn in a three-dimensional manner as the object B23, or in the case where the subject T23 is a planned construction site of a building, the building to be constructed may be drawn as the object B23.

In this case, the memory 302 stores a plurality of images relating to a predetermined subject, and the display control unit 314 is configured to select an image to be displayed in the visual field V from the plurality of images according to operation of the user.

Figure 20:
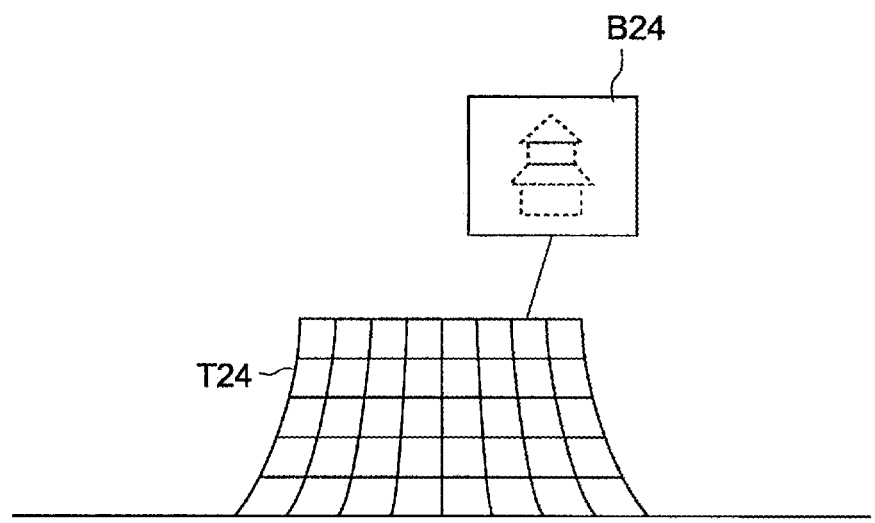
FIG. 20 is a pattern diagram of a visual field explaining an application example in the above-described head mounted display.
Figure 21:
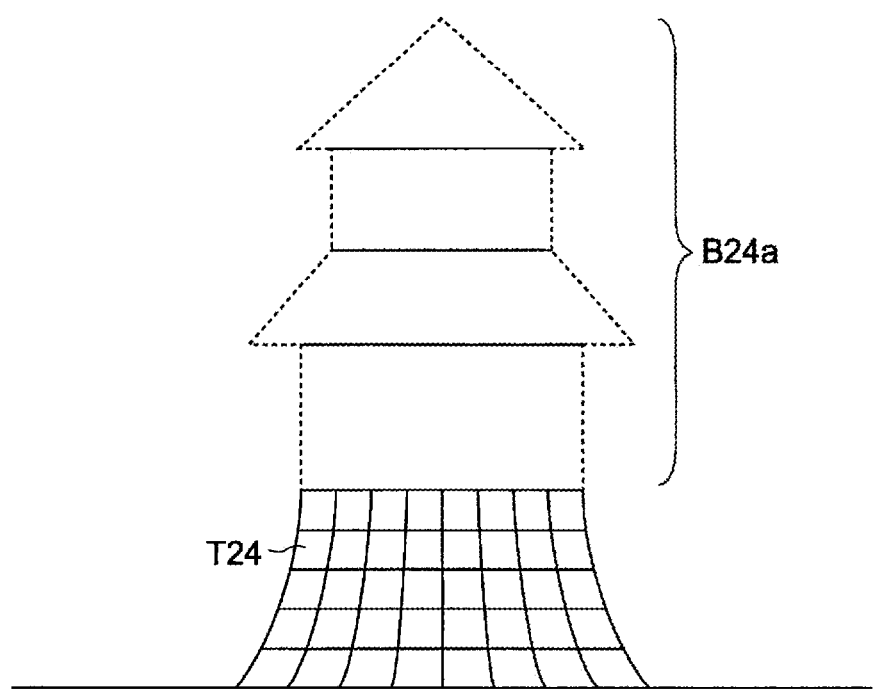
FIG. 21 is a pattern diagram of a visual field explaining an application example in the above-described head mounted display.
Figure 22:
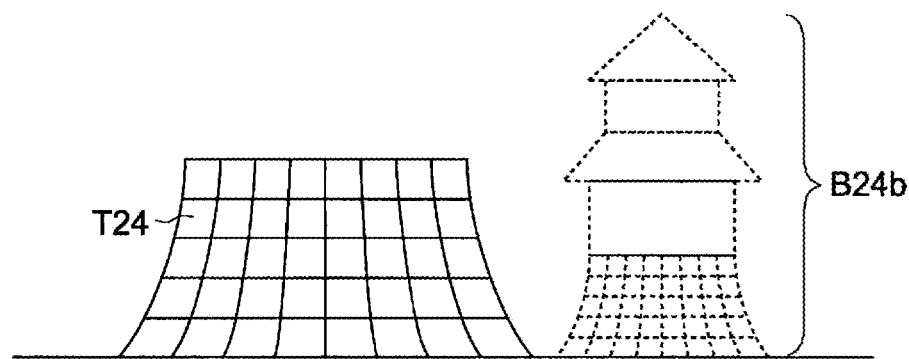
FIG. 22 is a pattern diagram of a visual field explaining an application example in the above-described head mounted display.

For example, as illustrated in FIG. 20, in the case where the subject T24 is a castle ruin in a certain sightseeing area, an object B24 including information relating to the castle ruin is displayed in the visual field V. The object B24 displays that there is an image of a reproduced castle of that day in a predetermined aspect. Then, through the operation of the input operation unit 305 by the user, the object B24 is switched to an object B24a which is an image of a reproduced aspect of the castle of that day as illustrated in FIG. 21. Alternatively, the object B24 is switched to an object B24b which is an image of a reproduced aspect or the position of the castle before there was a castle through the above-described operation.

Note that image data of the objects B24a and B24b is acquired by, for example, sightseeing area application which can be downloaded from a server of the local government being installed to the mobile information terminal 200.

Application Example 2

If a plurality of images are displayed in the visual field V, there is a case where it is impossible to appropriately present information to the user by visibility of the images being inhibited. Therefore, the display control unit 314 is configured to extract an image including information matching at least one display condition set by the user from the memory 302 (storage unit) and selectively display the extracted image in the visual field V.

In the present example, filtering is performed by utilizing an attribute parameter of an object, and it is decided whether or not the object is projected (drawn) on the cylindrical coordinate C0. Examples of the attribute parameter of the object include the following:
(1) distance from the user (for example, an object located within 100 meters)
(2) degree of importance (for example, destination, current location of friend, traffic jam information)
(3) category (for example, sightseeing spot, convenience store)
(4) update time (for example, board information)
(5) history time (for example, historic site picked up using time information as a reference)

As a method for utilizing filtering, for example, filtering conditions are registered in a scenario mode prepared in advance, and only an object which matches the filtering conditions is allowed to be displayed in the visual field V.

The scenario mode and the filtering conditions are input to, for example, the mobile information terminal 200 by the user.

Examples of the scenario mode include the following:
(a) sightseeing mode (for example, sightseeing spots within a radius of 1 kilometers are displayed)
(b) historic site search mode (for example, historic sites existing in the Edo period within a radius of 10 kilometers are displayed)
(c) new information display mode (for example, 20 sites which are lately updated within a radius of 10 kilometers are displayed)
(d) friend search mode (for example, 5 friends being close to the user are displayed)

For example, in the case of the above-described (a), the above-described attribute parameters (1) and (3) are input as the filtering conditions. In a similar manner, in the case of the above-described (b), (1) and (5) are input, in the case of the above-described (c), (1) and (4) are input, and in the case of the above-described (d), (1) and (2) are input as the filtering conditions.

Figure 23:
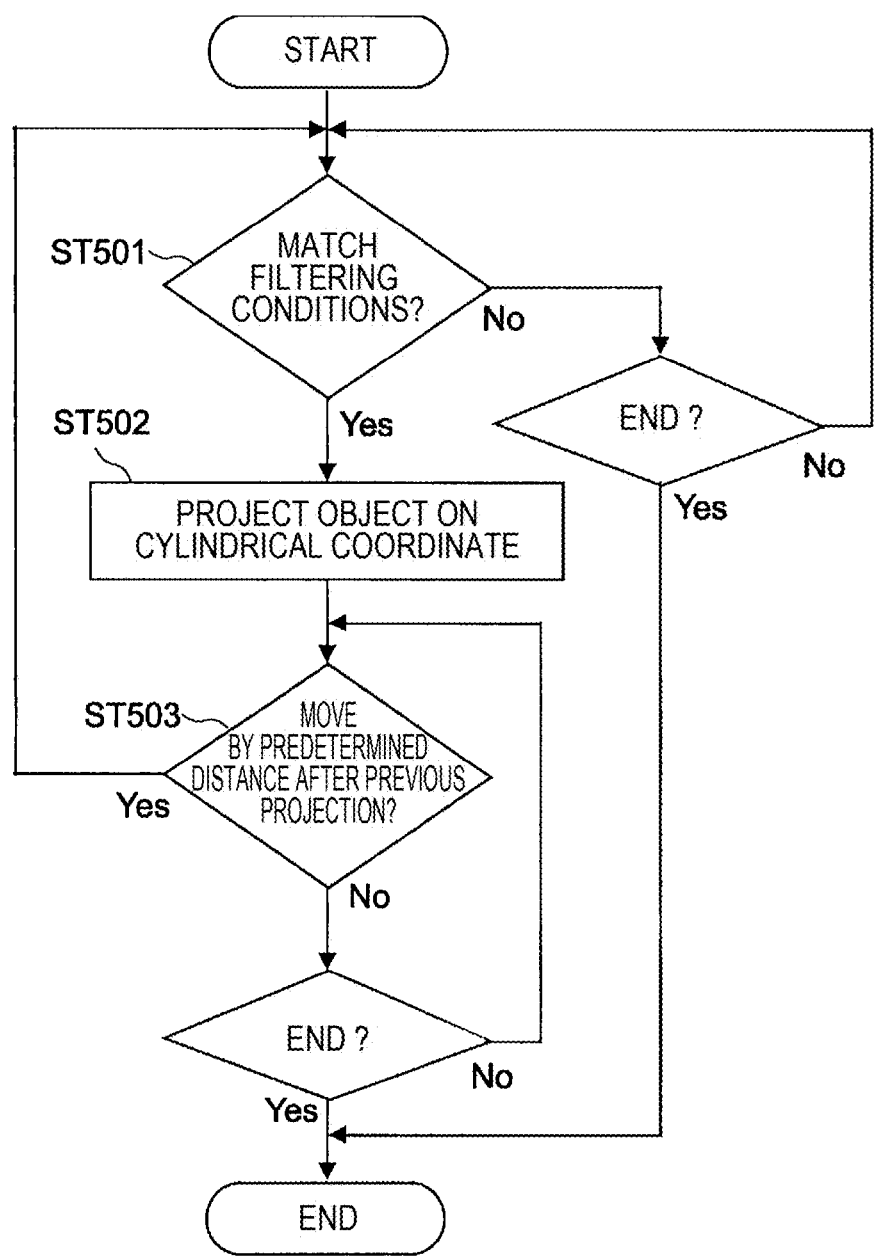
FIG. 23 is a flowchart illustrating a display control example in the above-described head mounted display.

FIG. 23 is a flowchart of processing executed at the control unit 30 (display control unit 314).

The control unit 30 extracts an object which matches the input filtering conditions (display conditions) from the objects stored in the memory 302 and projects the object on the cylindrical coordinate C0 (steps 501 and 502). Subsequently, the control unit 30 calculates a moving distance of the user from a position after the previous object projection, and, in the case where the moving distance is equal to or greater than a predetermined distance (for example, equal to or greater than 10 meters), projects the object again on the cylindrical coordinate C0 (steps 503, 501 and 502). The above-described processing is repeatedly executed until the scenario mode is finished.

The re-projection of the object includes change of the position or the size of the same object, projection of a new object, or the like.

(Display Control Example 1)

FIG. 24 illustrates a display example of an object in the case where, for example, car navigation application is set as the scenario mode. Here, an example will be described where the position of a friend who gets in another car, destination information, and traffic light name are input as the filtering conditions.

Various objects relating to subjects viewed from the car in which the user gets are displayed in the visual field V. The subjects include the car of the friend, a traffic light and a destination, and position information of the car of the friend (B251), intersection name (traffic light name) (B252) and the position of the destination and distance information (B253) are displayed as the objects relating to these subjects. The object B251 is displayed based on an ID, or the like, of the HMD worn by the friend, which is input to the mobile information terminal 200 of the user.

As a target of the object B252 relating to the intersection name, for example, an intersection (traffic light) located within 100 meters from the user is set as distance conditions. Meanwhile, because the objects B251 and B253 relating to the car of the friend and the destination are important information, it is possible to perform setting such that the above-described distance conditions are not applied.

The control unit 30 displays the objects B251 to B253 in the visual field V based on the position information of the user. The control unit 30 displays the objects B251 to B253 and monitors the moving distance of the user, and, in the case where the moving distance becomes equal to or greater than a predetermined distance (for example, 10 meters), updates the objects in the visual field V to change the positions or the sizes of the objects B251 to B253 or to display objects including the next intersection name. Such display control is repeatedly executed until the user reaches the destination.

(Display Control Example 2)

On the other hand, in the case where there are too many objects displayed in the visual field V or objects are displayed in an overlapped manner, there is a case where it is difficult to identify or view objects useful for the user. Therefore, in the case where there are a plurality of images to be displayed in the visual field V, the control unit 30 (display control unit 314) may be configured to alternately display the plurality of images.

Figure 25A:
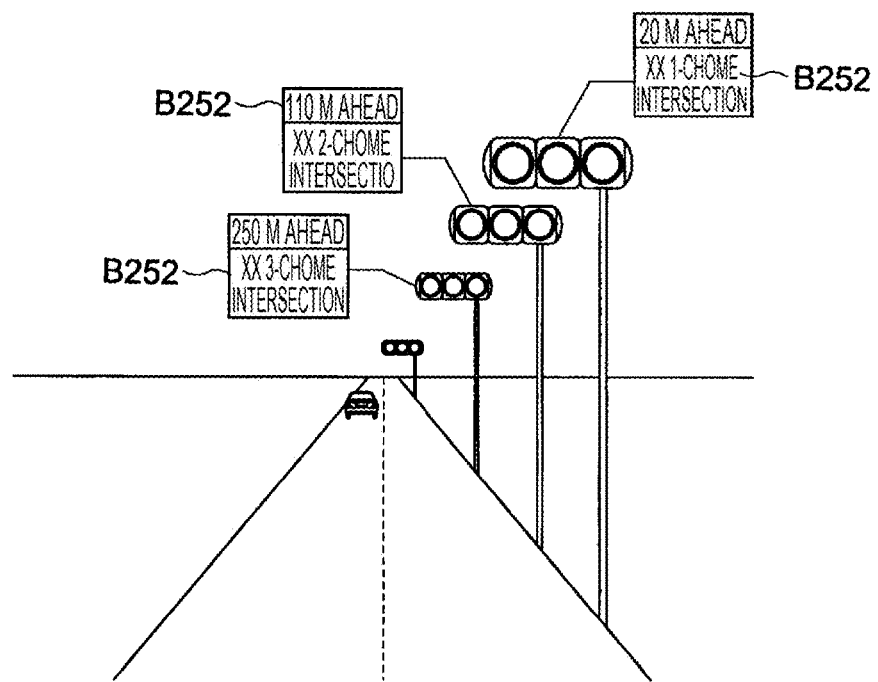
FIG. 25A is a pattern diagram of a visual field explaining another display control example.
Figure 25B:
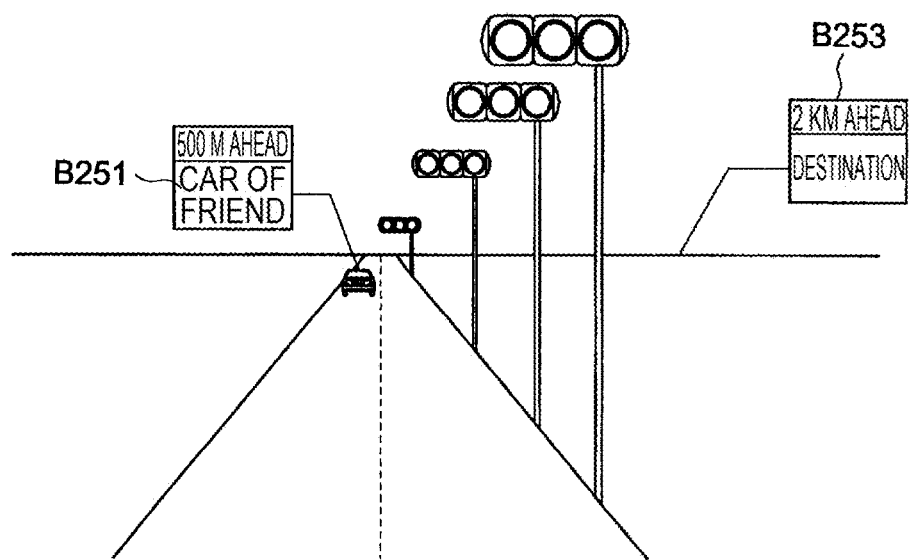
FIG. 25B is a pattern diagram of a visual field explaining another display control example.

For example, as illustrated in FIG. 25A and FIG. 25B, the objects B252 which displays the intersection name and the objects B251 and B253 which display the car information of the friend and the destination information may be alternately displayed every predetermined period. By this means, it is possible to improve visibility and discrimination of each object in the visual field V.

If the objects are displayed while the respective display positions are displaced so that the objects do not overlap with each other, there is a case where it becomes difficult to identify about which subject the object displays the information. According to the present example, by displacing display timings of the respective objects in a time direction, visibility and discrimination of the objects are secured.

Further, a group of objects displayed at the same time may be classified for each attribute parameter. By this means, because listing of the objects is secured, the user can confirm information useful for the user at one glance.

Further, the group of the displayed objects and a group of objects which are alternately displayed may be decided according to the number of objects in the visual field V and an overlapping amount. For example, the intersection name and the building name may be displayed at the same time at an uncrowded location, and the intersection name and the building name may be displayed at different times at a crowded location.

(Display Control Example 3)

While an example of the scenario mode has been described above, there is a case where the mode is switched among a plurality of different display modes. In the case where the mode is switched between a first display mode and a second display mode, in the case where an object displayed in the first display mode corresponds to an object displayed in the second display mode, it is desired to make the user recognize that the objects correspond to each other upon switching of the mode.

Therefore, in the following description, a technology which enables the user to easily recognize correspondence relationship between objects displayed in a plurality of different display modes upon switching of the mode. Specifically, the display control unit 314 displays a first screen in the first display mode and displays a second screen in the second display mode at the display unit. In this event, in the case where a first object included in the first screen corresponds to a second object included in the second screen, the display control unit 314 performs seamless transition from the first object to the second object upon switching of the mode from the first display mode to the second display mode.

For example, the display control unit 314 may perform seamless transition of the position from the first object to the second object. Alternatively, the display control unit 314 may perform seamless transition of the size from the first object to the second object. Alternatively, the display control unit 314 may perform seamless transition of the color from the first object to the second object. Alternatively, the display control unit 314 may perform seamless transition of the shape from the first object to the second object.

Any combination of two modes for displaying a "view" which will be described below can be applied as combination of the first display mode and the second display mode. First, an example will be described where combination of a mode for displaying an object corresponding to an orientation around at least one axis of the display unit 10 in the visual field V (display visual field) of the user U (hereinafter, also simply referred to as a mode for displaying an "AR view") and a mode for displaying map data (hereinafter, also simply referred to as a mode for displaying a "Map view") is applied as the combination of the first display mode and the second display mode.

Figure 26:
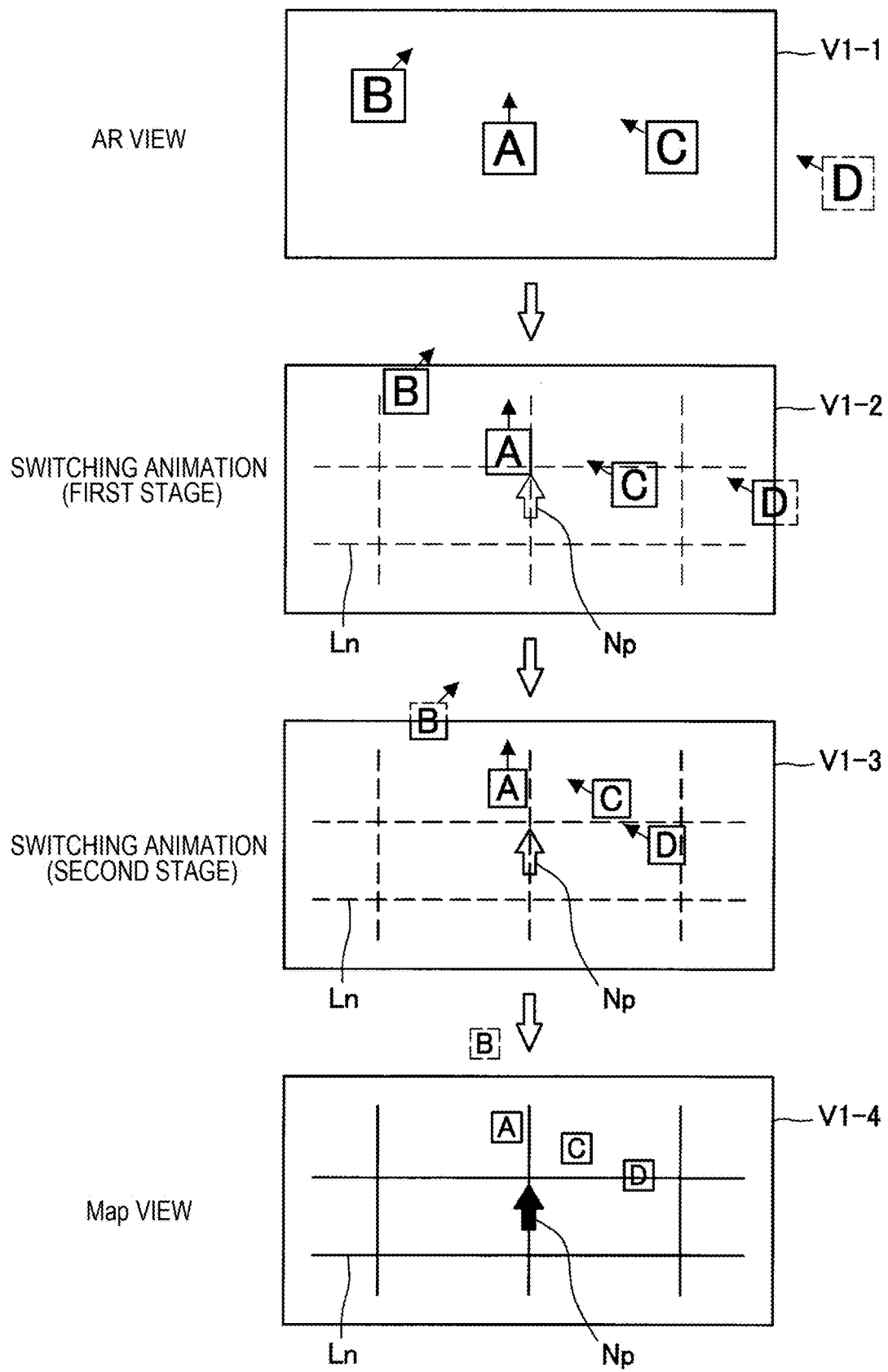
FIG. 26 is a diagram for explaining an example where a mode is switched from a mode for displaying an AR view to a mode for displaying a Map view.

First, referring to FIG. 26, a case will be described where the mode is switched from the mode for displaying the AR view to the mode for displaying the Map view. FIG. 26 is a diagram for explaining an example where the mode is switched from the mode for displaying the AR view to the mode for displaying the Map view. As illustrated in FIG. 26, first, in the mode for displaying the AR view, the display control unit 314 displays objects A, B and C in a visual field V1-1 as information relating to respective subjects. An object D exists outside the visual field V1-1. Further, traveling directions of the objects A, B, C and D are indicated with arrows.

On the other hand, in the mode for displaying the Map view, the display control unit 314 displays map data in a visual field V1-4 and superimposes the objects A, C and D on the map data. The object B exists outside the visual field V1-4. Further, in the mode for displaying the Map view, the display control unit 314 displays an object Np indicating the position and the orientation of the display unit 10 in the map data at the display unit 10 and displays an object Ln indicating a road in the map data at the display unit 10.

Note that, while, in the example illustrated in FIG. 26, the objects A, B, C and D in the mode for displaying the AR view and the objects A, B, C and D in the mode for displaying the Map view are the same, the objects are not necessarily the same. That is, the objects may be the same or different as long as the objects A, B, C and D in the mode for displaying the AR view are associated with the objects A, B, C and D in the mode for displaying the Map view.

Here, the display control unit 314 judges that the objects A, B, C and D included in the AR view correspond to the objects A, B, C and D included in the Map view upon switching of the mode from the mode for displaying the AR view to the mode for displaying the Map view. Therefore, for example, the display control unit 314 may perform seamless transition from the objects A, B, C and D included in the AR view to the objects A, B, C and D included in the Map view as illustrated in an AR view V1-1, switching animation (first stage) V1-2, switching animation (second stage) V1-3 and a Map view V1-4.

For example, as illustrated in FIG. 26, the display control unit 314 may perform seamless transition of the positions from the objects A, B, C and D included in the AR view to the objects A, B, C and D included in the Map view. Alternatively, as illustrated in FIG. 26, the display control unit 314 may perform seamless transition of the size from the objects A, B, C and D included in the AR view to the objects A, B, C and D included in the Map view. Alternatively, the display control unit 314 may perform seamless transition of color from the objects A, B, C and D included in the AR view to the objects A, B, C and D included in the Map view.

Further, in order to smoothly switch the display mode, the display control unit 314 may make map data fade in. For example, as illustrated in FIG. 26, the display control unit 314 may make an object Np indicating the position of the display unit 10 in the map data fade in (by gradually changing transmittance). Further, for example, as illustrated in FIG. 26, the display control unit 314 may make an object indicating the road in the map data fade in (by gradually changing transmittance). An example has been described above where, upon switching of the mode from the mode for displaying the AR view to the mode for displaying the Map view, all the positions of the objects A, B, C and D are made to transition.

Figure 27:
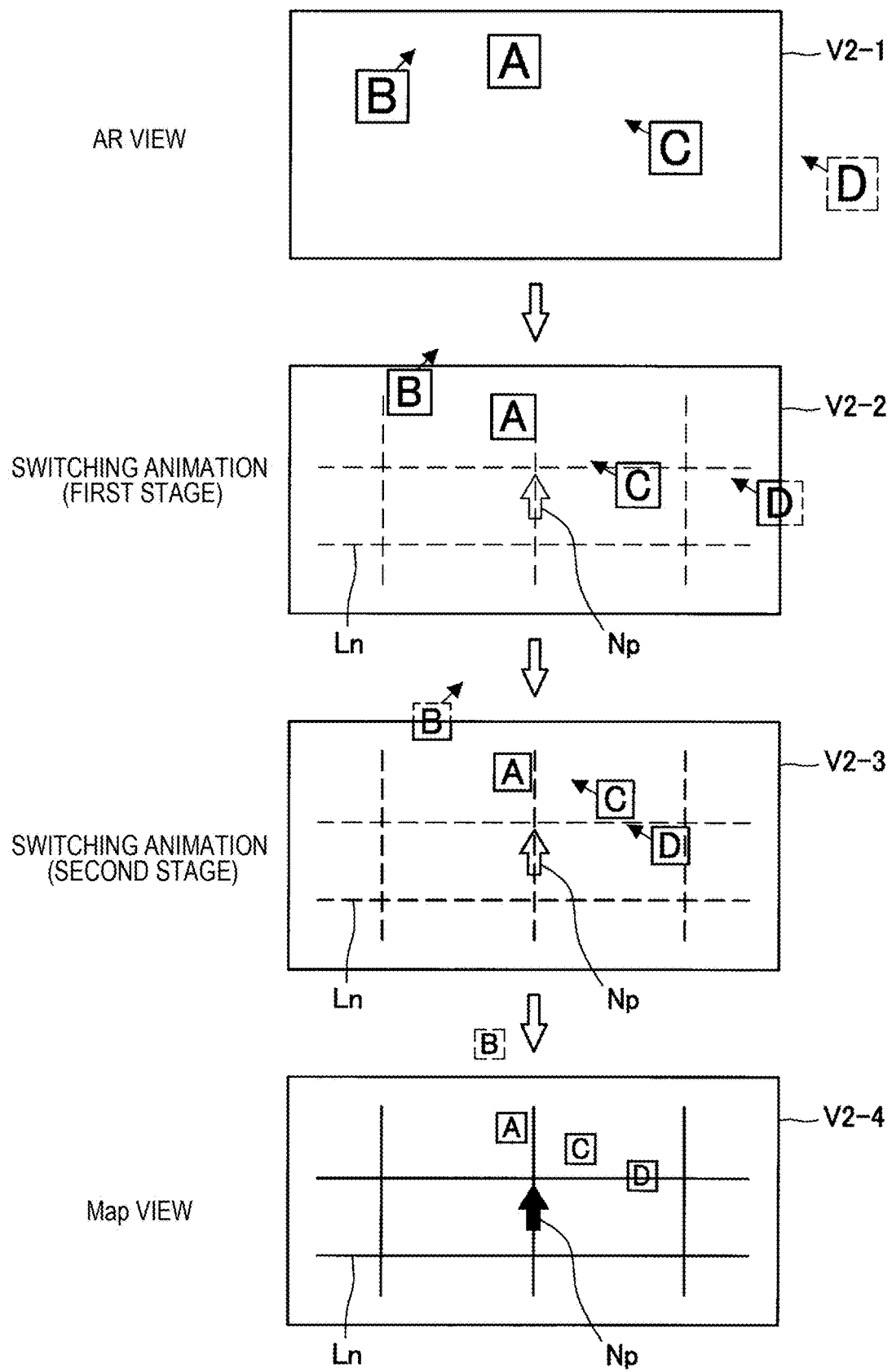
FIG. 27 is a diagram for explaining an example where the mode is switched from the mode for displaying the AR view to the mode for displaying the Map view (while an object A is fixed).

However, there is also a case where it is not desired to make the position of a predetermined object transition among the objects A, B, C and D. Therefore, the display control unit 314 may fix the position of the predetermined object. The predetermined object may be registered in advance or an object closest to the center of the visual field V (display visual field) of the user U in real space may be automatically selected. For example, an example will be described where, in the case where the position of the objet A is fixed, the positions of other objects B, C and D are made to transition. FIG. 27 is a diagram for explaining an example where the mode is switched from the mode for displaying the AR view to the mode for displaying the Map view (while the object A is fixed).

As illustrated in FIG. 27, for example, the display control unit 314 may perform seamless transition from the objects B, C and D included in the AR view to the objects B, C and D included in the Map view as illustrated in an AR view V2-1, switching animation (first stage) V2-2, switching animation (second stage) V2-3 and a Map view V2-4. In this event, as illustrated in FIG. 27, the display control unit 314 may prevent the position of the object A from transitioning (may fix the position of the object A). In this event, as illustrated in FIG. 27, the display control unit 314 may make the size and the color of the object A transition.

Figure 28:
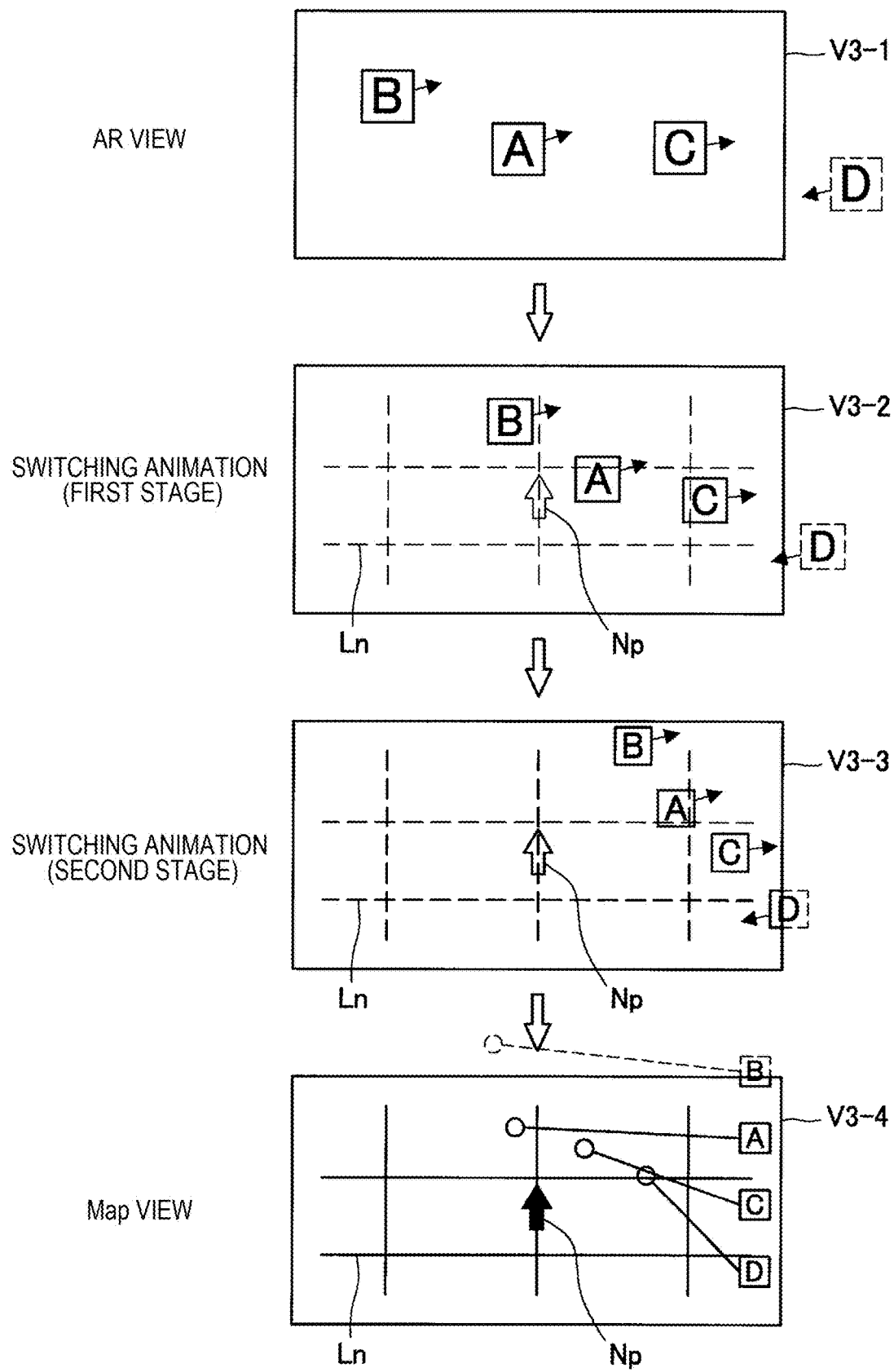
FIG. 28 is a diagram for explaining an example where the mode is switched from the mode for displaying the AR view to the mode for displaying the Map view (while objects A, B, C and D move to an end portion).

Further, there is also a case where it is desired to move the objects A, B, C and D toward an end portion of the visual field V (display visual field) of the user U in real space. Therefore, the display control unit 314 may move the objects A, B, C and D to the end portion of the visual field and indicate the positions of the objects A, B, C and D using lead lines. FIG. 28 is a diagram for explaining an example where the mode is switched from the mode for displaying the AR view to the mode for displaying the Map view (while the objects A, B, C and D move to the end portion).

As illustrated in FIG. 28, for example, the display control unit 314 may perform seamless transition from the objects A, B, C and D included in the AR view to the objects A, B, C and D aligned at a right end portion of the Map view as illustrated in an AR view V3-1, switching animation (first stage) V3-2, switching animation (second stage) V3-3 and a Map view V3-4. Note that, while, in the example illustrated in FIG. 28, the objects A, B, C and D are aligned at the right end portion of the Map view, the objects A, B, C and D may be aligned at other end portions (such as, for example, a left end portion, an upper end portion and a lower end portion) of the Map view.

Here, while switching of the display mode may be performed at any timing, for example, the display control unit 314 may switch the display mode in the case where predetermined conditions are satisfied. For example, the display control unit 314 may switch the mode from the mode for displaying the Map view to the mode for displaying the AR view in the case where a relative distance between the display unit 10 and the subject is smaller than a predetermined distance and in the case where the subject falls within the visual field V of the user U in real space, because it can be considered that, in the case where such conditions are satisfied, it is appropriate for browsing the AR view and a possibility that the user can smoothly recognize the position of the subject without losing sight of the subject is increased. Note that there is a case where infinite is employed as the predetermined distance according to use cases. Subsequently, a timing for switching the mode from the mode for displaying the Map view to the mode for displaying the AR view will be described with reference to FIG. 29 and FIG. 30.

Figure 29:
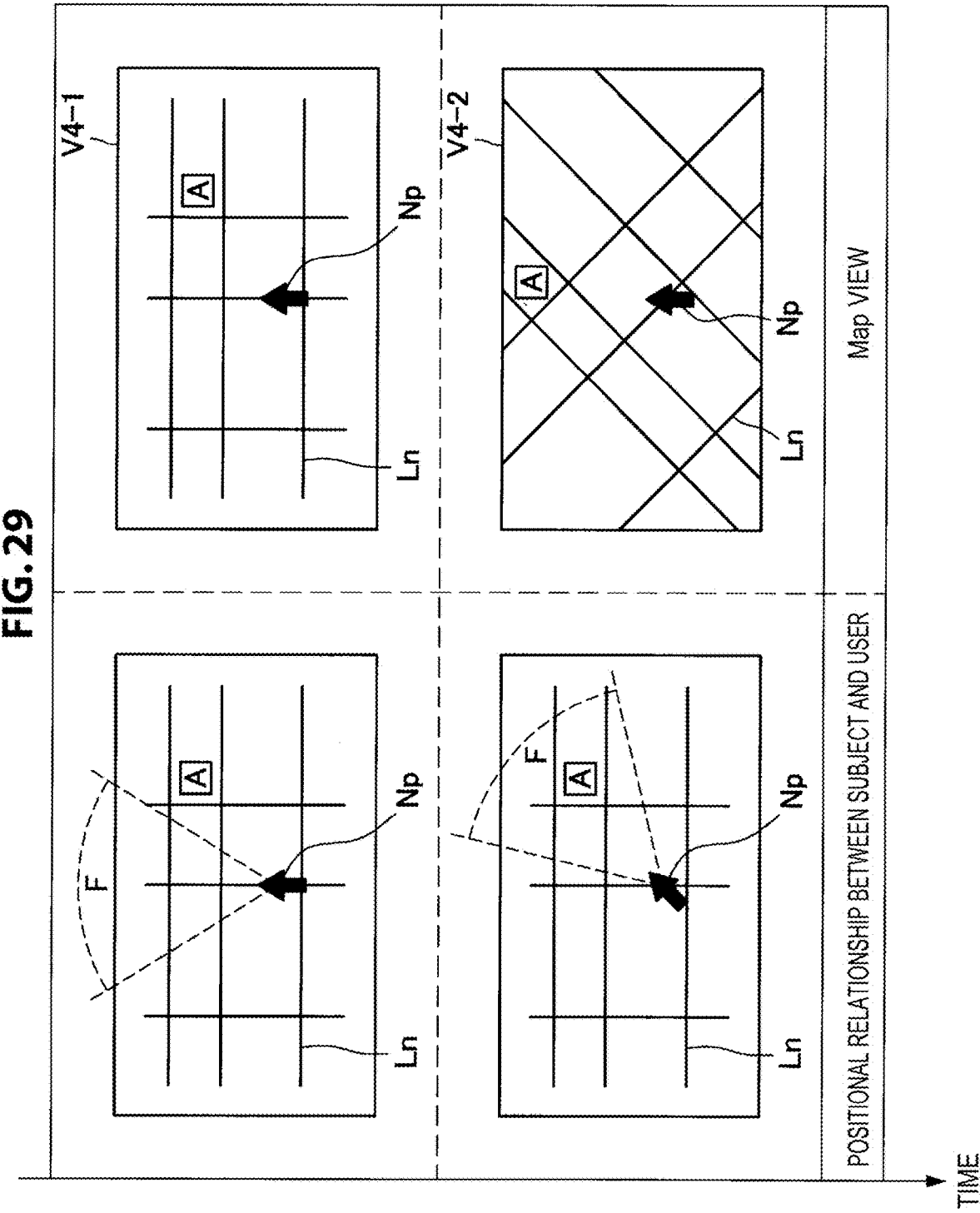
FIG. 29 is a diagram illustrating an example of the Map view immediately after a subject falls within a visual field of a user in real space in the case where a relative distance between a display unit and the subject is less than a predetermined distance.

FIG. 29 is a diagram of an example of the Map view immediately after the subject falls within the visual field V (field of view F of the user) of the user U in real space in the case where the relative distance between the display unit 10 and the subject is smaller than the predetermined distance. As illustrated in FIG. 29, the display control unit 314 may display the Map view V4-1 in the case where the subject (existing at the position indicated as the object A) does not fall within the visual field V (field of view F of the user) of the user U in real space as an example of "positional relationship between the user and the subject". Meanwhile, the display control unit 314 may display the Map view V4-2 immediately after the subject (existing at the position indicated as the object A) falls within the visual field V (field of view F) of the user U in real space as an example of the "positional relationship between the user and the subject".

Figure 30:
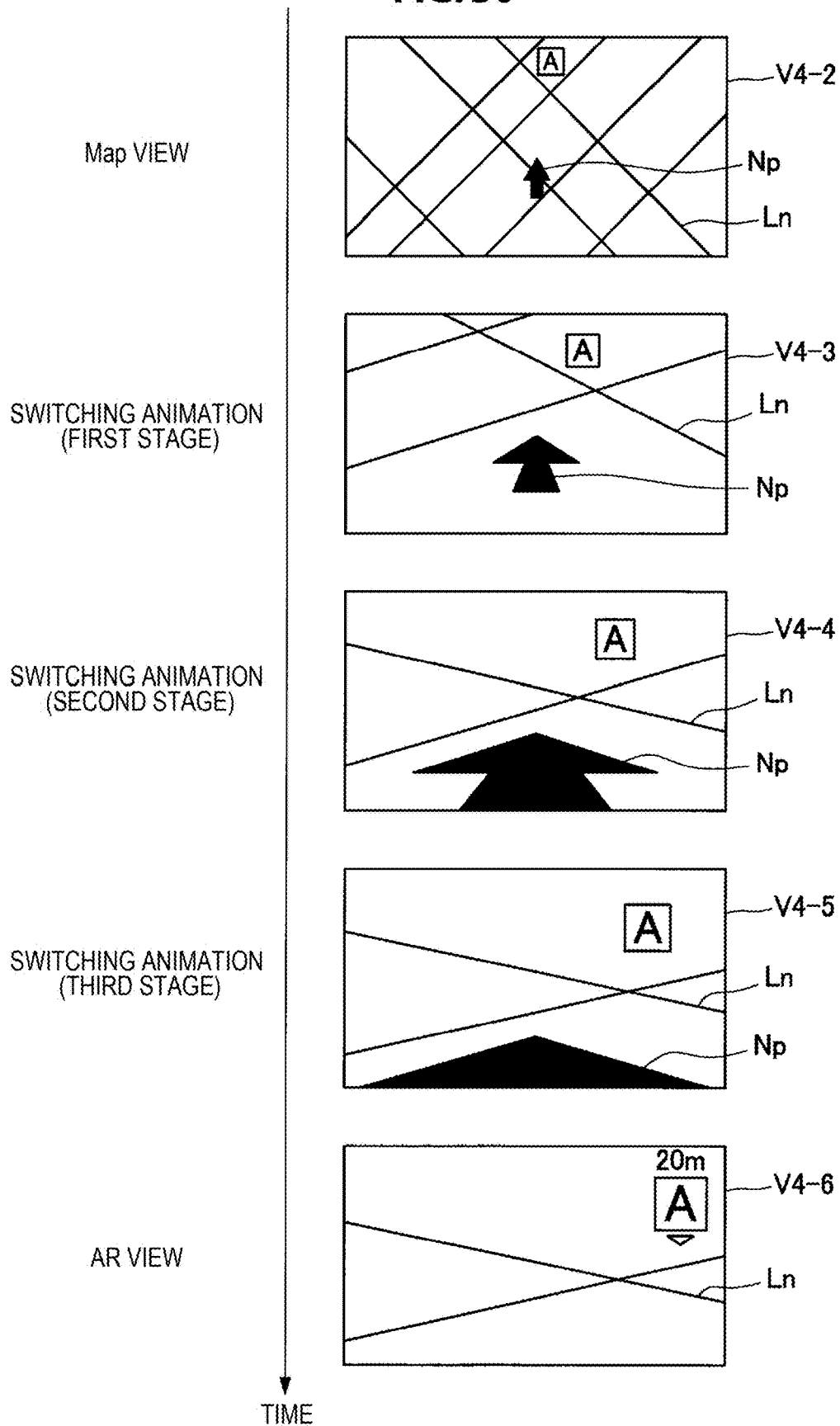
FIG. 30 is a diagram illustrating an example of view change in the case where the subject falls within the visual field of the user in the real space in the case where the relative distance between the display unit and the subject is less than the predetermined distance.

FIG. 30 is a diagram illustrating an example of view change in the case where the subject falls within the visual field V (field of view F of the user) of the user U in real space in the case where the relative distance between the display unit 10 and the subject is smaller than the predetermined distance. As illustrated in FIG. 30, in the case where the subject (existing at the position indicated as the object A) falls within the visual field V (field of view F) of the user U in real space, the display control unit 314 may perform seamless transition from the object A included in the Map view to the object A included in the AR view as illustrated in a Map view V4-2, switching animation (first stage) V4-3, switching animation (second stage) V4-4, switching animation (third stage) V4-5 and an AR view V4-6.

Further, for example, as illustrated in FIG. 30, the display control unit 314 may make the object Np indicating the position of the display unit 10 in the map data fade out (by gradually moving the object Np outside the visual field while transforming the object Np in accordance with inclination of a ground with respect to the display unit 10). Further, for example, as illustrated in FIG. 30, the display control unit 314 may make an object indicating the road in the map data fade out (by gradually moving the object outside the visual field while transforming the object in accordance with inclination of the ground with respect to the display unit 10). Further, as illustrated in FIG. 30, the display control unit 314 may display the distance from the user to the subject at the display unit 10.

On the other hand, in the case where the relative distance between the display unit 10 and the subject is greater than the predetermined distance, or in the case where the subject deviates from the visual field V (field of view F of the user) of the user U in real space, the display control unit 314 may switch the mode from the mode for displaying the AR view to the mode for displaying the Map view, because it can be considered that, in the case where such conditions are satisfied, it is appropriate for browsing the Map view. Subsequently, a timing for switching the mode from the mode for displaying the AR view to the mode for displaying the Map view will be described with reference to FIG. 31 and FIG. 32.

Figure 31:
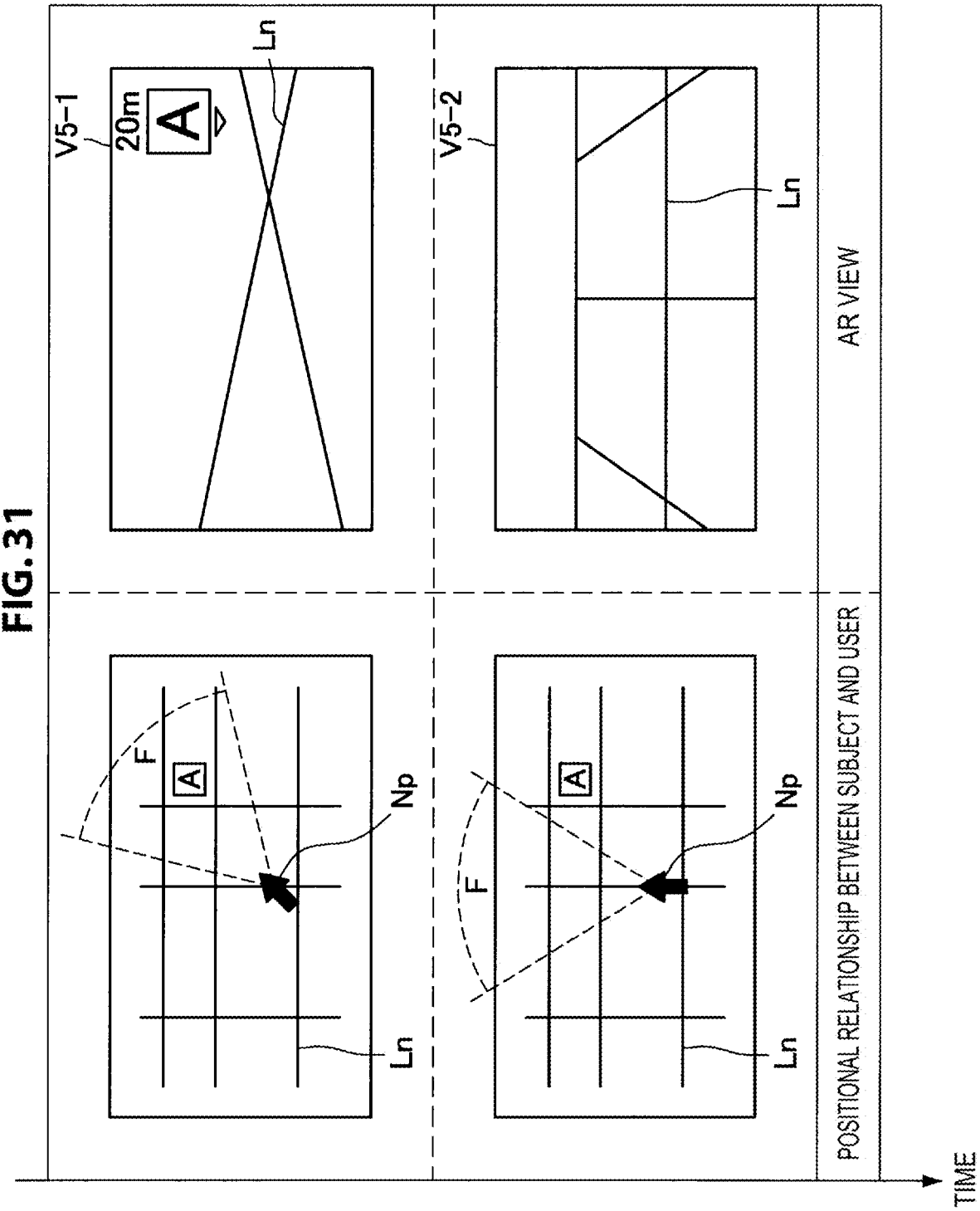
FIG. 31 is a diagram illustrating an example of the AR view immediately after the subject deviates from the visual field of the user in the real space in the case where the relative distance between the display unit and the subject is less than the predetermined distance.

FIG. 31 is a diagram of an example of the AR view immediately after the subject deviates from the visual field V (field of view F of the user) of the user U in real space in the case where the relative distance between the display unit 10 and the subject is smaller than the predetermined distance. As illustrated in FIG. 31, the display control unit 314 may display the AR view V5-1 in the case where the subject (existing at the position indicated as the object A) falls within the visual field V (field of view F of the user) of the user U in real space as an example of "positional relationship between the user and the subject". Meanwhile, the display control unit 314 may display the AR view V4-2 immediately after the subject (existing at the position indicated as the object A) deviates from the visual field V (field of view F) of the user U in real space as an example of the "positional relationship between the user and the subject".

Figure 32:
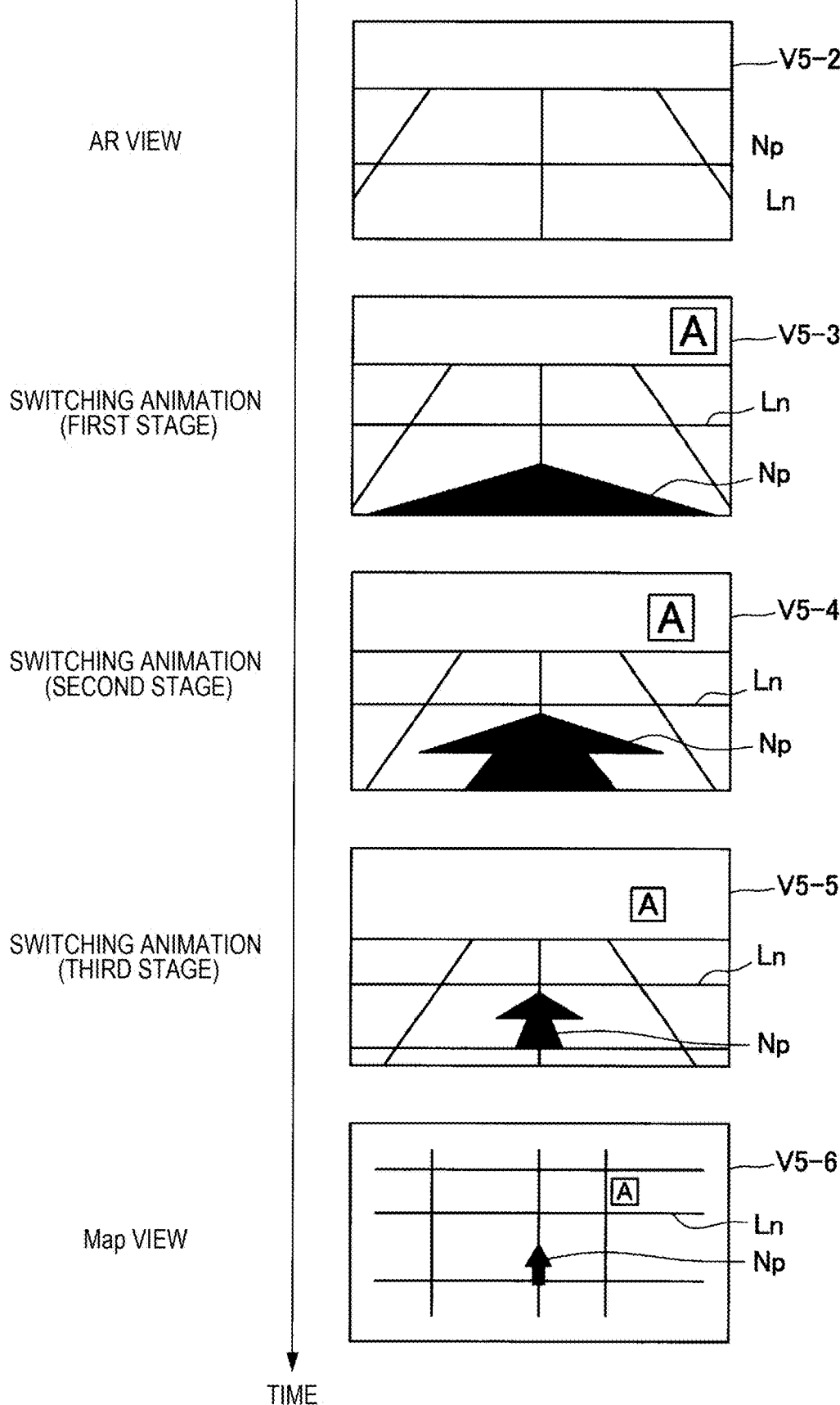
FIG. 32 is a diagram illustrating an example of view change in the case where the subject deviates from the visual field of the user in the real space in the case where the relative distance between the display unit and the subject is less than the predetermined distance.

FIG. 32 is a diagram illustrating an example of view change in the case where the subject deviates from the visual field V (field of view F of the user) of the user U in real space in the case where the relative distance between the display unit 10 and the subject is smaller than the predetermined distance. As illustrated in FIG. 32, in the case where the subject (existing at the position indicated as the object A) deviates from the visual field V (field of view F) of the user U in real space, the display control unit 314 may perform seamless transition from the object A outside the AR view to the object A included in the Map view as illustrated in a Map view V5-2, switching animation (first stage) V5-3, switching animation (second stage) V5-4, switching animation (third stage) V5-5 and an AR view V5-6.

Further, for example, as illustrated in FIG. 32, the display control unit 314 may make the object Np indicating the position of the display unit 10 in the map data fade in (by gradually moving the object Np inside the visual field while transforming the object Np in accordance with inclination of a ground with respect to the display unit 10). Further, for example, as illustrated in FIG. 32, the display control unit 314 may make an object indicating the road in the map data fade in (by gradually moving the object inside the visual field while transforming the object in accordance with inclination of the ground with respect to the display unit 10).

Figure 33:
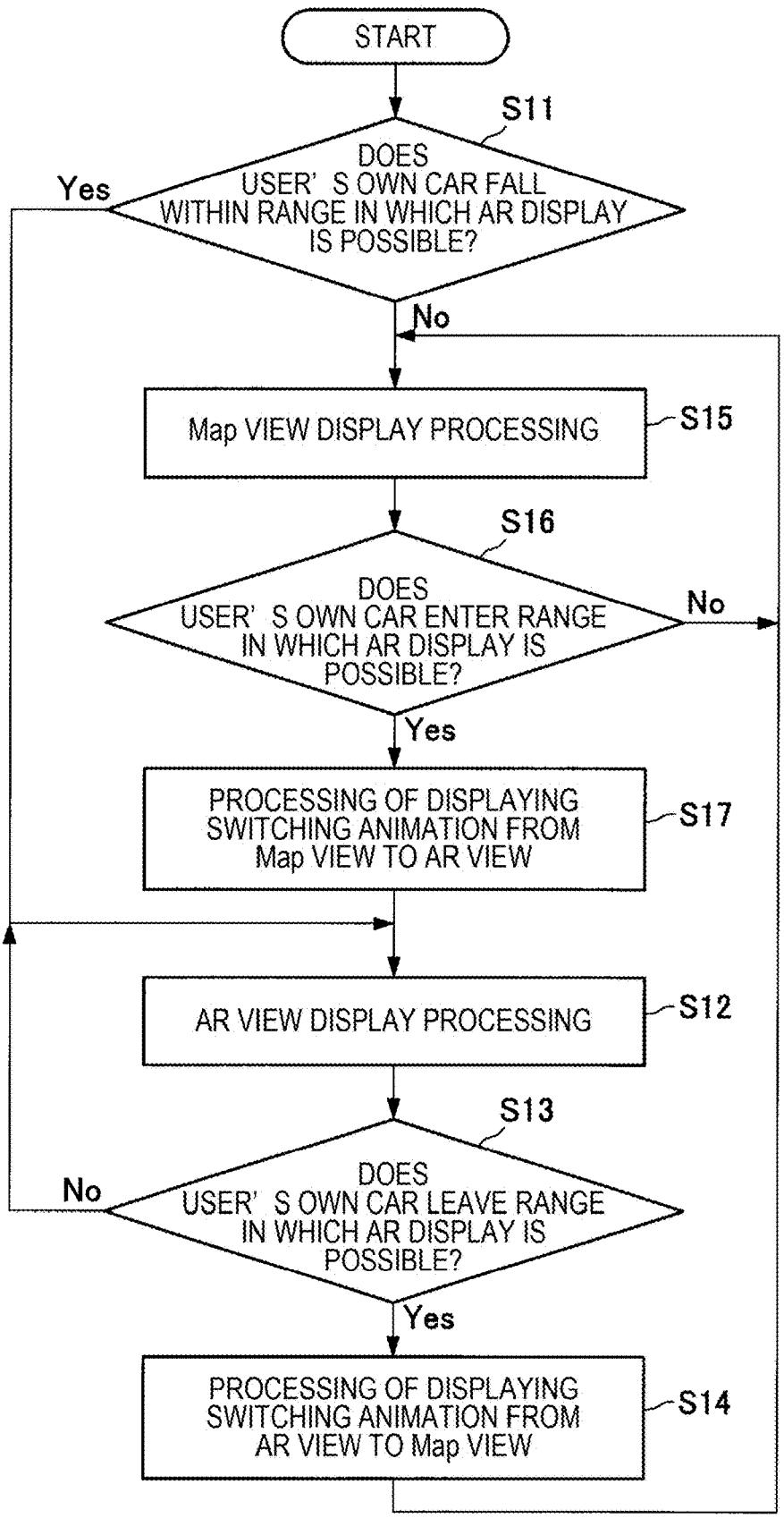
FIG. 33 is a flowchart illustrating an operation example where the mode is switched between the mode for displaying the AR view and the mode for displaying the Map view.

FIG. 33 is a flowchart illustrating an operation example where the mode is switched between the mode for displaying the AR view and the mode for displaying the Map view. Note that, here, while an example where a car of the user is used as the subject will be described, the subject is not limited to the car and may be a store, or the like. Further, a range in which AR display is possible corresponds to a range in which, in the above-described example, the relative distance between the display unit 10 and the subject is smaller than the predetermined distance and the subject falls within the visual field V (field of view F of the user) of the user U in real space. First, in the case where the display control unit 314 determines that the car of the user falls within the range in which the AR display is possible ("Yes" in step S11), the processing proceeds to step S12.

On the other hand, in the case where it is determined that the car of the user does not fall within the range in which the AR display is possible ("No" in step S11), the display control unit 314 performs Map view display processing (step S15), and, in the case where it is determined that the car of the user does not fall within the range in which the AR display is possible ("No" in step S16), the processing returns to step S15, while, in the case where it is determined that the car of the user enters the range in which the AR display is possible ("Yes" in step S16), the display control unit 314 performs processing of displaying switching animation from the Map view to the AR view (step S17), and the processing proceeds to step S12.

In step S12, the display control unit 314 performs AR view display processing (step S12), and, in the case where it is determined that the car of the user does not leave the range in which the AR display is possible ("No" in step S13), the processing returns to step S12. On the other hand, in the case where it is determined that the car of the user leaves the range in which the AR display is possible ("Yes" in step S13), the display control unit 314 performs processing of displaying switching animation from the AR view to the Map view (step S14), and the processing returns to step S15.

Figure 34:
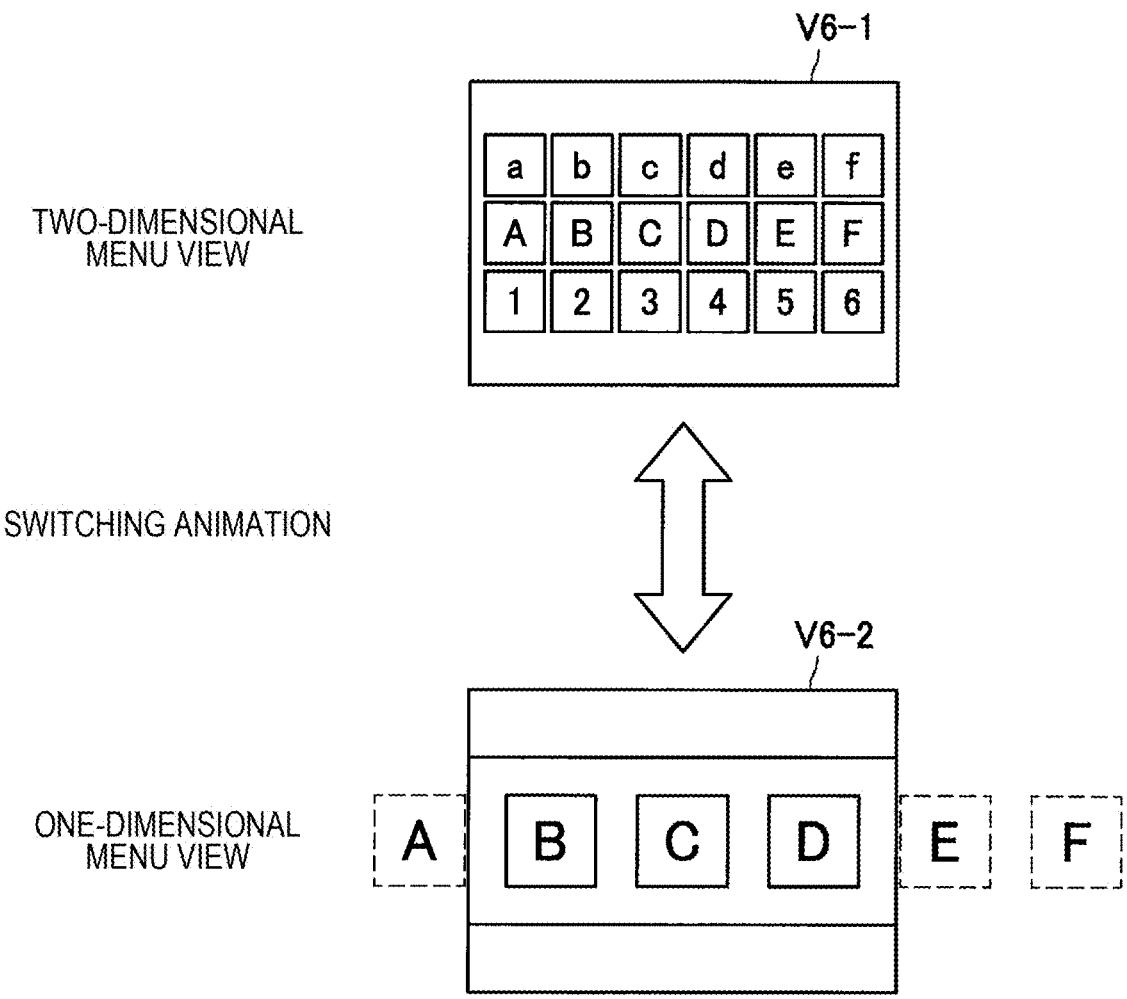
FIG. 34 is a diagram for explaining an example where the mode is switched between a mode for displaying a two-dimensional menu view and a mode for displaying a one-dimensional menu view.

Subsequently, an example will be described where, as combination of the above-described first display mode and second display mode, combination of a mode for displaying a screen in which a plurality of objects are arranged on two dimensions of the horizontal direction and the vertical direction (hereinafter, also referred to as a mode for displaying a "two-dimensional menu view") and a mode for displaying a screen in which a plurality of objects are arranged on one dimension (hereinafter, also referred to as a mode for displaying a "one-dimensional menu view") is applied. FIG. 34 is a diagram for explaining an example where the mode is switched between the mode for displaying the two-dimensional menu view and the mode for displaying one-dimensional menu view. For example, each object may be an icon for selecting content or application.

As illustrated in FIG. 34, first, in the mode for displaying a two-dimensional menu view V6-1, the display control unit 314 displays an object group (a, b, c, d, e and f) in the first row, an object group (A, B, C, D, E and F) in the second row and an object group (1, 2, 3, 4, 5 and 6) in the third row in a visual field V6-1. The display control unit 314 switches the mode to the mode for displaying the one-dimensional menu view V6-2 in the case where the object group is selected. In the mode for displaying the one-dimensional menu view V6-2, the object group is enlarged and displayed. On the other hand, in the case where selection of the object group is cancelled, the display control unit 314 switches the mode to the mode for displaying the two-dimensional menu view V6-1.

FIG. 34 illustrates an example where the object group (A, B, C, D, E and F) in the second row is selected, and after the mode is switched to the mode for displaying the one-dimensional menu view V6-1, the object group (A, B, C, D, E and F) in the second row is enlarged and displayed, and an object is selected by the display control unit 314 from the objet group (A, B, C, D, E and F) in the second row. While selection of the object group and the object by the display control unit 314 may be performed based on user operation, the user operation is not particularly limited, and may be touch panel input, key input, dial input, input using line of sight, sound input, gesture input, posture change, or the like.

Here, the display control unit 314 judges that the objects A, B, C, D, E and F included in the two-dimensional view V6-2 correspond to the objects A, B, C, D, E and F included in the one-dimensional menu view V6-1 upon switching of the mode between the mode for displaying the two-dimensional menu view V6-2 and the mode for displaying the one-dimensional menu view V6-1. Therefore, for example, the display control unit 314 may perform seamless transition between the objects A, B, C, D, E and F existing inside or outside the one-dimensional menu view V6-1 and the objects A, B, C, D, E and F included in the two-dimensional menu view V6-2.

Figure 35:
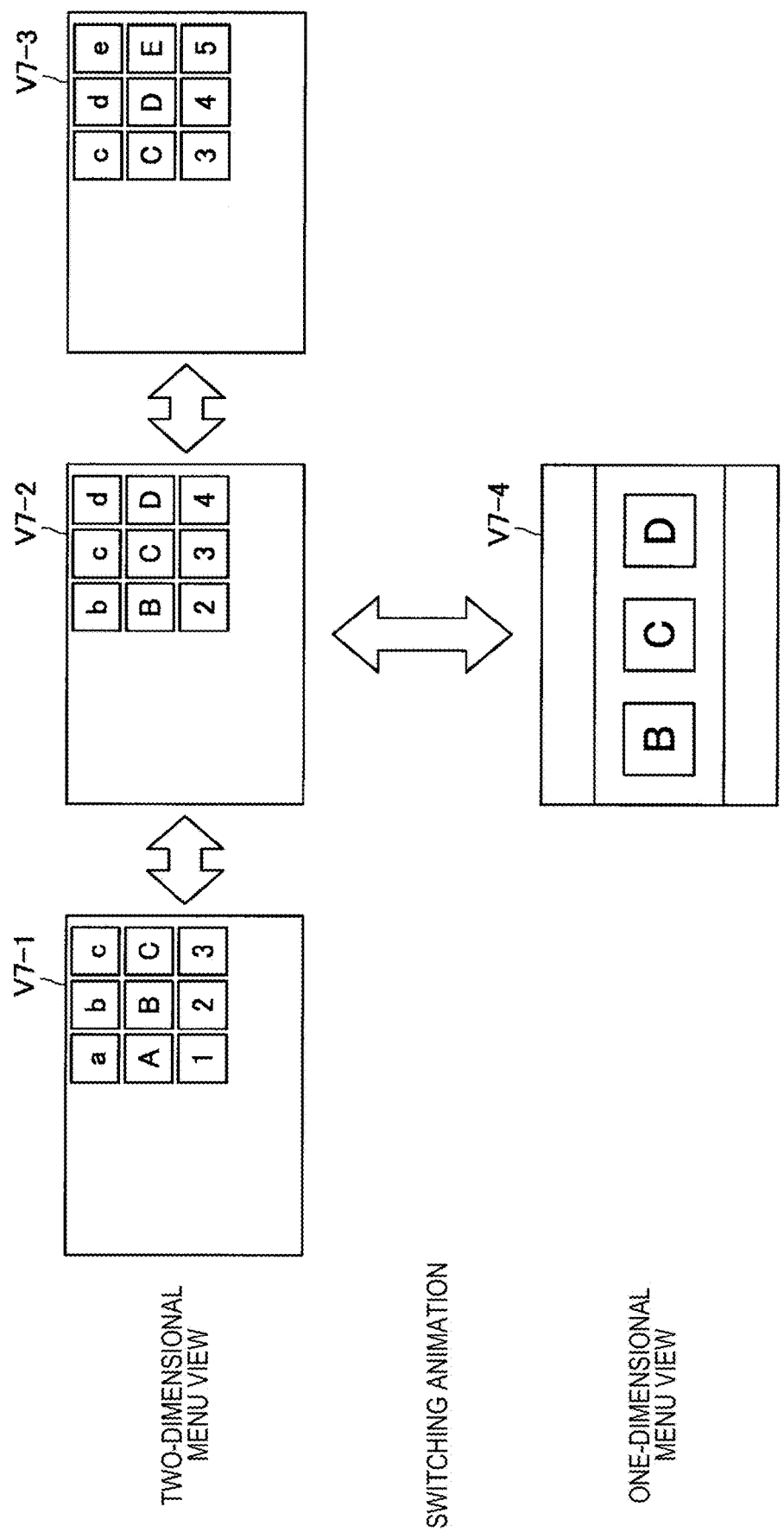
FIG. 35 is a diagram for explaining an example where the mode is switched between the mode for displaying the two-dimensional menu view and the mode for displaying the one-dimensional menu view through head tracking.

Subsequently, an example will be described where, as combination of the above-described first display mode and second display mode, combination of the two-dimensional menu view and the one-dimensional menu view is applied. FIG. 35 is a diagram for explaining an example where the mode is switched between the mode for displaying the two-dimensional menu view and the mode for displaying the one-dimensional view through head tracking. For example, each object may be an icon for selecting content or application.

As illustrated in FIG. 35, first, in the mode for displaying two-dimensional menu views V7-1 to V7-3, the display control unit 314 can switch the object group to be displayed according to the orientation of the display unit 10. The display control unit 314 switches the mode to the mode for displaying the one-dimensional menu view V7-4 in the case where the displayed object group is selected. In the mode for displaying the one-dimensional menu view V7-4, the row including the center of the object group is enlarged and displayed. On the other hand, in the case where selection of the object group is cancelled, the display control unit 314 switches the mode to the mode for displaying the two-dimensional menu view V7-2.

FIG. 35 illustrates an example where the object group (b, c, d, B, C, D, 2, 3 and 4) is selected, and after the mode is switched to the mode for displaying the one-dimensional view V7-4, the row (B, C and D) including the object C which is the center of the object group is enlarged and displayed, and an object is selected by the display control unit 314 from the row (B, C and D). While selection of the object group and the object by the display control unit 314 may be performed based on user operation, the user operation is not particularly limited, and may be touch panel input, key input, dial input, input using line of sight, sound input, gesture input, posture change, or the like.

Here, the display control unit 314 judges that the object group (b, c, d, B, C, D, 2, 3 and 4) included in the two-dimensional menu view V7-2 corresponds to the object group (b, c, d, B, C, D, 2, 3 and 4) existing inside or outside the one-dimensional menu view V7-4 upon switching of the mode between the mode for displaying the two-dimensional menu view V7-2 and the mode for displaying the one-dimensional menu view V7-4. Therefore, for example, the display control unit 314 may perform seamless transition between the object group (b, c, d, B, C, D, 2, 3 and 4) included in the two-dimensional menu view V7-2 and the object group (b, c, d, B, C, D, 2, 3 and 4) existing inside or outside the one-dimensional menu view V7-4.

Figure 36:
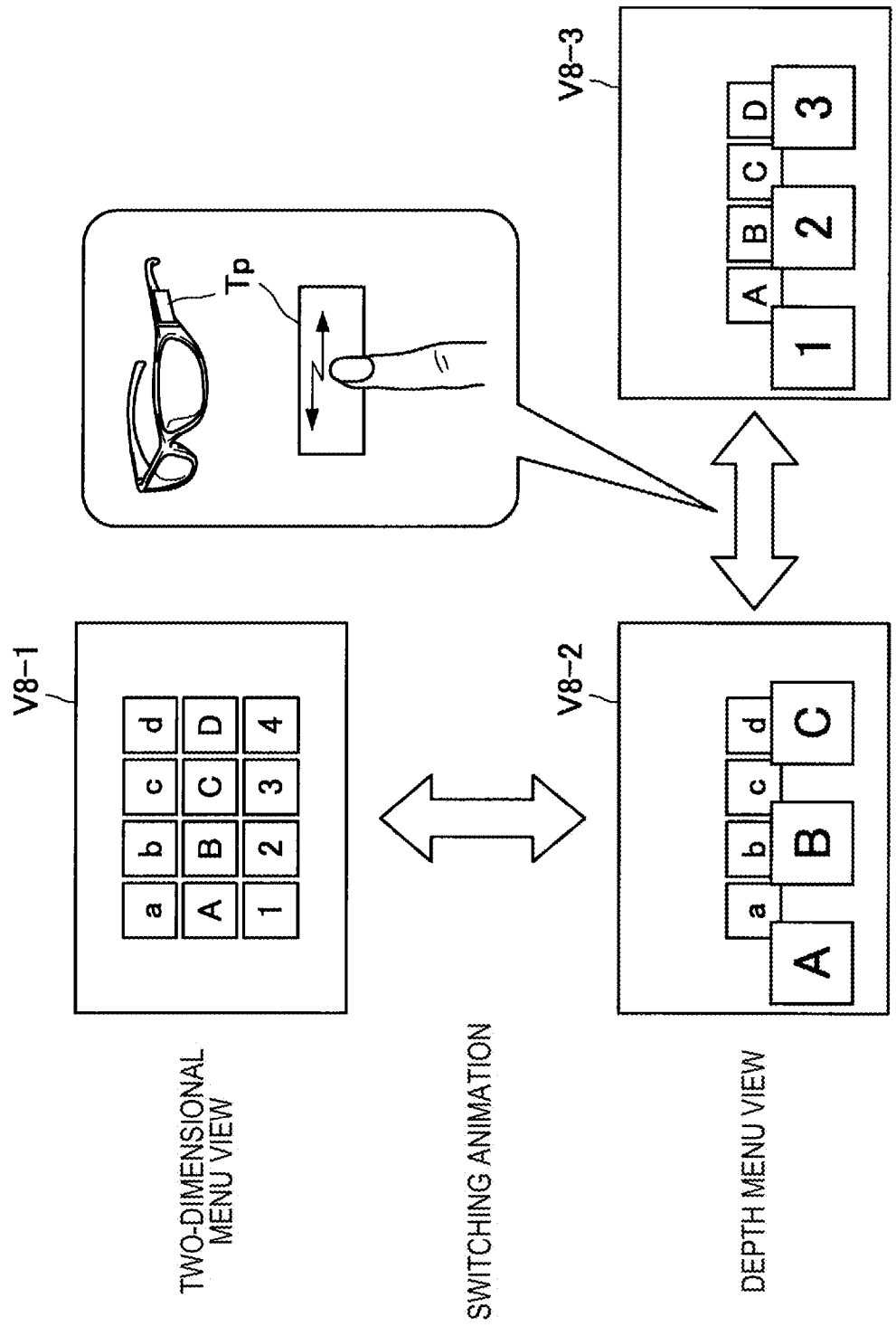
FIG. 36 is a diagram for explaining an example where the mode is switched between the mode for displaying the two-dimensional menu view and a mode for displaying a depth menu view.

Subsequently, an example will be described where, as combination of the above-described first display mode and second display mode, combination of the two-dimensional menu view and a mode for displaying a screen in which a plurality of objects are arranged on two dimensions of the horizontal direction and the depth direction (hereinafter, also referred to as a mode for displaying a "depth menu view") is applied. FIG. 36 is a diagram for explaining an example where the mode is switched between the mode for displaying the two-dimensional menu view and the mode for displaying the depth menu view. For example, each object may be an icon for selecting content or application (for example, an icon for selecting content or application which is older as the content or application is located deeper in the back).

As illustrated in FIG. 36, first, in the mode for displaying a two-dimensional menu view V8-1, the display control unit 314 displays an object group (a, b, c, d, e and f) in the first row, an object group (A, B, C, D, E and F) in the second row and an object group (1, 2, 3, 4, 5 and 6) in the third row in a visual field V8-1. The display control unit 314 switches the mode to the mode for displaying the depth menu view V8-2 in the case where the object group is selected. In the mode for displaying the depth menu view V8-2, the object group is enlarged and displayed on top. On the other hand, in the case where selection of the object group is cancelled, the display control unit 314 switches the mode to the mode for displaying the two-dimensional menu view V8-1.

FIG. 36 illustrates an example where the object group (A, B, C and D) in the second row is selected, and after the mode is switched to the mode for displaying the depth menu view V8-2, the object group (A, B and C) in the second row is enlarged and displayed on top, the object group (a, b, c and d) in the first row is placed in the back, and the object group (1, 2, 3 and 4) in the third row fades out while being enlarged. An object is selected by the display control unit 314 from the object group (A, B and C) on top. While selection of the object group and the object by the display control unit 314 may be performed based on user operation, the user operation is not particularly limited, and may be touch panel input, key input, dial input, input using line of sight, sound input, gesture input, posture change, or the like.

Further, it is also possible to switch the object group in the depth direction. For example, the display control unit 314 can switch the object group in the depth direction through drag operation (or operation for rotating a dial) with respect to a one-dimensional touch panel Tp. In the example illustrated in FIG. 36, the display control unit 314 switches the object group in the depth direction so that the object group (1, 2, 3 and 4) in the third row is placed on top ahead of the object group (A, B and C) which has been enlarged and displayed on top (depth menu view V8-3).

Here, correspondence relationship between the orientation of drag with respect to the one-dimensional touch panel Tp and the orientation the object group being switched is not particularly limited. For example, the correspondence relationship between the orientation of the drag with respect to the one-dimensional touch panel Tp and the orientation the object being switched may be determined in advance or setting can be changed by the user. Further, in the example illustrated in FIG. 35, while the depth direction is indicated with overlapping of the objects, if the display unit 10 is configured with an HMD for both eyes, or the like, the depth direction may be indicated using 3D expression by causing disparity between the both eyes.

Figure 37:
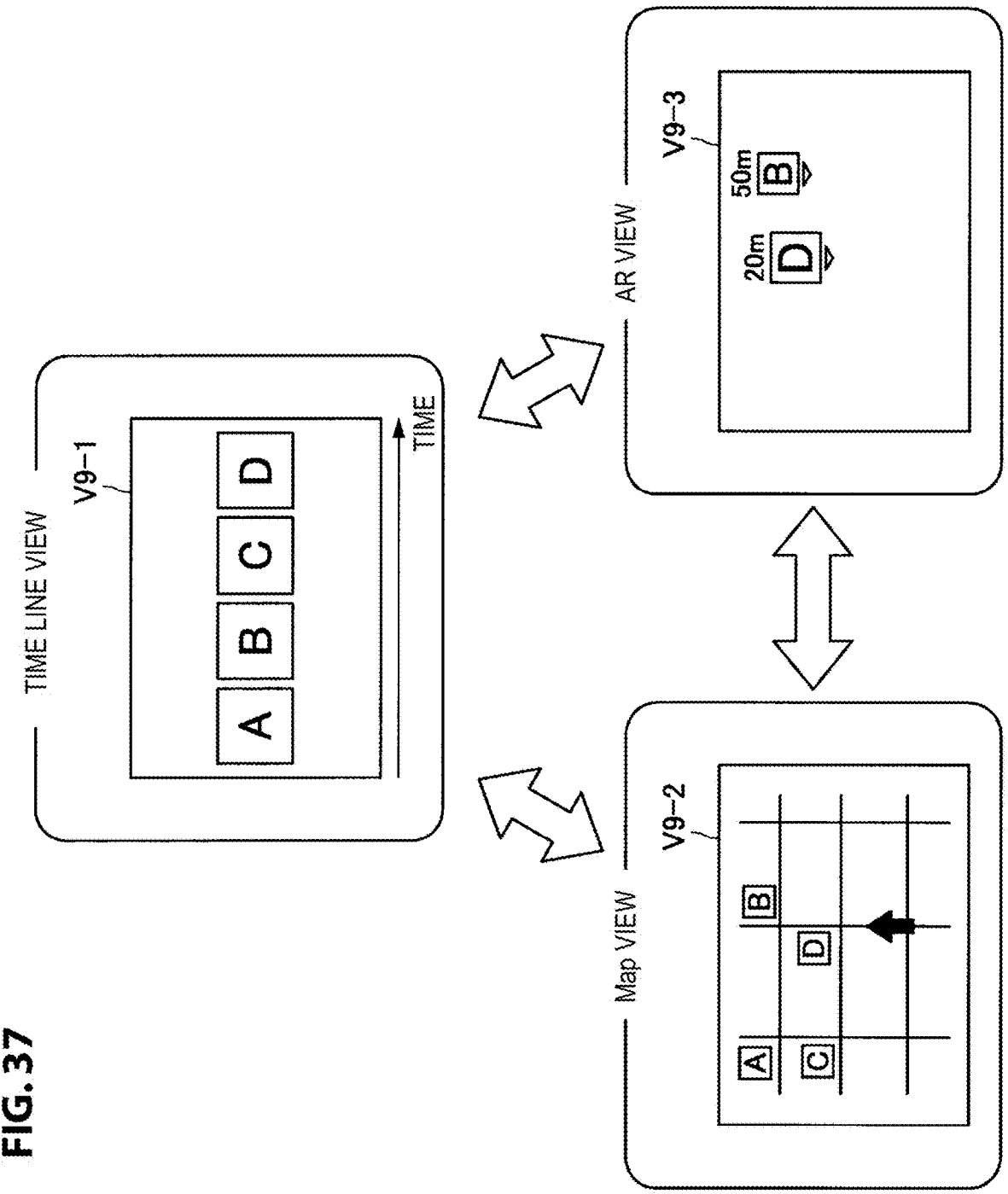
FIG. 37 is a diagram for explaining an example where the mode is switched between a mode for displaying a timeline view and the mode for displaying the AR view (or the mode for displaying the Map view).

Subsequently, an example will be described where, as combination of the above-described first display mode and second display mode, combination of a mode for displaying a screen in which a plurality of objects are arranged on a time axis according to time associated with each of the plurality of objects (hereinafter, also referred to as a mode for displaying a "timeline view") and the mode for displaying the AR view (or the mode for displaying the Map view) is applied. FIG. 37 is a diagram for explaining an example where the mode is switched between the mode for displaying the timeline view and the mode for displaying the AR view (or the mode for displaying the Map view). For example, each object in the timeline view V9-1 may be an image of a store which the user visited in the past within a predetermined distance (for example, within 1 kilometer) from the user, an image of a historical site within the town, or a photograph taken by the user. In this case, the time associated with the object may be time at which the user visited the store, the date on which the historical site existed, time at which the photograph was taken, or the like.

As illustrated in FIG. 37, first, in the mode for displaying the timeline view V9-1, the display control unit 314 displays the object group (A, B, C and D) in the visual field V9-1. Then, the display control unit 314 switches the mode between the mode for displaying the Map view V9-2 and the mode for displaying the AR view V9-3. While switching of the mode may be performed based on user operation, the user operation is not particularly limited, and may be touch panel input, key input, dial input, input using line of sight, sound input, gesture input, posture change, or the like. However, switching of the mode between the mode for displaying the timeline view V9-1 and the mode for displaying the AR view V9-3 may be automatically performed as with switching of the mode between the mode for displaying the Map view and the mode for displaying the AR view.

Here, the display control unit 314 judges that the objects A, B, C and D included in the timeline view V9-1 correspond to the objects A, B, C and D existing inside or outside the AR view V9-3 (or the objects A, B, C and D included in the Map view V9-2) upon switching of the mode between the mode for displaying the timeline view V9-1 and the mode for displaying the AR view V9-3 (or the mode for displaying the Map view V9-2). Therefore, for example, the display control unit 314 may perform seamless transition between the objects A, B, C and D included in the timeline view V9-1 and the objects A, B, C and D existing inside or outside the AR view V9-3 (or the objects A, B, C and D included in the Map view V9-2).

Figure 38:
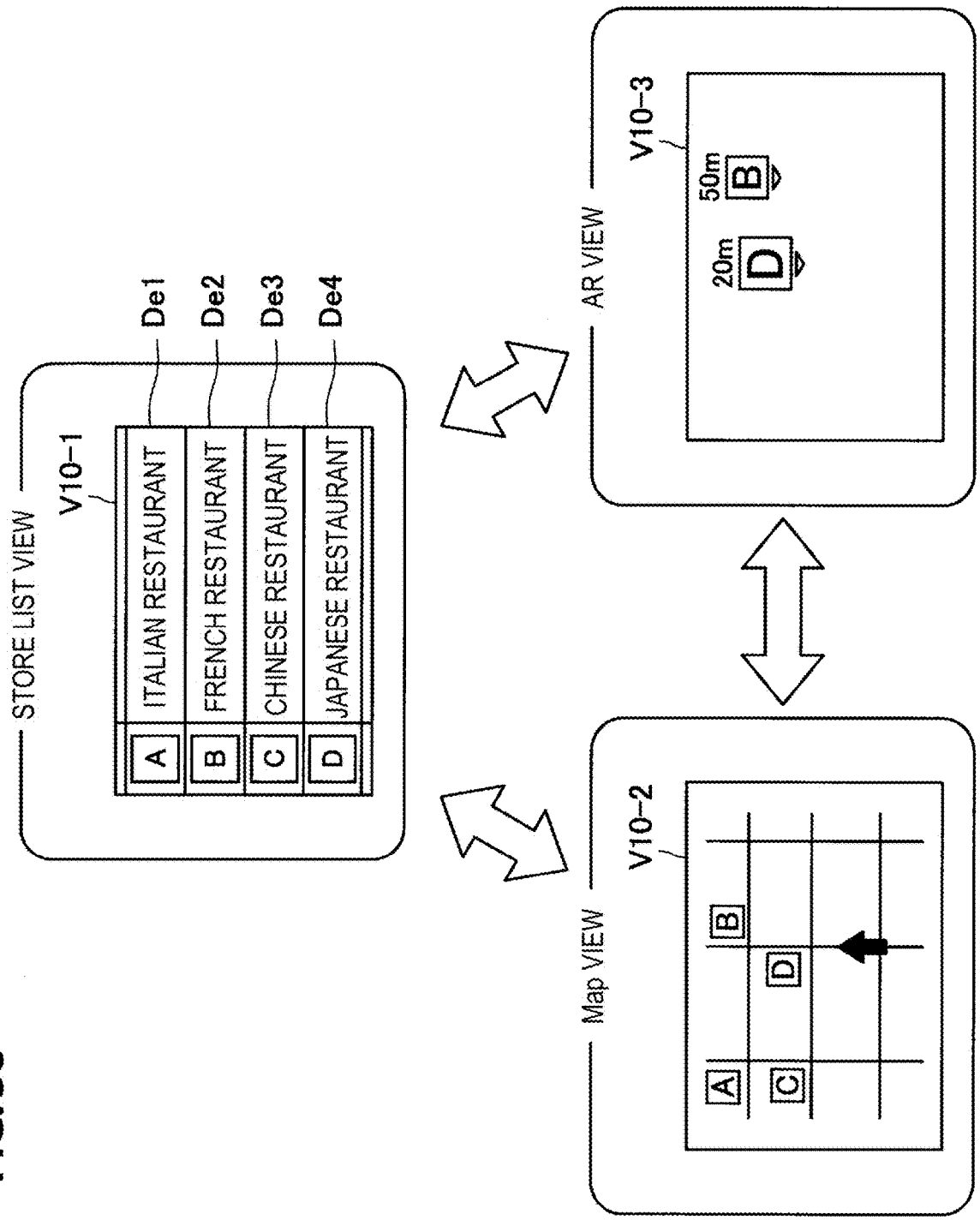
FIG. 38 is a diagram for explaining an example where the mode is switched between a mode for displaying a store list view and the mode for displaying the AR view (or the mode for displaying the Map view).

Subsequently, an example will be described where, as combination of the above-described first display mode and second display mode, combination of the mode for displaying a screen in which an object and information relating to a store associated with the object are placed in association with each other (hereinafter, also referred to as a mode for displaying a "store list view") and the mode for displaying the AR view (or the mode for displaying the Map view) is applied. FIG. 38 is a diagram for explaining an example where the mode is switched between the mode for displaying the store list view V10-1 and the mode for displaying the AR view V10-3 (or the mode for displaying the Map view V10-2). For example, each objet in the timeline view V10-1 may be an image of a recommended store within a predetermined distance (for example, within 1 kilometer) from the user. In this case, the information relating to the store associated with the object may be information introducing the store, or the like.

As illustrated in FIG. 38, first, in the mode for displaying the store list view V10-1, the display control unit 314 displays the object (A, B, C and D) and information De1 to De4 relating to stores associated with the objects in the visual field V10-1. Then, the display control unit 314 switches the mode between the mode for displaying the Map view V10-2 and the mode for displaying the AR view V9-3. While switching of the mode may be performed based on user operation, the user operation is not particularly limited, and may be touch panel input, key input, dial input, input using line of sight, sound input, gesture input, posture change, or the like. However, switching of the mode between the mode for displaying the store list view V10-1 and the mode for displaying the AR view V10-3 may be automatically performed as with switching of the mode between the mode for displaying the Map view and the mode for displaying the AR view.

Here, the display control unit 314 judges that the objects A, B, C and D included in the store list view V10-1 correspond to the objects A, B, C and D existing inside or outside the AR view V10-3 (or the objects A, B, C and D included in the Map view V10-2) upon switching of the mode between the mode for displaying the store list view V10-1 and the mode for displaying the AR view V10-3 (or the mode for displaying the Map view V9-2). Therefore, for example, the display control unit 314 may perform seamless transition between the objects A, B, C and D included in the store list view V10-1 and the objects A, B, C and D existing inside or outside the AR view V10-3 (or the objects A, B, C and D included in the Map view V10-2).

Figure 39:
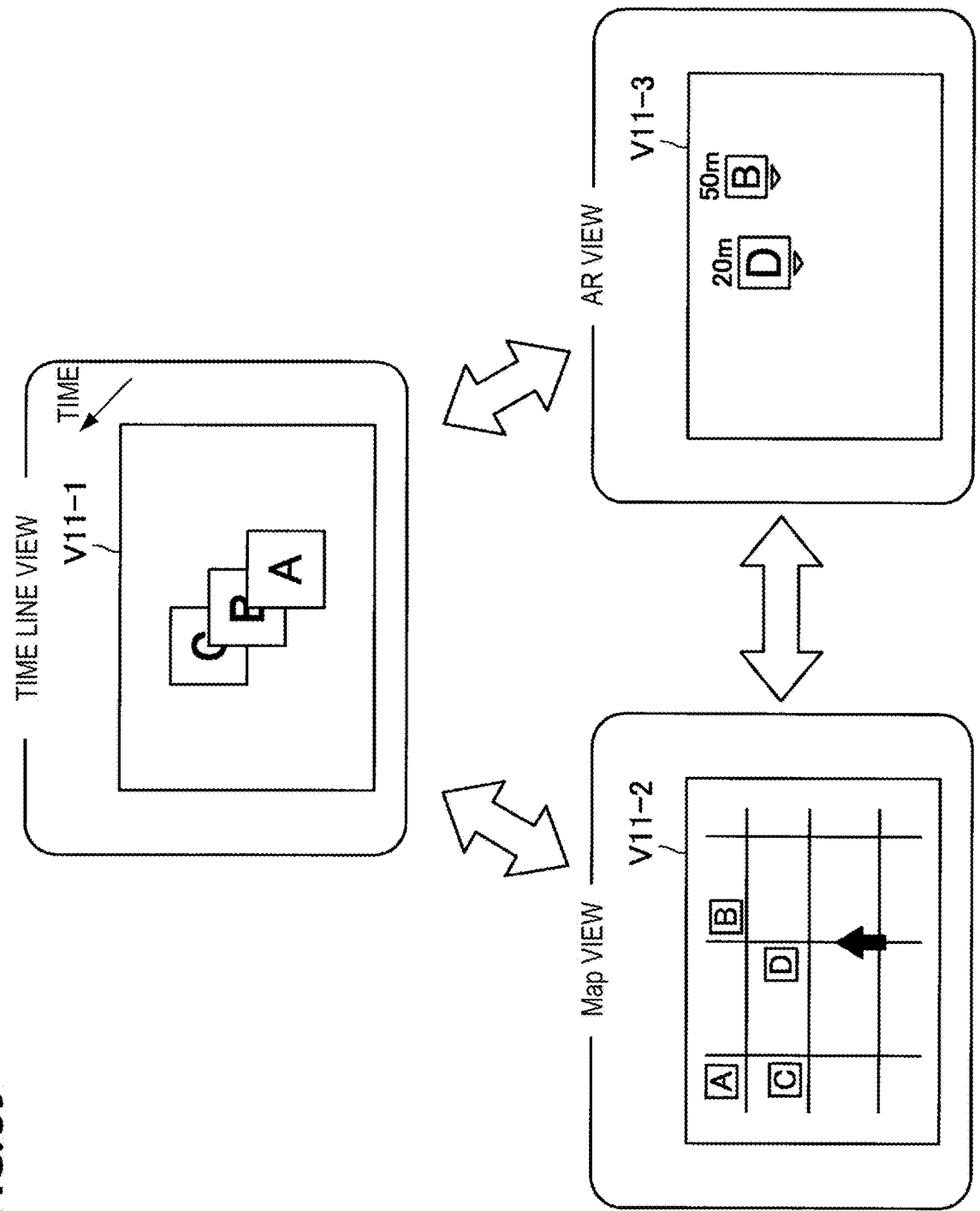
FIG. 39 is a diagram for explaining an example where the mode is switched between a mode for displaying the timeline view in which a time axis is set in a depth direction and the mode for displaying the AR view (or the mode for displaying the Map view).

In the above-described timeline view V9-1, while the time axis is set in the horizontal direction, the time axis may be set in the vertical direction or may be set in the depth direction. FIG. 39 is a diagram for explaining an example where the mode is switched between the mode for displaying the timeline view in which the time axis is set in the depth direction and the mode for displaying the AR view (or the mode for displaying the Map view). The display control unit 314 can switch the object in the depth direction in the mode in which the timeline view V11-1 is displayed. For example, the display control unit 314 can switch the object in the depth direction through drag operation (or operation for rotating a dial) with respect to the one-dimensional touch panel Tp.

Figure 40:
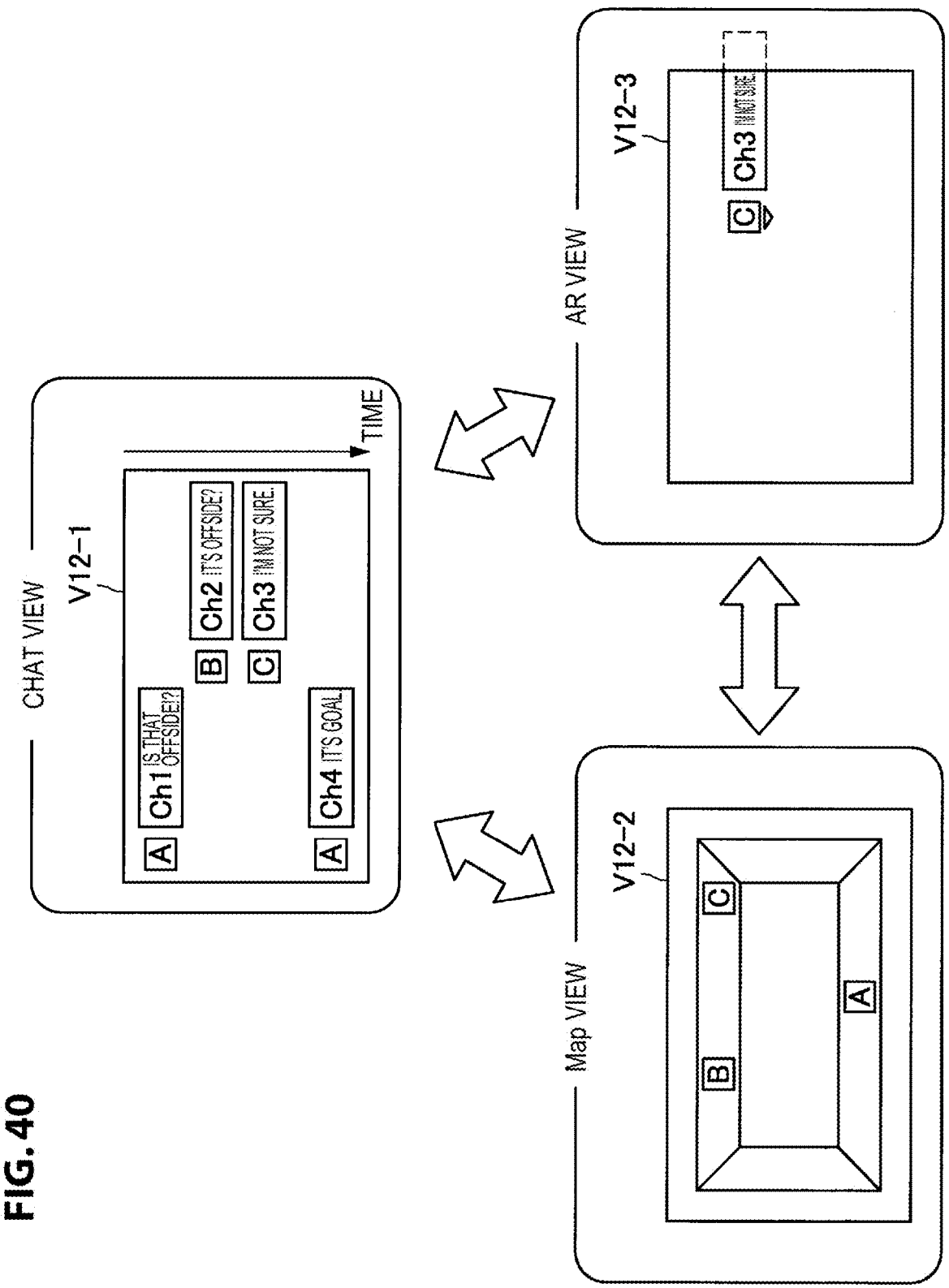
FIG. 40 is a diagram for explaining an example where the mode is switched between a mode for displaying a chat view and the mode for displaying the AR view (or the mode for displaying the Map view).

Subsequently, an example will be described where, as combination of the above-described first display mode and second display mode, combination of the mode for displaying a screen in which an object and written data associated with the object are placed in association with each other (hereinafter, also referred to as a mode for displaying a "chat view") and the mode for displaying the AR view (or the mode for displaying the Map view) is applied. FIG. 40 is a diagram for explaining an example where the mode is switched between the mode for displaying the chat view V12-1 and the mode for displaying the AR view V12-3 (or the mode for displaying the Map view V10-2). For example, each object in the chat view V12-1 may be an image of a user (such as a sport spectator and a participant of a concert or an event) who logs in a chat. In this case, written data associated with the object may be data written by the user.

As illustrated in FIG. 40, first, in the mode for displaying the chat view V12-1, the display control unit 314 displays the objects (A, B, C and A) and written data Ch1 to Ch4 associated with the objects in the visual field V12-1 along the time axis in association with each other. Then, the display control unit 314 switches the mode between the mode for displaying the Map view V12-2 and the mode for displaying the AR view V12-3. While switching operation of the mode may be performed based on user operation, the user operation is not particularly limited, and may be touch panel input, key input, dial input, input using line of sight, sound input, gesture input, posture change, or the like. However, switching of the mode between the mode for displaying the chat view V12-1 and the mode for displaying the AR view V12-3 may be automatically performed as with switching of the mode between the mode for displaying the Map view and the mode for displaying the AR view Here, the display control unit 314 judges that the objects A, B and C included in the chat view V12-1 correspond to the objects A, B and C existing inside or outside the AR view V12-3 (or the objects A, B and C included in the Map view V12-2) upon switching of the mode between the mode for displaying the chat view V12-1 and the mode for displaying the AR view 12-3 (or the mode for displaying the Map view V12-2). Therefore, for example, the display control unit 314 may perform seamless transition between the objects A, B and C included in the chat view V12-1 and the objects A, B and C existing inside or outside the AR view V12-3 (or the objects A, B and C included in the Map view V12-2). In this event, because the object A corresponds to an object of user him/herself, the object A may be made to fade out to a lower end of the chat view V12-2 while being enlarged (may be made to fade in from the lower end of the chat view V12-2 while the size is reduced).

Note that the chat view V12-1 includes a plurality of objects A. In the case where the chat view V12-1 includes a plurality of objects A as in this example, for example, the display control unit 314 may perform seamless transition from the plurality of objects A included in the chat view V12-1 to an object existing outside the AR view V12-3 (or an object included in the Map view V12-2) so that the plurality of objects A are integrated. Inversely, for example, the display control unit 314 may perform seamless transition from an object existing outside the AR view V12-3 (or an object A included in the Map view V12-2) to the plurality of objects A included in the chat view V12-1 so that the object A is separated.

Figure 41:
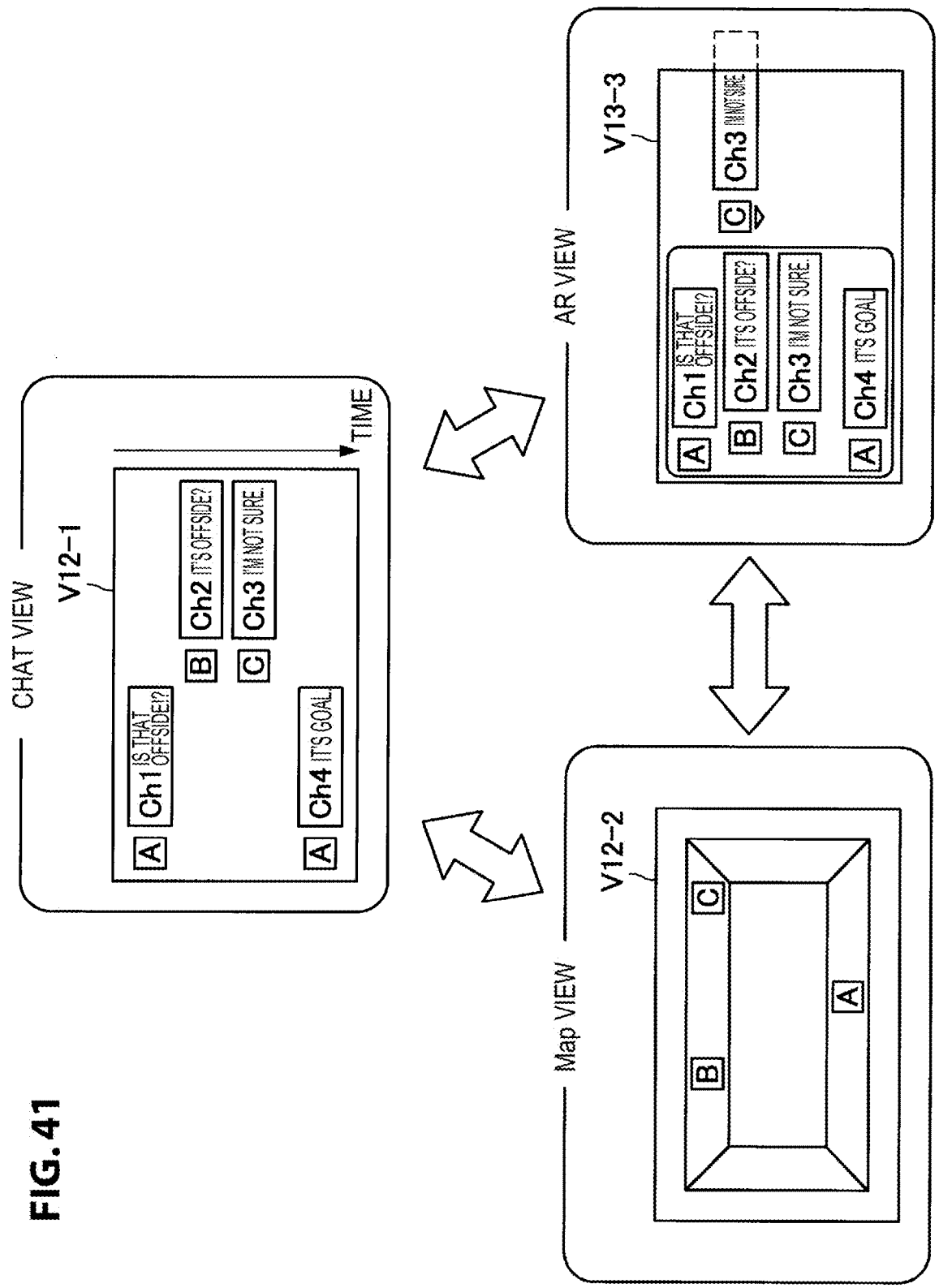
FIG. 41 is a diagram for explaining an example where the mode is switched between the chat view and a mode for displaying the AR view including the chat view (or the mode for displaying the Map view).

While, in the above-described AR view V12-3, the object C and the written data associated with the object C are displayed in association with each other, the AR view V12-3 may include the chat view 12-1. FIG. 41 is a diagram for explaining an example where the mode is switched between the chat view and the mode for displaying the AR view including the chat view (or the mode for displaying the Map view). FIG. 41 illustrates an example where the chat view V13-3 including the same view as the chat view V12-1 is displayed in the mode for displaying the chat view V13-3.

Figure 42:
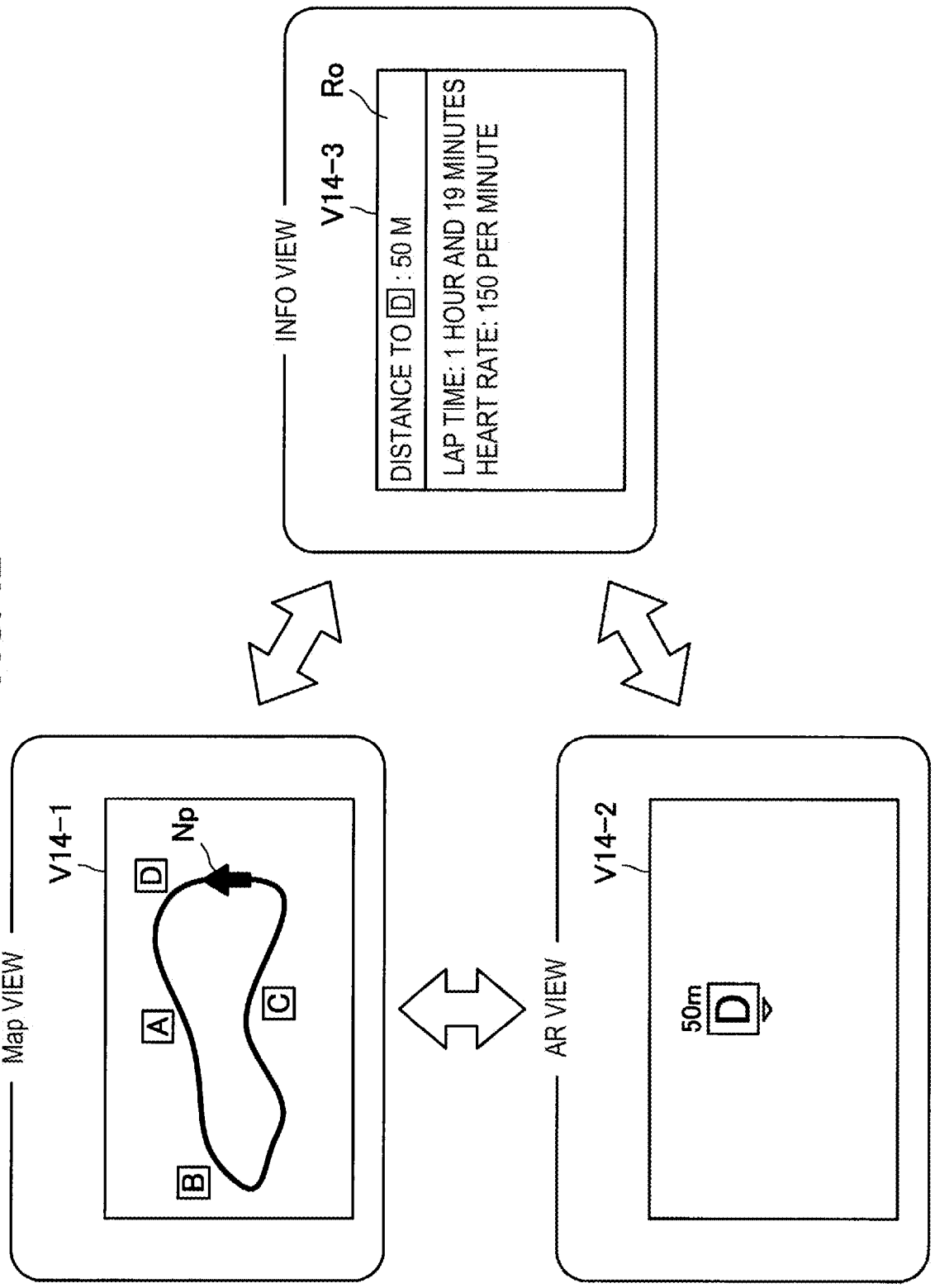
FIG. 42 is a diagram for explaining an example where the mode is switched between a mode for displaying an Info view and the mode for displaying the AR view (or the mode for displaying the Map view).

Subsequently, an example will be described where, as combination of the above-described first display mode and second display mode, combination of a mode for displaying a screen in which a display region of a distance from the display unit 10 to a subject (relating to the object D) is placed as an object (hereinafter, also referred to as a mode for displaying an "Info view") and the mode for displaying the AR view (or the mode for displaying the Map view) is applied. FIG. 42 is a diagram for explaining an example where the mode is switched between the mode for displaying the Info view V14-3 and the mode for displaying the AR view V14-2 (or the mode for displaying the Map view V14-1). For example, an object Ro in the Info view V14-3 may be a display region of a distance from the display unit 10 to the subject. The subject may be a still object or may be an active object (such as other runners and a user him/herself in the past when the user ran the same course).

As illustrated in FIG. 42, first, in the mode for displaying the Info view V14-3, the display control unit 314 displays the object Ro. Then, the display control unit 314 switches the mode between the mode for displaying the Map view V14-1 and the mode for displaying the AR view V14-2. While switching of the mode may be performed based on user operation, the user operation is not particularly limited, and may be touch panel input, key input, dial input, input using line of sight, sound input, gesture input, posture change, or the like. However, switching of the mode between the mode for displaying the Info view V14-3 and the mode for displaying the AR view V14-2 may be automatically performed as with switching of the mode between the mode for displaying the Map view and the mode for displaying the AR view Here, the display control unit 314 judges that the object Ro included in the Info view V14-3 corresponds to the object D included in the AR view V14-2 (or the object D included in the Map view V14-1) upon switching of the mode between the mode for displaying the Info view V14-3 and the mode for displaying the AR view V14-2 (or the mode for displaying the Map view V14-1). Therefore, for example, the display control unit 314 may perform seamless transition between the object Ro included in the Info view V14-3 and the object D included in the AR view V14-2 (or the object D included in the Map view V14-1). In this event, because the object Np corresponds to an object of the user him/herself, the object Np may be made to fade out to the lower part of the Info view V14-1 while being enlarged (may be made to fade in from the lower part of the Info view V14-1 while the size is reduced).

Figure 43:
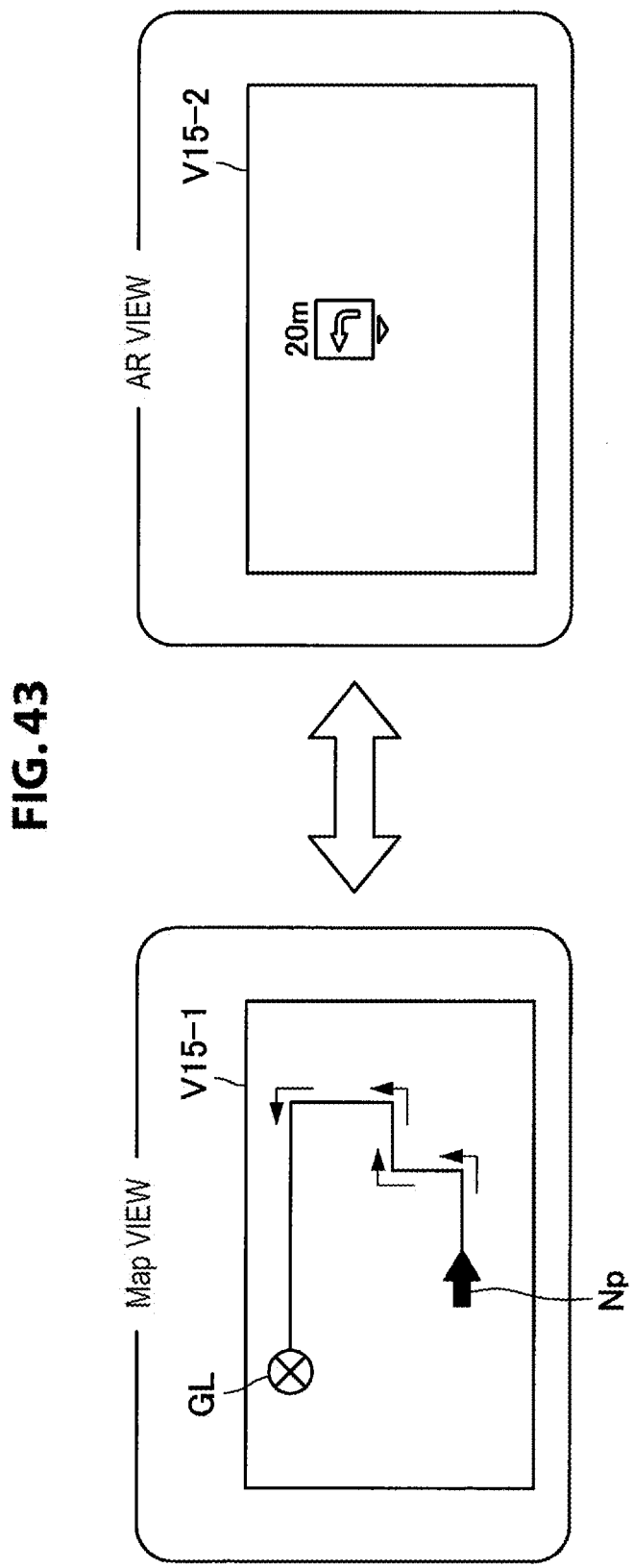
FIG. 43 is a diagram for explaining another example where the mode is switched between the mode for displaying the Map view and the mode for displaying the AR view.

Subsequently, another example will be described where, as combination of the above-described first display mode and second display mode, combination of the mode for displaying the Map view and the mode for displaying the AR view is applied. FIG. 43 is a diagram for explaining another example where the mode is switched between the mode for displaying the Map view and the mode for displaying the AR view. For example, objects in the Map view V15-1 and the AR view V15-2 may be corners in the route which reaches the destination GL from the display unit 10.

As illustrated in FIG. 43, first, in the mode for displaying the Map view V15-3, the display control unit 314 displays an arrow indicating the corner in the route which reaches the destination GL from the display unit 10 as an object. The display control unit 314 then switches the mode to the mode for displaying the AR view V15-2. A timing for switching the mode may be similar to the above-described timing for switching the mode between the mode for displaying the Map view and the mode for displaying the AR view.

Here, the display control unit 314 judges that arrow indicating the first corner included in the Map view V15-3 corresponds to an arrow indicating the corner included in the AR view V15-2 upon switching of the mode between the mode for displaying the Map view V15-3 and the mode for displaying the AR view V15-2. Therefore, for example, the display control unit 314 may perform seamless transition between the arrow indicating the first corner included in the Map view V15-3 and the arrow indicating the corner included in the AR view V15-2.

Second Embodiment

Subsequently, a second embodiment of the present technology will be described. A configuration different from that of the first embodiment will be mainly described below, and a configuration similar to that of the above-described embodiment and its description will be omitted or simplified.

A head mounted display according to the present embodiment includes a display unit configured to be able to be worn on the head of the user and configured to be able to provide a visual field to the user in real space, a detecting unit configured to detect an orientation of the display unit, and a display control unit configured to display an image in the visual field based on output of the detecting unit.

The display control unit moves the image within the visual field according to change of the orientation in the case where the orientation changes by a first predetermined angle or more. The display control unit fixes a display position of the image in the visual field in the case where the change of the orientation is less than the first predetermined angle.

The display unit and the detecting unit respectively correspond to the display unit 10 and the detecting unit 20 described in the first embodiment. The display control unit corresponds to the display control unit 314 having the object display fixing function ((1) Introduction of non-strict attribute) described in the first embodiment.

That is, the head mounted display of the present embodiment can be applied to other arbitrary coordinate systems for which the world coordinate is not limited to the cylindrical coordinate. Also in the present embodiment, it is possible to provide operation and effect similar to those in the first embodiment. That is, because it is possible to easily maintain a state where an object falls within the visual field, it is possible to improve visibility of the object by restricting movement of the object due to unintentional change of posture of the user.

Note that, also in the present embodiment, at least one of the region limiting function and the image management function may be provided as in the first embodiment.

Third Embodiment

Subsequently, a third embodiment of the present technology will be described. A configuration different from that in the first embodiment will be mainly described below, and a configuration similar to that of the above-described embodiment and its description will be omitted or simplified.

A head mounted display according to the present embodiment includes a display unit configured to be able to be worn on the head of the user and configured to be able to provide a visual field to the user in real space, a detecting unit configured to detect an orientation of the display unit, and a display control unit configured to display an image in the visual field based on output of the detecting unit.

The display control unit moves the image to a predetermined position in the visual field in the case where change of the output of the detecting unit is equal to or less than a predetermined amount over a predetermined period. Alternatively, the display control unit moves the image to a predetermined position in the visual field in the case where input of a predetermined signal generated through user operation is detected.

The display unit and the detecting unit respectively correspond to the display unit 10 and the detecting unit 20 described in the first embodiment. The display control unit corresponds to the display control unit 314 having the object display fixing function ((2) First grab function or (3) Second grab function) described in the first embodiment.

That is, the head mounted display of the present embodiment can be applied to other arbitrary coordinate systems for which the world coordinate is not limited to the cylindrical coordinate. Also in the present embodiment, it is possible to provide operation and effect similar to those in the first embodiment. That is, because it is possible to easily maintain a state where an object falls within the visual field, it is possible to improve visibility of the object by restricting movement of the object due to unintentional change of posture of the user.

Note that, also in the present embodiment, at least one of the region limiting function and the image management function may be provided as in the first embodiment.

Fourth Embodiment

Subsequently, a fourth embodiment of the present technology will be described. A configuration different from that of the first embodiment will be mainly described below, and a configuration similar to that of the above-described embodiment and its description will be omitted or simplified.

A head mounted display according to the present embodiment includes a display unit configured to be able to be worn on the head of the user and configured to be able to provide a visual field to the user in real space, a detecting unit configured to detect an orientation of the display unit, and a display control unit configured to display an image in the visual field based on output of the detecting unit.

In a state where the image is displayed at the predetermined position in the visual field, in the case where the change of the output of the detecting unit is equal to or higher than a predetermined frequency, the display control unit disables frequency components equal to or higher than the predetermined frequency among the output of the detecting unit.

The display unit and the detecting unit respectively correspond to the display unit 10 and the detecting unit 20 described in the first embodiment. The display control unit corresponds to the display control unit 314 having the object display fixing function ((4) face blur correction function) described in the first embodiment.

That is, the head mounted display of the present embodiment can be applied to other arbitrary coordinate systems for which the world coordinate is not limited to the cylindrical coordinate. Also in the present embodiment, it is possible to provide operation and effect similar to those in the above-described first embodiment. That is, it is possible to secure visibility of an image without being affected by fine face blur by the user.

Note that, also in the present embodiment, at least one of the region limiting function and the image management function may be provided as in the first embodiment.

Fifth Embodiment

Subsequently, a fifth embodiment of the present technology will be described. A configuration different from that of the first embodiment will be mainly described below, and a configuration similar to that of the above-described embodiment and its description will be omitted or simplified.

A head mounted display according to the present embodiment includes a display unit, a detecting unit and a control unit. The display unit is configured to be able to be worn on the head of the user and configured to be able to provide a visual field to the user in real space. The detecting unit detects an orientation around at least one axis of the display unit. The first control unit includes a storage unit and a display control unit. The storage unit stores an image including information relating to a predetermined subject existing in the visual field in association with a three-dimensional coordinate surrounding the display unit. The display control unit is configured to display the image on the three-dimensional coordinate corresponding to the orientation in the visual field based on the output of the detecting unit.

The display unit and the detecting unit respectively correspond to the display unit 10 and the detecting unit 20 described in the first embodiment. The storage unit corresponds to the memory 302 described in the first embodiment. The display control unit corresponds to the display control unit 314 described in the first embodiment.

That is, the head mounted display of the present embodiment can be applied to other arbitrary coordinate systems for which the world coordinate is not limited to the cylindrical coordinate. Also in the present embodiment, it is possible to provide operation and effect similar to those in the above-described first embodiment.

In the present embodiment, the display control unit may be configured to convert a predetermined image stored in the storage unit into a coordinate value which falls within a display range along the one axis direction of the visual field and display the image in the visual field. By this means, it is possible to control drawing of the object while following the height of the visual field V, so that it is possible to provide operation and effect similar to those of the region limiting function described in the first embodiment.

Figure 44:
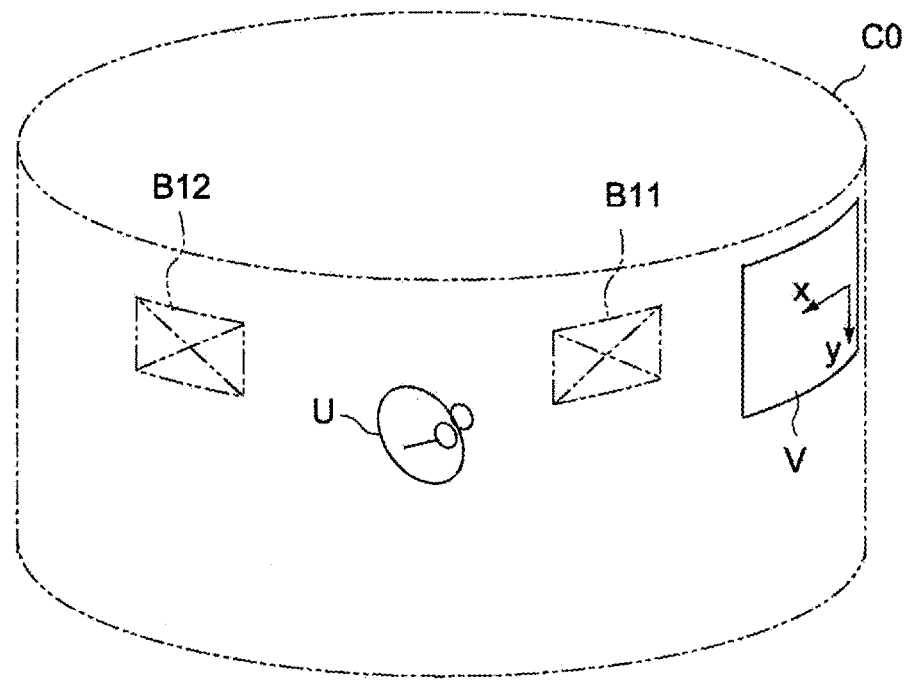
FIG. 44 is a pattern diagram explaining one action of a head mounted display according to another embodiment of the present technology.

For example, in the display mode in which the region limiting function is disabled, as illustrated in FIG. 44, in the case where height coordinates of the objects B11 and B12 on the cylindrical coordinate exceed the display range of the visual field V, the user U cannot display the objects B11 and B12 in the visual field V with posture change in a horizontal plane.

Figure 45A:
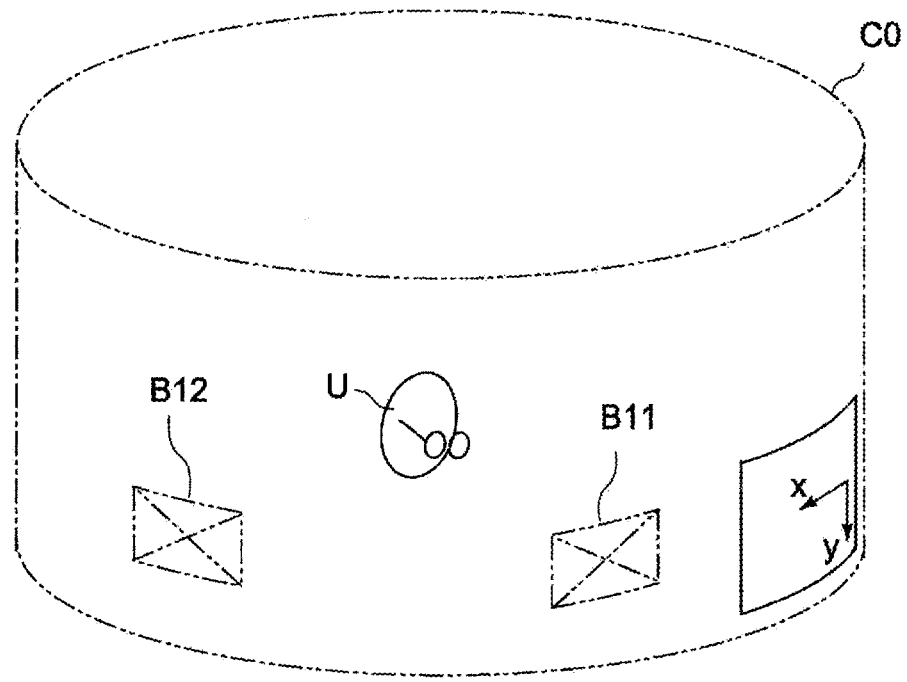
FIG. 45A is a pattern diagram explaining one action of the above-described head mounted display.

On the other hand, in the case of image control of an object while following the height of the visual field V, the height coordinates of the objects B11 and B12 are limited while following region limitation in the height direction of the visual field V. As a result, as illustrated in FIG. 45A, the height coordinates of the objects B11 and B12 are changed so that the objects fall within the display region of the visual field V, and the objects B11 and B12 corresponding to respective orientations can be displayed in the visual field V only with posture change of the user U in the horizontal plane.

Figure 45B:
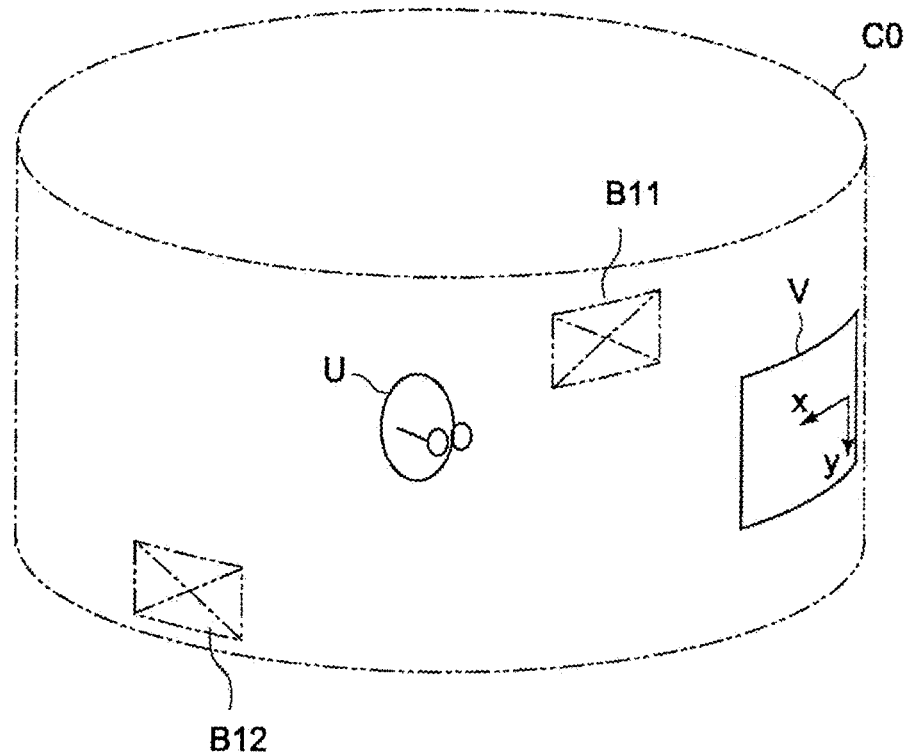
FIG. 45B is a pattern diagram explaining one action of the above-described head mounted display.
Figure 45C:
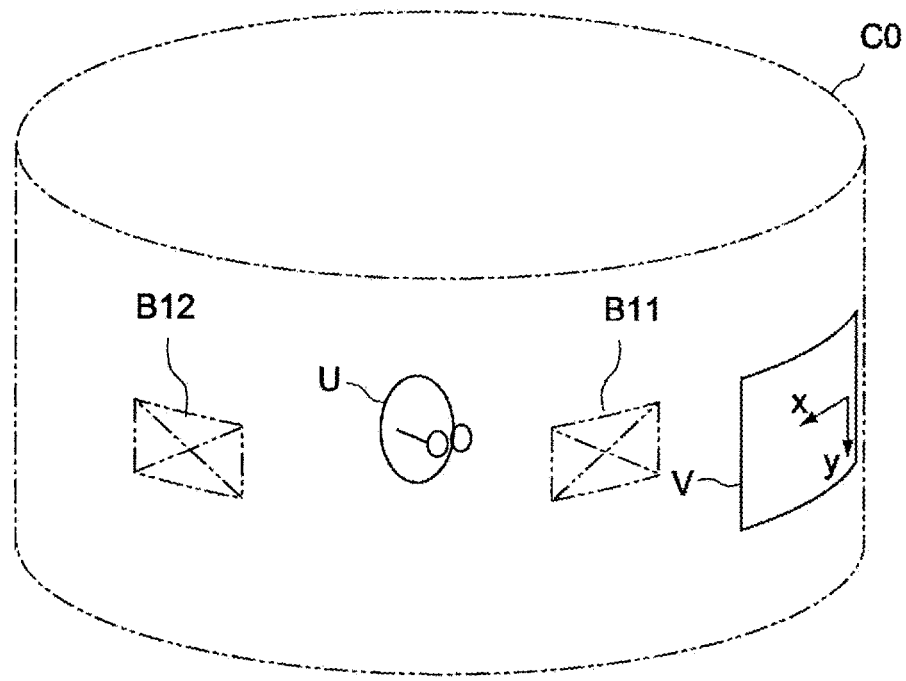
FIG. 45C is a pattern diagram explaining one action of the above-described head mounted display.

Further, as illustrated in FIG. 45B and FIG. 45C, also in the case where the visual field V changes in the height direction, the height coordinates of the objects B11 and B12 are also changed while following the height coordinate of the visual field V, so that the user can view the objects B11 and B12 when the user sees the surrounding while the user looks up or looks down.

As described above, the object which follows the height of the visual field V may be all the objects on the cylindrical coordinate C0 or may be part of the objects. For example, such selection of the object may be performed by the user or an object displaying important information may be preferentially selected.

While the embodiments of the present technology have been described above, the present technology is not limited to only the above-described embodiments, and, of course, various changes can be made without departing from the gist of the present technology.

For example, while an example has been described in the above-described embodiments where the present technology is applied to the HMD, the present technology can be also applied to, for example, a head up display (HUD) mounted on a driver's seat of the vehicle, a cockpit of an airplane, or the like, as an image display apparatus other than the HMD. Alternatively, the present technology can be also applied to a contact lens type display apparatus, the present technology can be also applied to an eyewear designed for one eye, and the present technology can be also applied to a terminal such as a smartphone.

Further, while, in the above-described embodiments, an application example of the see-through type (transmission type) HMD has been described, the present technology can be also applied to a non-transmission type HMD. In this case, a predetermined object according to the present technology only has to be displayed in an external visual field photographed with a camera mounted on the display unit.

Further, while, in the above-described embodiments, the HMD 100 is configured to display an object including information relating to a predetermined subject existing in real space in the visual field V, the present technology is not limited to this, and destination guide display, or the like, may be displayed in the visual field V based on a current position or a travelling direction of the user U.

Additionally, the present technology may also be configured as below.

(1)

A display control apparatus including:

a display control unit configured to display a first screen in a first display mode and display a second screen in a second display mode, wherein, upon switching of a mode from the first display mode to the second display mode, in the case where a first object included in the first screen corresponds to a second object included in the second screen, the display control unit performs seamless transition from the first object to the second object.

(2)

The display control apparatus according to (1), wherein the display control unit performs seamless transition of a position from the first object to the second object.

(3)

The display control apparatus according to (1), wherein the display control unit performs seamless transition of a size from the first object to the second object.

(4)

The display control apparatus according to (1), wherein the display control unit performs seamless transition of color from the first object to the second object.

(5)

The display control apparatus according to any one of (1) to (4), wherein the display control unit switches the mode from the first display mode to the second display mode in the case where predetermined conditions are satisfied.

(6)

The display control apparatus according to any one of (1) to (5), wherein an object relating to a predetermined subject is associated with a three-dimensional coordinate, and one display mode out of the first display mode and the second display mode is a mode for displaying an object corresponding to an orientation around at least one axis of a display unit in a visual field of a user in real space.

(7)

The display control apparatus according to (6), wherein, in the case where a relative distance between the display unit and the subject is smaller than a predetermined distance, and, in the case where the subject falls within the visual field of the user in real space, the display control unit switches the mode from the first display mode to the second display mode.

(8)

The display control apparatus according to (7), wherein, in the case where the relative distance between the display unit and the subject is greater than the predetermined distance, or, in the case where the subject deviates from the visual filed of the user in real space, the display control unit switches the mode from the second display mode to the first display mode.

(9)

The display control apparatus according to any one of (6) to (8), wherein a display mode different from the one display mode out of the first display mode and the second display mode is a mode for displaying map data.

(10)

The display control apparatus according to (9), wherein the display control unit makes an object indicating a position of the display unit in the map data fade in.

(11)

The display control apparatus according to (9), wherein the display control unit makes an object indicating a road in the map data fade in.

(12)

The display control apparatus according to any one of (1) to (5), wherein one display mode out of the first display mode and the second display mode is a mode for displaying a screen in which a plurality of objects are arranged on two dimensions of a horizontal direction and a vertical direction.

(13)

The display control apparatus according to (12), wherein a display mode different from the one display mode is a mode for displaying a screen in which a plurality of objects are arranged on one dimension.

(14)

The display control apparatus according to (12), wherein a display mode different from the one display mode is a mode for displaying a screen in which a plurality of objects are arranged on two dimensions of a horizontal direction and a depth direction.

(15)

The display control apparatus according to any one of (1) to (5), wherein one display mode out of the first display mode and the second display mode is a mode for displaying a screen in which a plurality of objects are arranged on a time axis according to time associated with each of the plurality of objects.

(16)

The display control apparatus according to any one of (1) to (5), wherein one display mode out of the first display mode and the second display mode is a mode for displaying a screen in which an object and information relating to a store associated with the object are placed in association with each other.

(17)

The display control apparatus according to any one of (1) to (5), wherein one display mode out of the first display mode and the second display mode is a mode for displaying a screen in which an object and written data associated with the object are placed in association with each other.

(18)

The display control apparatus according to any one of (1) to (5), wherein one display mode out of the first display mode and the second display mode is a mode for displaying a screen in which a display region of a distance from a display unit to a subject is placed as an object.

(19)

A display control method including:

displaying a first screen in a first display mode and displaying a second screen in a second display mode, wherein, upon switching of a mode from the first display mode to the second display mode, in the case where a first object included in the first screen corresponds to a second object included in the second screen, seamless transition from the first object to the second object is performed.

(20)

A program for causing a computer to function as a display control apparatus including a display control unit configured to display a first screen in a first display mode and display a second screen in a second display mode, wherein, upon switching of a mode from the first display mode to the second display mode, in the case where a first object included in the first screen corresponds to a second object included in the second screen, the display control unit performs seamless transition from the first object to the second object.

REFERENCE SIGNS LIST 10 display unit
11R, 11L display face
12R, 12L image generating unit
20 detecting unit
30 control unit
100 head mounted display (HMD)
200 mobile information terminal
311 coordinate setting unit
312 image managing unit
313 coordinate determining unit
314 display control unit
A1 to A4 subject
B, B1 to B4 object
C0, C1 cylindrical coordinate (world coordinate)
V visual field
U user

The invention claimed is:

1. A display control apparatus to control an augmented reality head-mounted display comprising:

a display controller configured to display a first screen in a first display mode and display a second screen in a second display mode, wherein, upon switching of a mode from the first display mode to the second display mode, in the case where a first object included in the first screen corresponds to a second object included in the second screen, the display controller performs a transition from the first object to the second object by translating between a cylindrical coordinate system of the first object in the first screen and a local coordinate system of the second object in the second screen;

a region limiter configured to limit a display region with respect to a height of a visual field on a three dimensional coordinate surrounding a display; and the display controller including a geomagnetic sensor to detect an orientation of the head mounted display;

wherein, when the head mounted display changes orientation, frequency components of the first object in the first screen or frequency components of the second object in the second screen, that are higher than a predetermined frequency, do not respond to a change in orientation, and a display position of frequency components of the first object in the first screen or frequency components of the second object in the second screen that are lower than the predetermined frequency are fixed.

2. The display control apparatus according to claim 1, wherein the display controller performs a transition of a position from the first object to the second object.

3. The display control apparatus according to claim 1, wherein the display controller performs a transition of a size from the first object to the second object.

4. The display control apparatus according to claim 1, wherein the display controller performs a transition of color from the first object to the second object.

5. The display control apparatus according to claim 1, wherein the display controller switches the mode from the first display mode to the second display mode in the case where conditions are satisfied.

6. The display control apparatus according to claim 1, wherein an object relating to a predetermined subject is associated with a three-dimensional coordinate, and
one display mode out of the first display mode and the second display mode is a mode for displaying an object corresponding to an orientation around at least one axis of a display in a visual field of a user in real space.

7. The display control apparatus according to claim 6, wherein, in the case where a relative distance between the display and the subject is smaller than a predetermined distance, and, in the case where the subject falls within the visual field of the user in real space, the display controller switches the mode from the first display mode to the second display mode.

8. The display control apparatus according to claim 7, wherein, in the case where the relative distance between the display and the subject is greater than the predetermined distance, or, in the case where the subject deviates from the visual field of the user in real space, the display controller switches the mode from the second display mode to the first display mode.

9. The display control apparatus according to claim 6, wherein a display mode different from the one display mode out of the first display mode and the second display mode is a mode for displaying map data.

10. The display control apparatus according to claim 9, wherein the display controller makes an object indicating a position of the display in the map data fade in.

11. The display control apparatus according to claim 9, wherein the display controller makes an object indicating a road in the map data fade in.

12. The display control apparatus according to claim 1, wherein one display mode out of the first display mode and the second display mode is a mode for displaying a screen in which a plurality of objects are arranged on two dimensions of a horizontal direction and a vertical direction.

13. The display control apparatus according to claim 12, wherein a display mode different from the one display mode is a mode for displaying a screen in which a plurality of objects are arranged on one dimension.

14. The display control apparatus according to claim 12, wherein a display mode different from the one display mode is a mode for displaying a screen in which a plurality of objects are arranged on two dimensions of a horizontal direction and a depth direction.

15. The display control apparatus according to claim 1, wherein one display mode out of the first display mode and the second display mode is a mode for displaying a screen in which a plurality of objects are arranged on a time axis according to time associated with each of the plurality of objects.

16. The display control apparatus according to claim 1, wherein one display mode out of the first display mode and the second display mode is a mode for displaying a screen in which an object and information relating to a store associated with the object are placed in association with each other.

17. The display control apparatus according to claim 1, wherein one display mode out of the first display mode and the second display mode is a mode for displaying a screen in which an object and written data associated with the object are placed in association with each other.

18. The display control apparatus according to claim 1, wherein one display mode out of the first display mode and the second display mode is a mode for displaying a screen in which a display region of a distance from a display unit to a subject is placed as an object.

19. A display control method to control an augmented reality head-mounted display, comprising:
displaying a first screen in a first display mode and displaying a second screen in a second display mode,
wherein, upon switching of a mode from the first display mode to the second display mode, in the case where a first object included in the first screen corresponds to a second object included in the second screen, a transition from the first object to the second object is performed by translating between a cylindrical coordinate system of the first object in the first screen and a local coordinate system of the second object in the second screen;
a region limiter configured to limit a display region with respect to a height of a visual field on a three dimensional coordinate surrounding a display; and
a geomagnetic sensor to detect an orientation of the head mounted display;
wherein, when the head mounted display changes orientation, frequency components of the first object in the first screen or frequency components of the second object in the second screen, that are higher than a predetermined frequency, do not respond to a change in orientation, and a display position of frequency components of the first object in the first screen or frequency components of the second object in the second screen that are lower than the predetermined frequency are fixed.

20. A non-transitory computer readable storage medium having computer readable instructions stored thereon that cause a computer to function as a display control apparatus to control an augmented reality head-mounted display including
a display control unit configured to display a first screen in a first display mode and display a second screen in a second display mode,
wherein, upon switching of a mode from the first display mode to the second display mode, in the case where a first object included in the first screen corresponds to a second object included in the second screen, the display control unit performs a transition from the first object to the second object by translating between a cylindrical coordinate system of the first object in the first screen and a local coordinate system of the second object in the second;
a region limiter configured to limit a display region with respect to a height of a visual field on a three dimensional coordinate surrounding a display; and
the display control unit including a geomagnetic sensor to detect an orientation of the head mounted display;

wherein, when the head mounted display changes orientation, frequency components of the first object in the first screen or frequency components of the second object in the second screen, that are higher than a predetermined frequency, do not respond to a change in orientation, and a display position of frequency components of the first object in the first screen or frequency components of the second object in the second screen that are lower than the predetermined frequency are fixed.

* * * * *